United States Patent [19]

Yoknis et al.

[11] 4,300,199
[45] Nov. 10, 1981

[54] THERMOSTAT

[75] Inventors: Myron Yoknis; James B. Waite, both of Ft. Collins, Colo.

[73] Assignee: Teledyne Industries, Inc., Ft. Collins, Colo.

[21] Appl. No.: 69,978

[22] Filed: Aug. 27, 1979

[51] Int. Cl.³ .......................... F23N 5/20; H05B 1/02; G06F 15/20
[52] U.S. Cl. .................................. 364/557; 364/418; 364/483; 73/362 R; 73/362.5; 165/12; 236/46 R
[58] Field of Search ............... 364/557, 418, 103, 900, 364/483; 73/362, 1 F, 362.5; 165/11, 13, 14, 12; 236/46 R

[56] References Cited
U.S. PATENT DOCUMENTS

| | | | |
|---|---|---|---|
| 3,400,374 | 9/1968 | Schumann | 364/103 X |
| 3,978,325 | 8/1976 | Goldstein et al. | 364/557 X |
| 4,008,617 | 2/1977 | Yen et al. | 364/557 X |
| 4,068,526 | 1/1978 | Goldstein | 364/557 X |
| 4,071,745 | 1/1978 | Hall | 364/120 X |
| 4,141,407 | 2/1979 | Briscoe et al. | 165/12 |
| 4,156,502 | 5/1979 | Day | 165/12 X |
| 4,174,807 | 11/1979 | Smith et al. | 165/12 X |
| 4,179,654 | 12/1979 | Germer | 364/492 X |
| 4,181,957 | 1/1980 | Pinckaers | 364/557 |
| 4,191,328 | 3/1980 | Issacs et al. | 165/12 X |
| 4,206,872 | 6/1980 | Levine | 165/12 X |
| 4,217,645 | 8/1980 | Barry et al. | 364/483 |

*Primary Examiner*—Edward J. Wise
*Attorney, Agent, or Firm*—Hugh H. Drake

[57] ABSTRACT

A programmable thermostat features a memory unit receptive of unit values of temperature desired at different times on different days all individually or in various combinations both as to days and times. An output device signals a temperature control system. As controlled by a clock, the memory unit is addressed during different times of the different days to provide a signal representing the corresponding value desired. Existing temperature level is sensed and compared with each value so as to develop an error signal. In response to that error signal, the output is operated in a direction to reduce the difference between actual and desired temperatures. Numerous details as to layout, construction and circuitry are presented.

21 Claims, 67 Drawing Figures

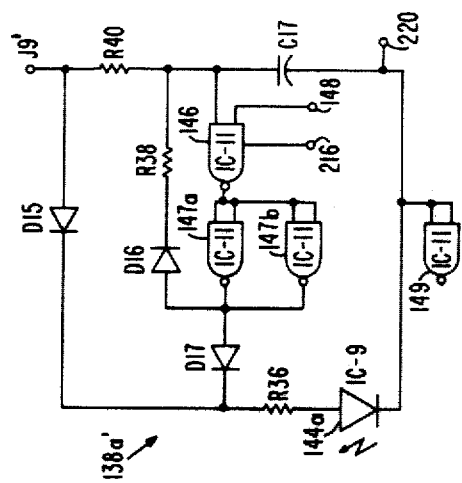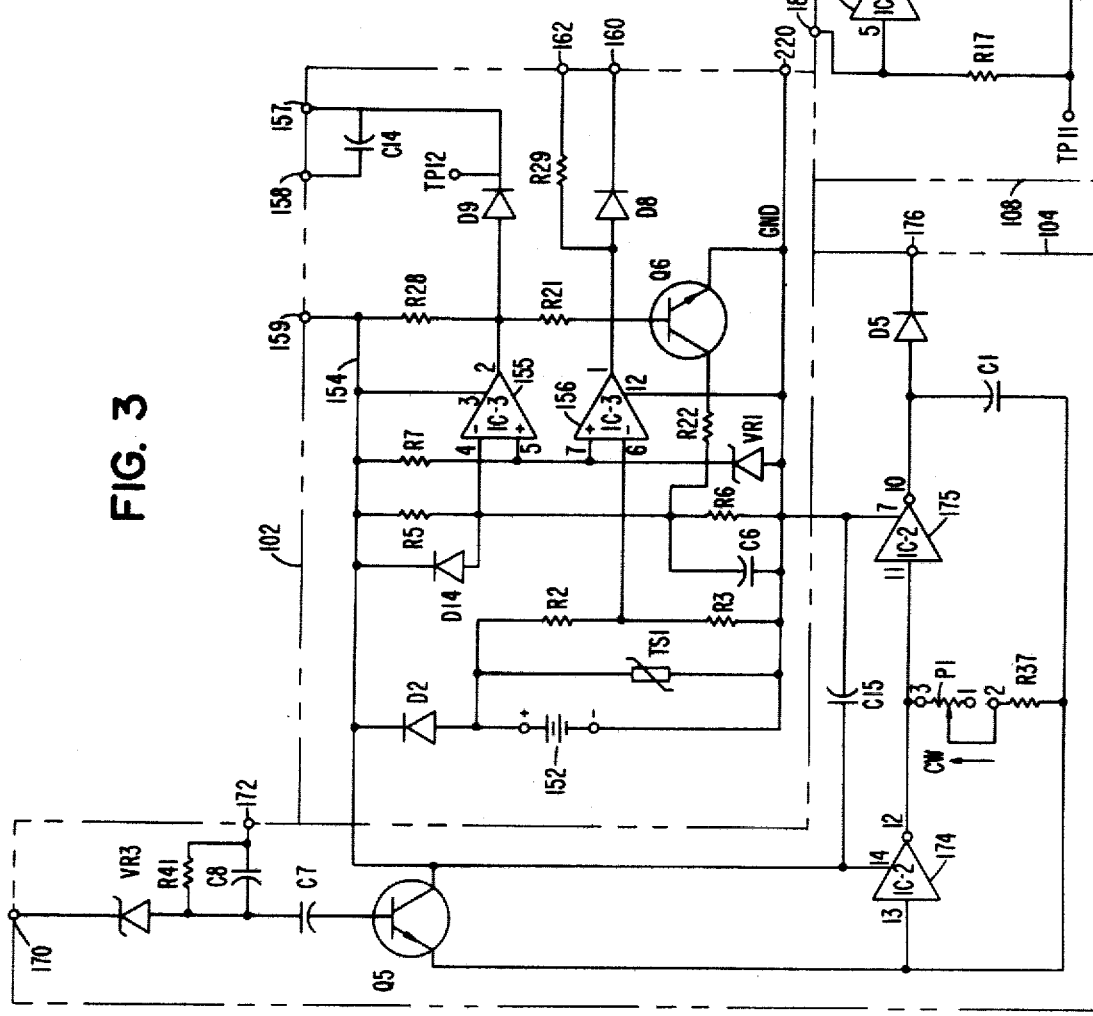
FIG. 4B
FIG. 3

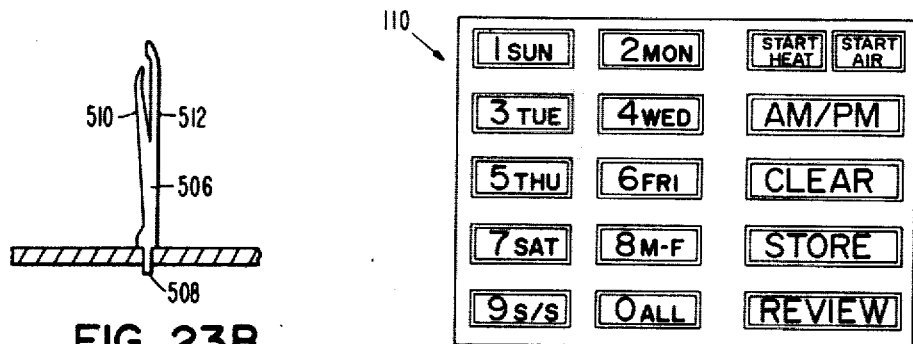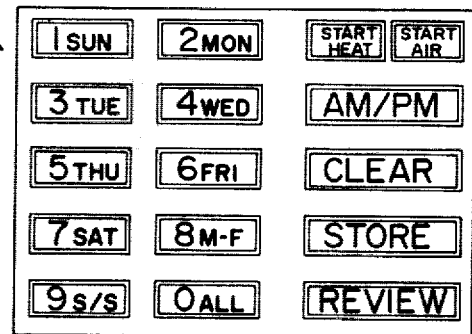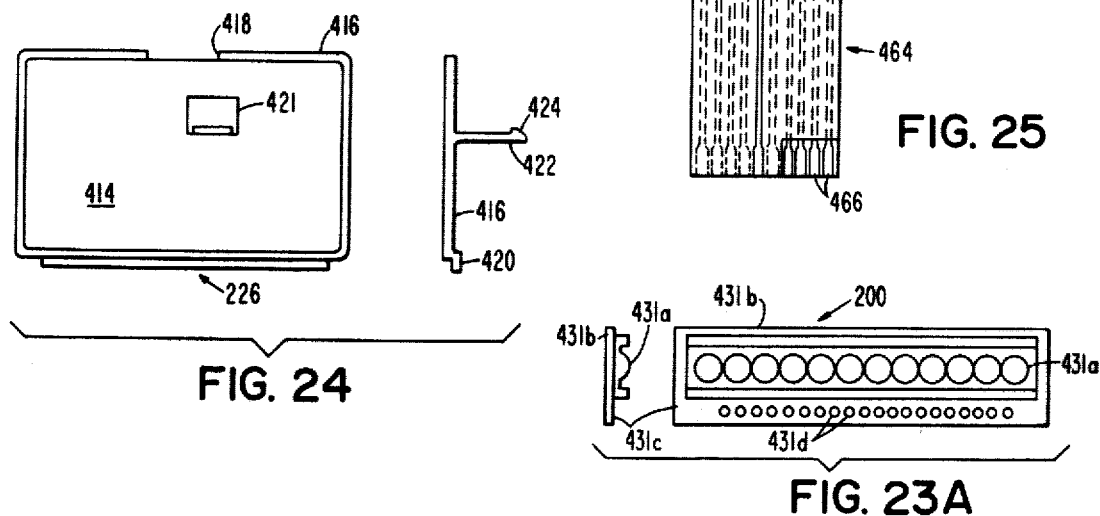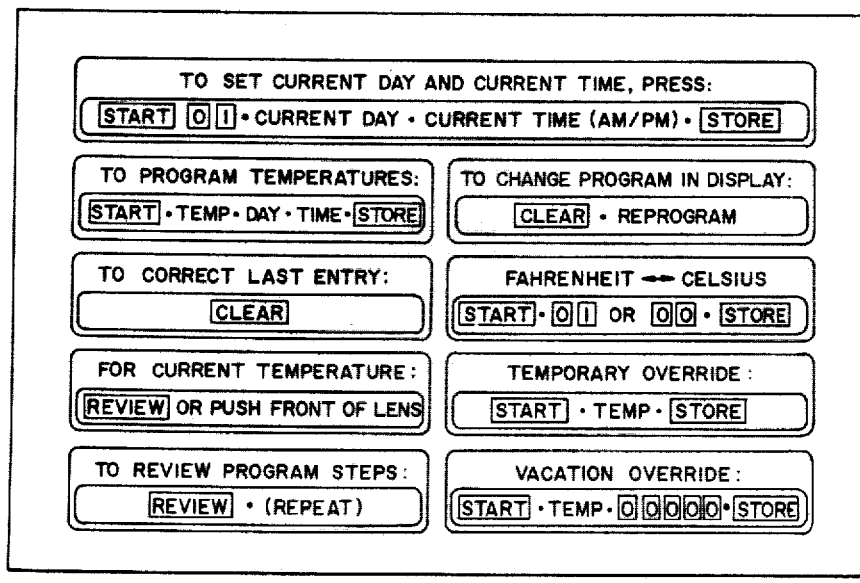

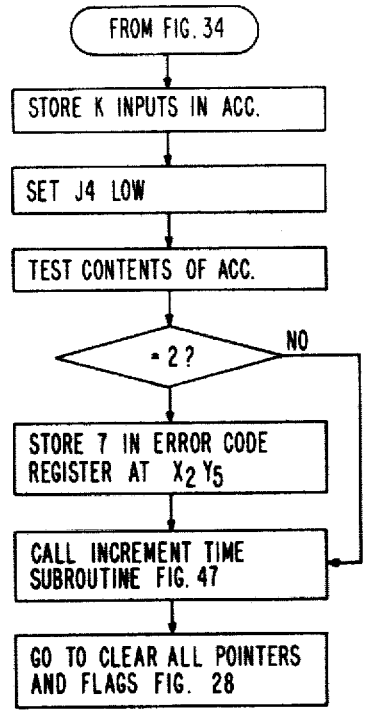
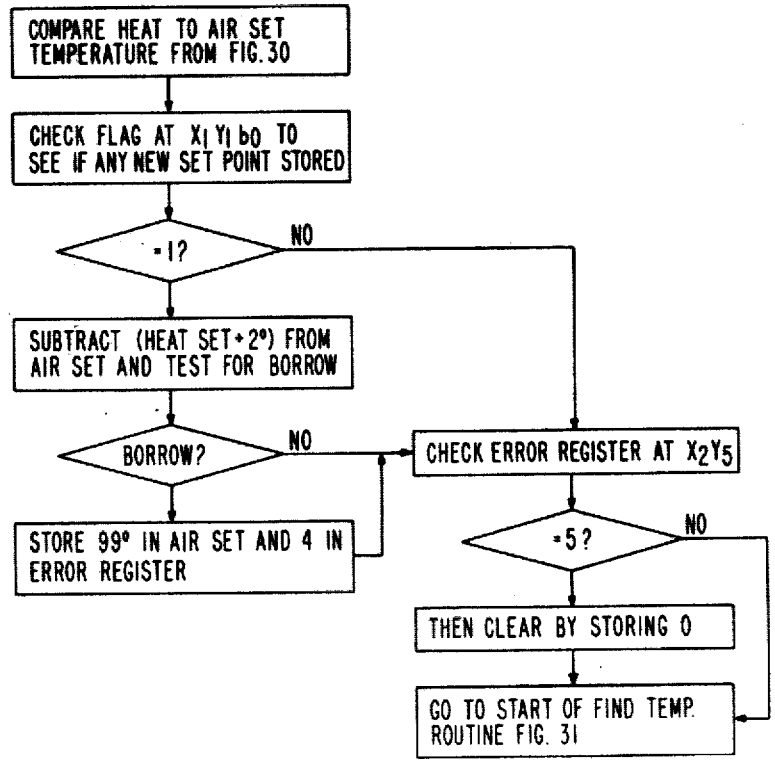
FIG. 35

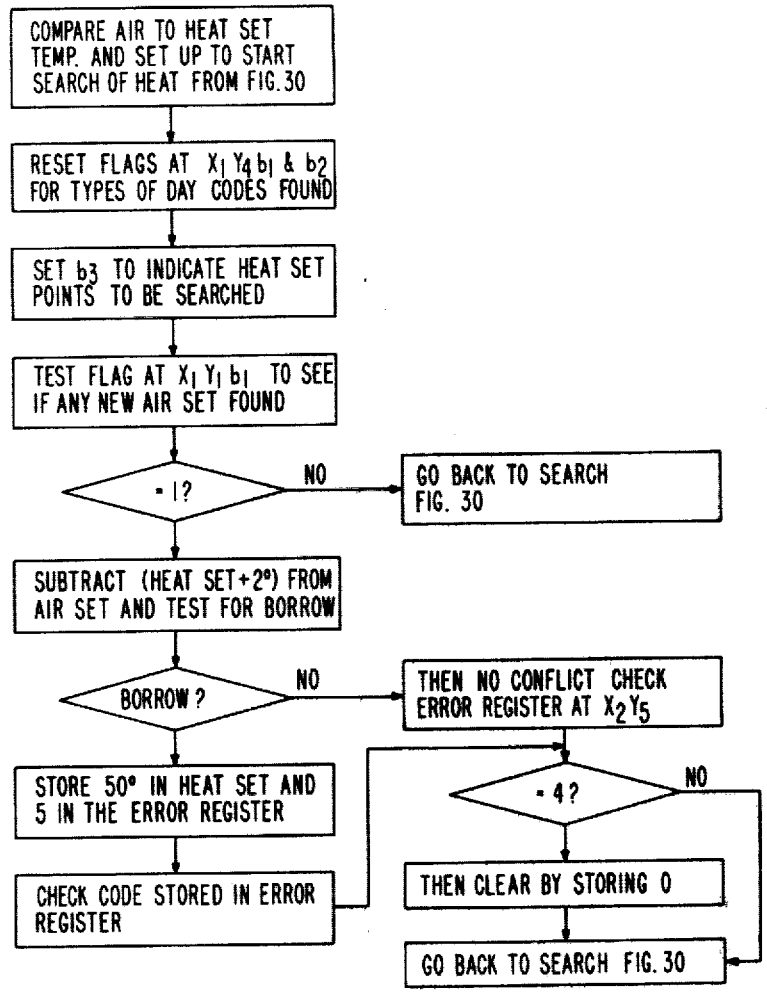
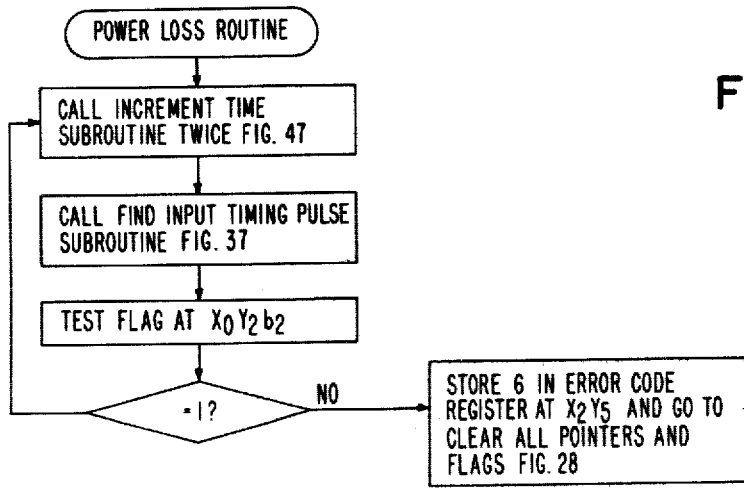
FIG. 36

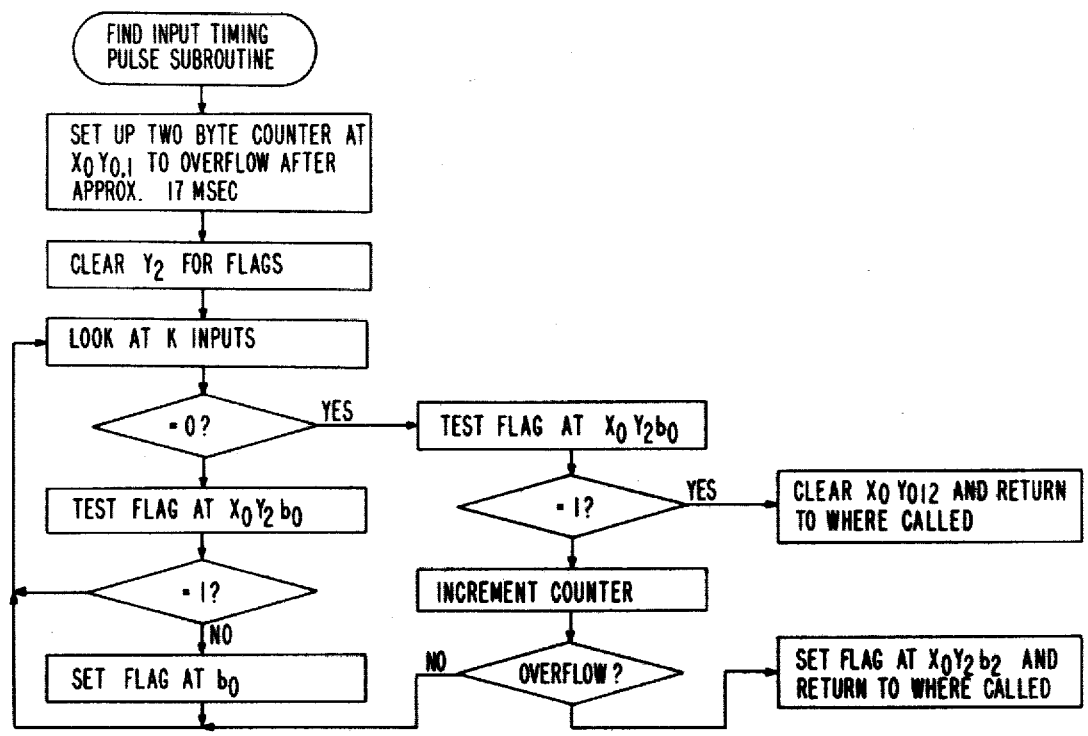
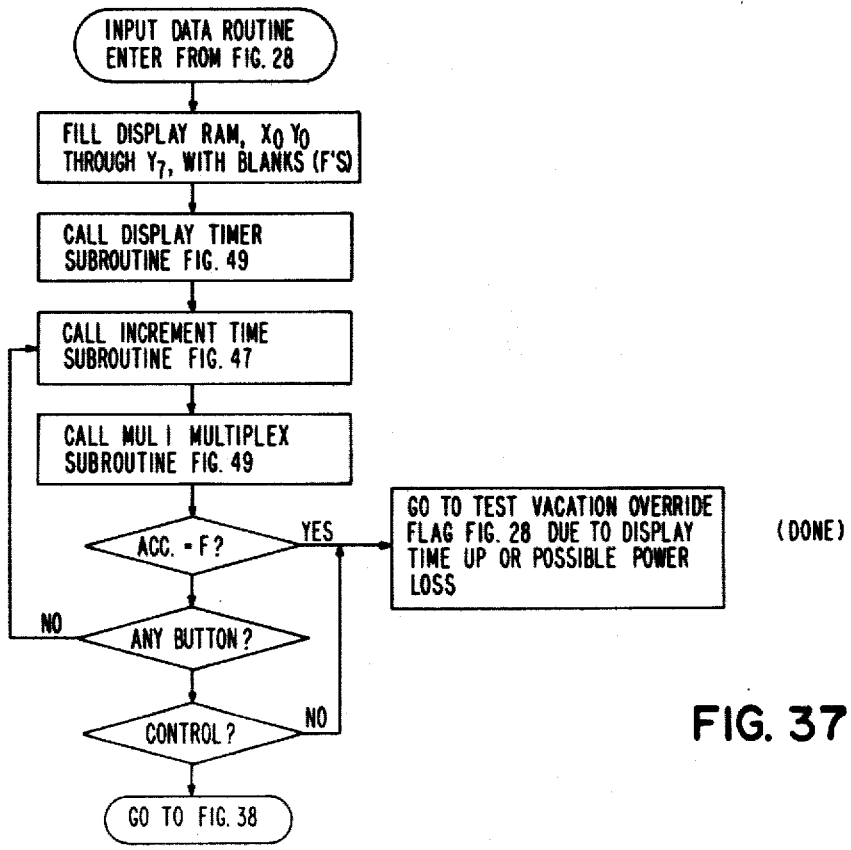
FIG. 37

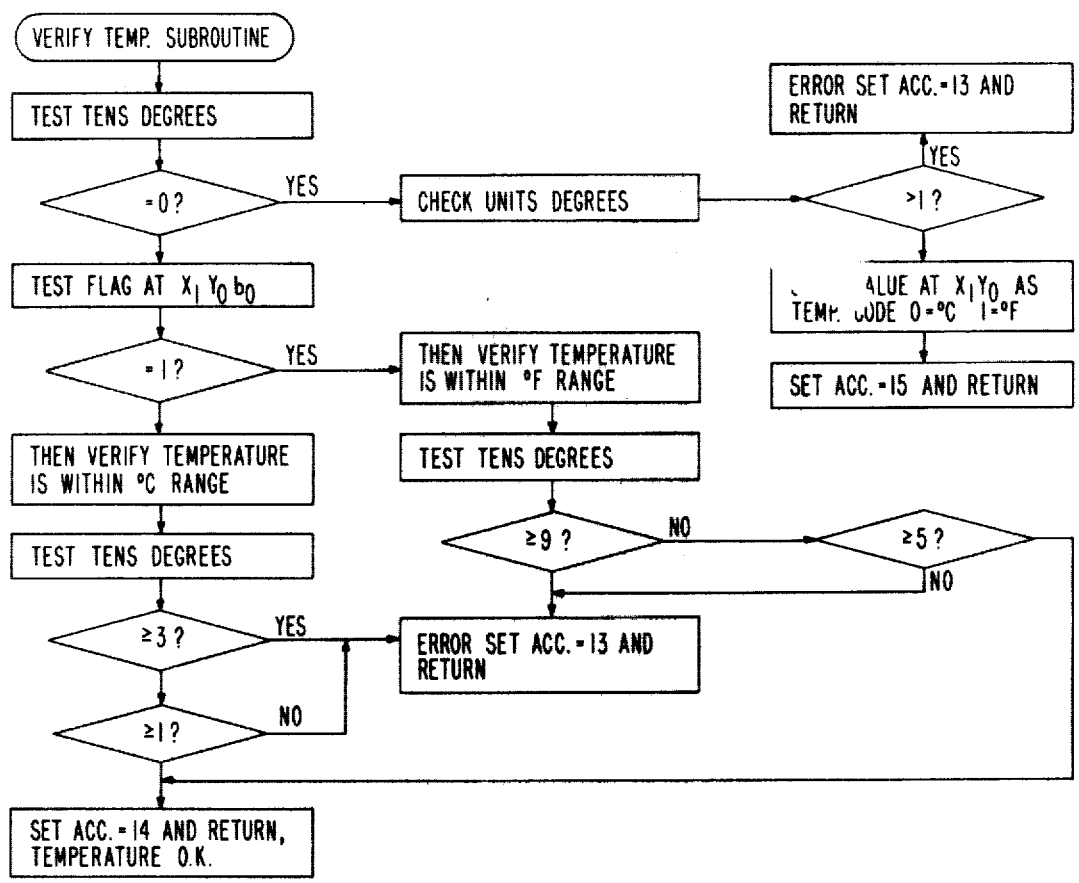
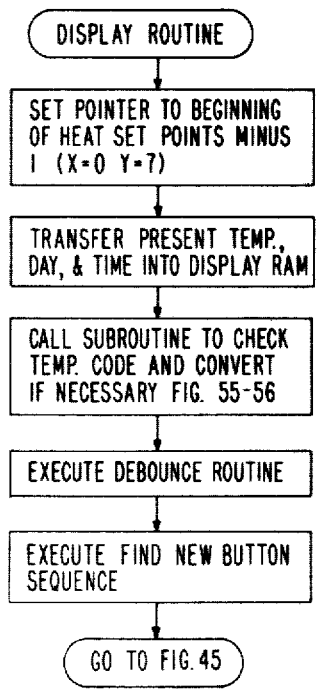
FIG. 44

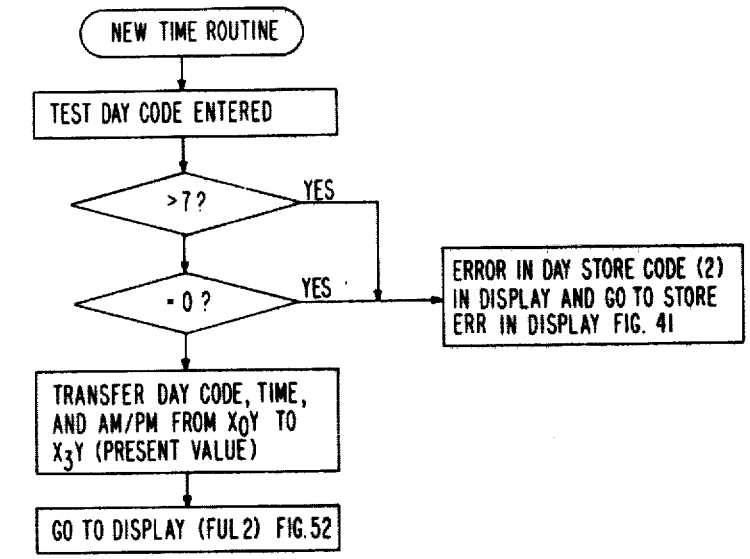
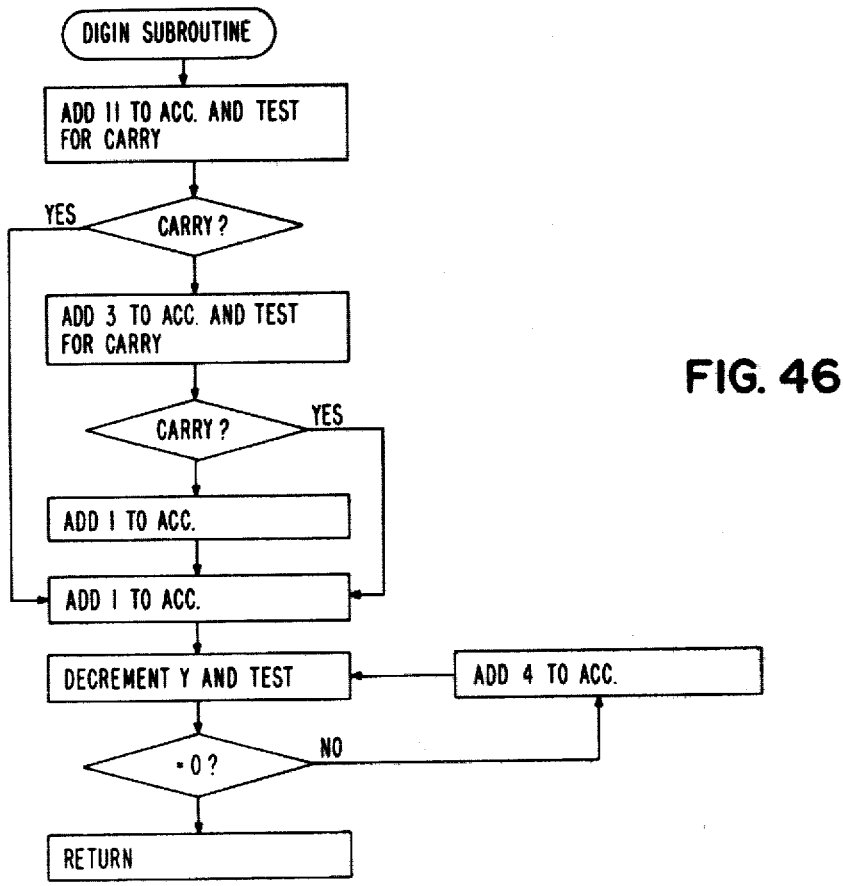
FIG. 46

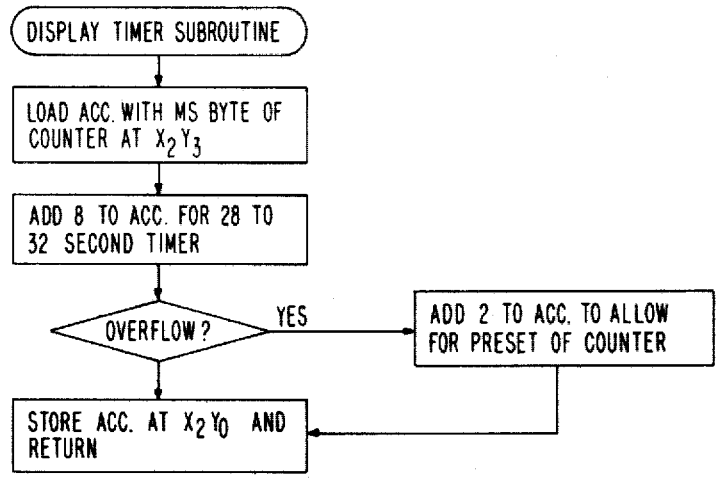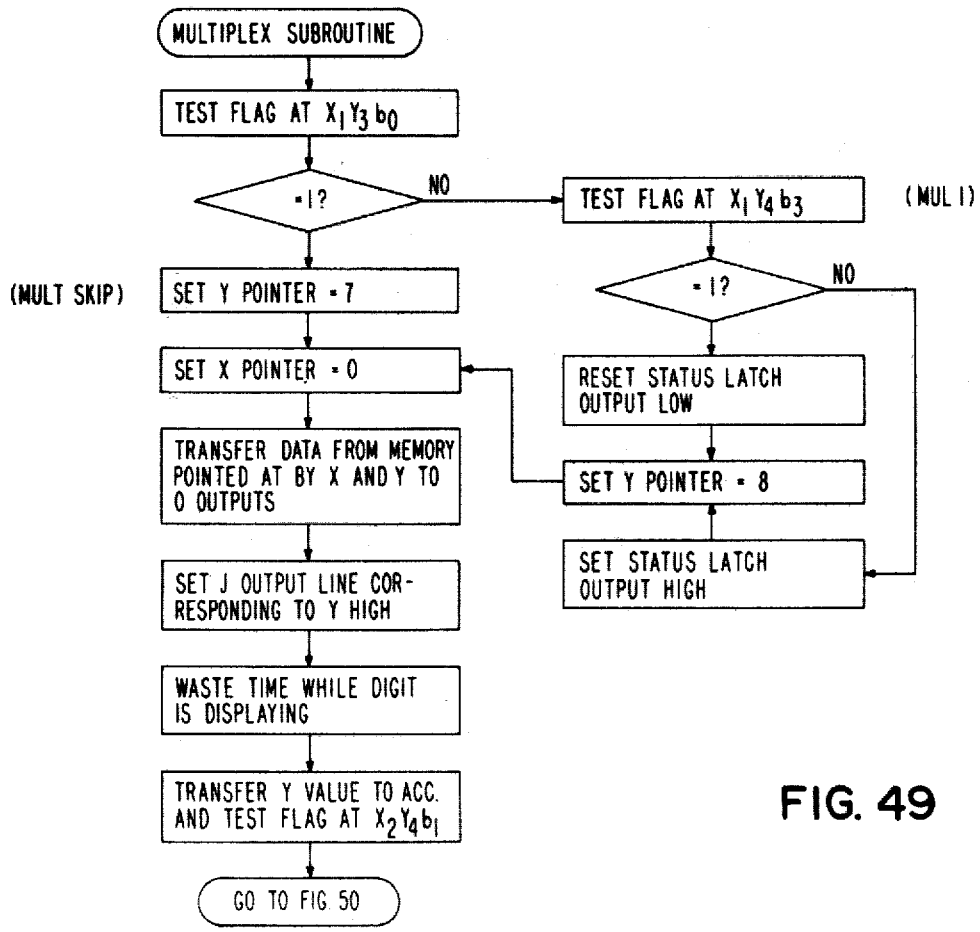
FIG. 49

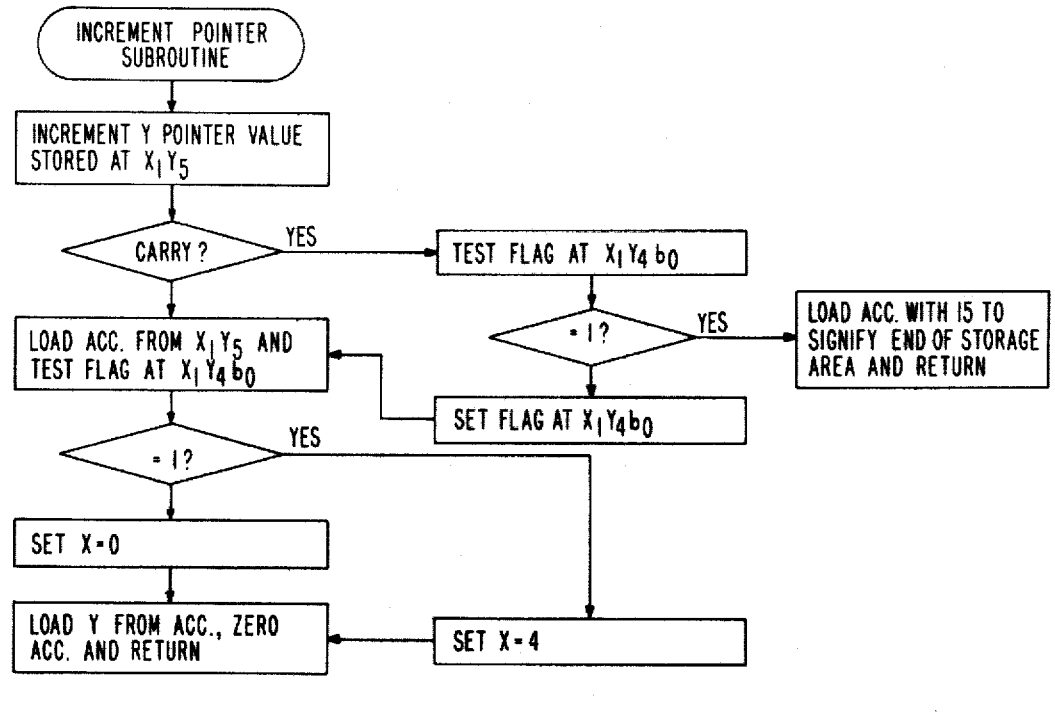
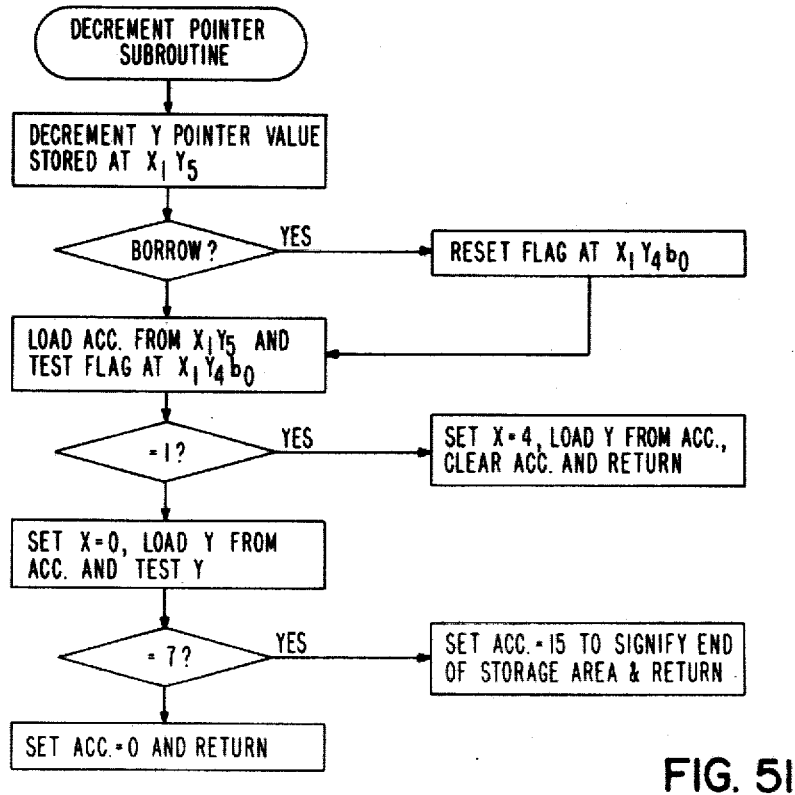
FIG. 51

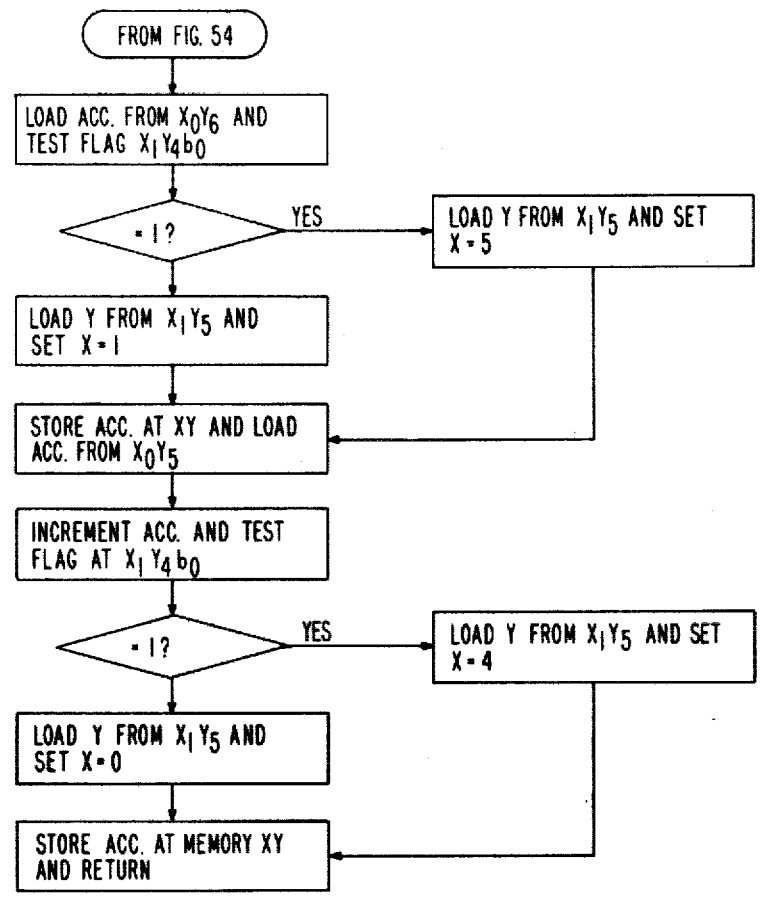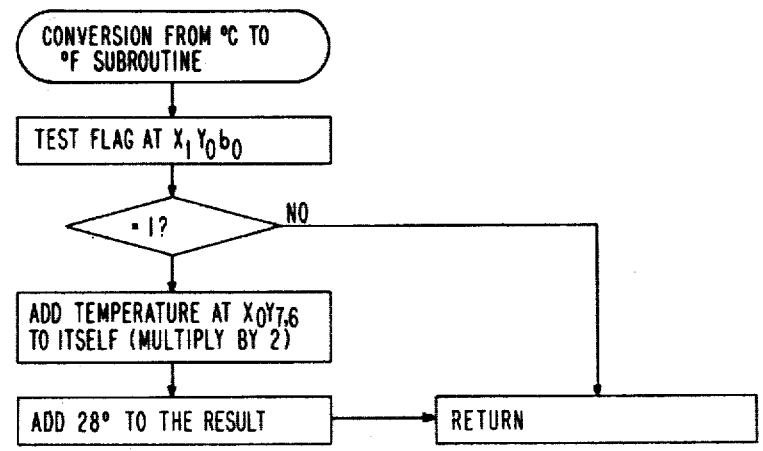
FIG. 55

THERMOSTAT

The present invention relates to a thermostat. More particularly, it pertains to a variety of system, circuitry and mechanical aspects of a unit for governing the program of temperature control within a building or other space.

As confirmed by many studies, substantial savings in energy usage may be obtained through appropriate adjustment of heating and cooling units to govern their operation in accordance with actual requirements. It has been demonstrated that the mere act of reducing a household thermostat level during sleeping hours can result in worthwhile savings in the cost and use of energy. Analogously, there may be other times during the total day in which adjustment of thermostat control advantageously could be modified in order to accommodate such things as level of activity, presence within the space concerned and the like.

It has long been known to associate a thermostat with a clock-actuated device which automatically turns down the temperature level sought during normal sleeping hours. Such devices typically are programmable only to the extent of allowing a manually fixed change of temperature that is applied to every day of the week.

It also is known, nevertheless, to program a given temperature-determining system by varying the energization of the controlling unit in accordance with selected time schedules. In addition, it has been recognized that electronic components are available for the purpose of replacing the mechanical clocks formerly associated with such controls and also to provide an illuminated display of the temperature conditions under observation and control.

Notwithstanding the aforementioned general recognition of the desire to be able to control temperature conditions within a space and the provision of time-controlled devices for automatically dictating changes in operation, that which has heretofore been suggested seems to have suffered from a lack of flexibility in its manner of control, substantial cost of implemention, and either complete dependence upon existing power sources or the need for a cumbersome auxiliary power source.

With the advent of the microcomputer contained within a very small package, it has become apparent that the control and operation of many different appliances and the like may be enhanced, both as to flexibility of control and efficiency, by incorporating the techniques associated therewith. Joined with other solid-state components for controlling significant amounts of power, the microcomputer has "opened the door" to an almost unlimited variety of improvements in various devices that previously were operated by means of mechanically-operated switches sometimes associated with such familiar apparatus as relays and solenoids for the purpose of ultimately handling the higher power levels involved with different machines and appliances.

It is a general object of the present invention to take advantage of the aforedescribed development of the art in order to provide a new and improved thermostat.

Another object of the present invention is to provide new and improved implementations of electronics circuitry advantageously usable in achieving the general objective.

A further object of the present invention is to provide a new and improved approach to thermostat control.

Still another object of the present invention is to provide a new and improved mechanical assembly for a thermostat and its systems.

In accordance with one aspect of the invention, a programmable thermostat includes a memory unit together with means for entering into that memory unit values of temperature desired at different times on different days of a week all individually and in various combinations of days and times involved. An output device controls one or both of heating and cooling systems. All operation is governed by a clock. Under control of the clock, the memory unit is addressed during the different times of the different days so as to provide a signal representative of the unit value for temperature. At the same time, existing temperature is sensed. That value signal is compared with the existing temperature level so as to develop an error signal. In response to the error signal, the output device is operated in an appropriate manner to reduce the magnitude of the difference between actual and desired temperatures. The invention also includes numerous details of improved circuitry and of housing for enclosing the circuitry and making the entire thermostat desirable for implementation and usage.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals and/or letters identify like elements, and in which:

FIG. 1 is a block diagram of a system embodying the present invention;

FIGS. 2-5 when taken together constitute a schematic diagram of circuitry for implementing the approach depicted in FIG. 1;

FIG. 23A is, from left to right, an end elevational view and a top plan view of a component represented in FIG. 5 and indicated in FIG. 14;

FIG. 23B is an enlarged side elevational view of another sub-component shown in FIG. 14 as mounted in a fragmentary segment of a substrate thereof;

FIG. 24 is, from right to left, a side elevational view and a top plan view of a cover plate assembled in place in FIG. 10 but there overlaid by a decal shown in FIG. 26;

FIG. 25 is a top plan view of a component the major portion of which is shown in FIGS. 9, 10 and 14 and another portion of which is shown in FIG. 22A, there also being one modification shown in FIG. 25 as compared with those earlier figures;

Figure 1:
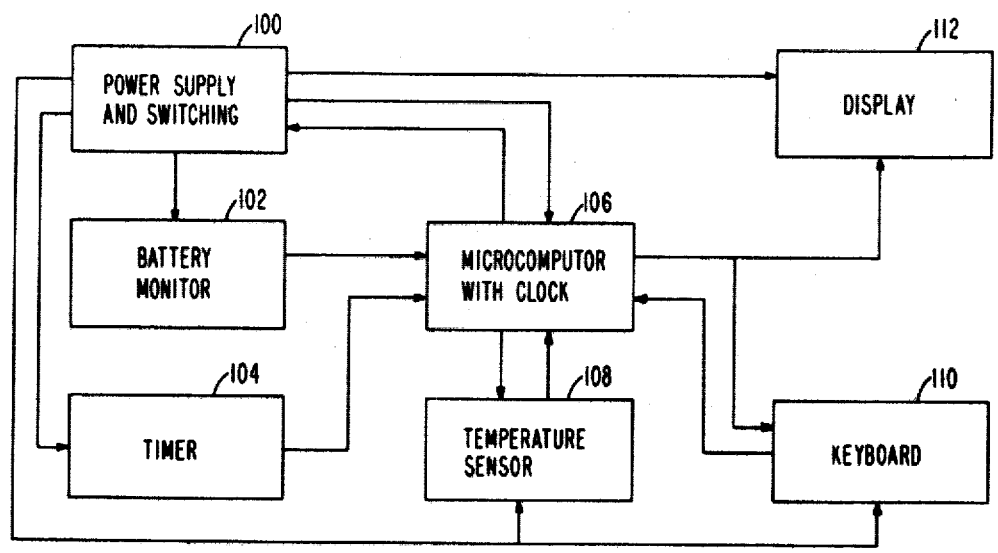
Figure 10:
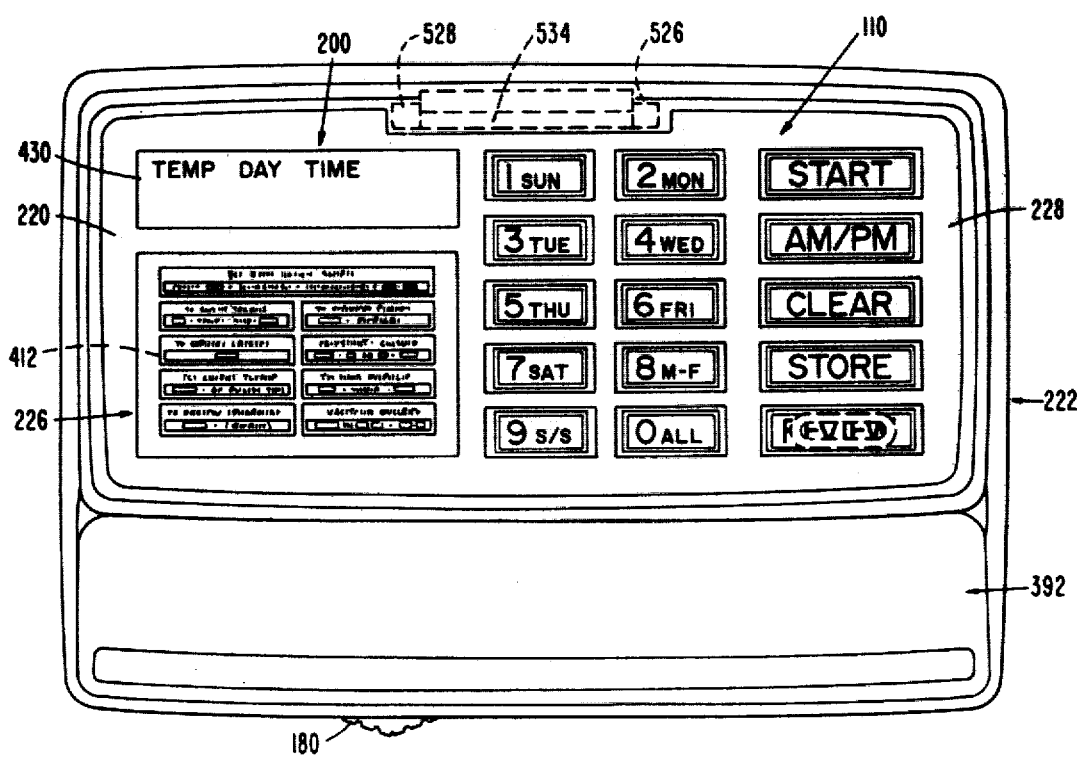
FIG. 10 is a top plan view of the thermostat shown in FIG. 9.
Figure 14:
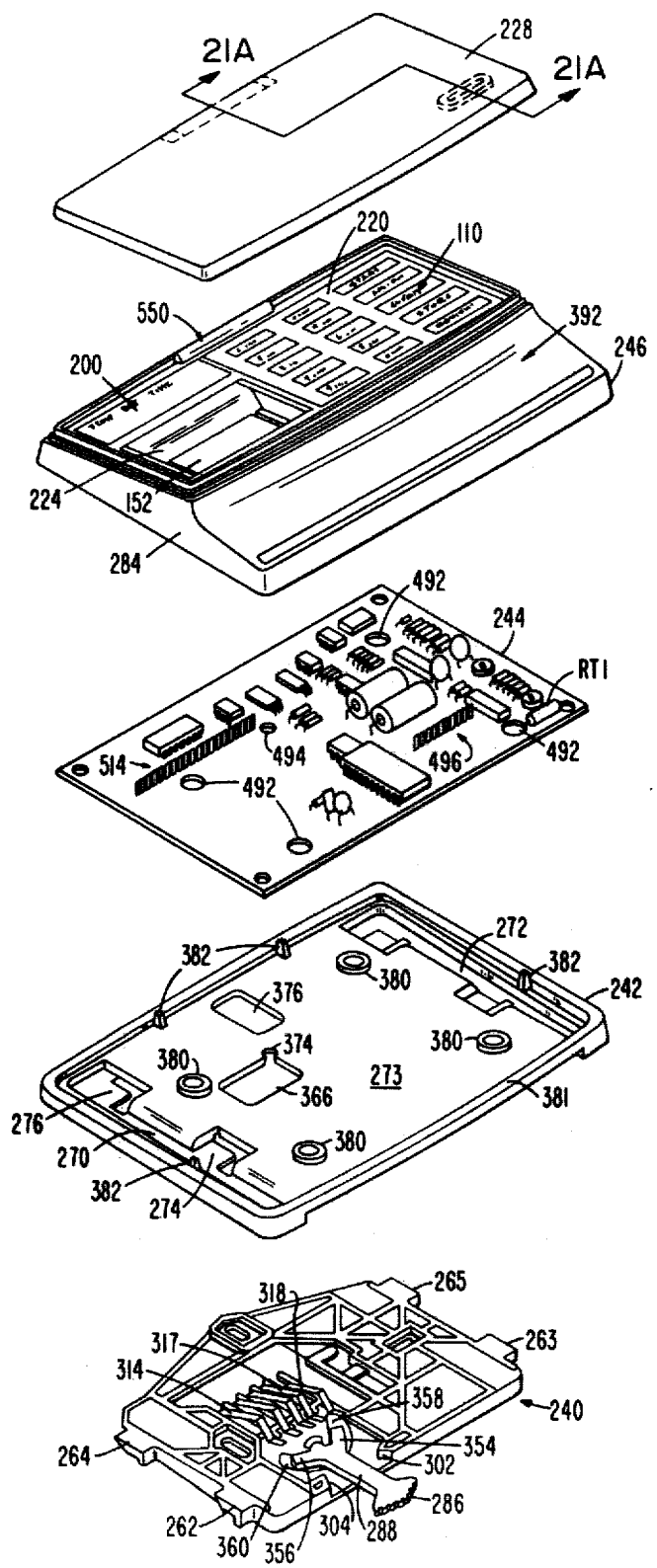
FIG. 14 is an exploded isometric view thereof, a battery cover shown in FIGS. 9 and 10 having been removed.

FIG. 26 is an enlarged plan view of a decal shown in FIGS. 1, 10 and 14 and mentioned above in connection with FIG. 24; and FIGS. 27 through 56 are flow charts setting forth statements and instructions for routines and subroutines that, when used together, enable the permanent programming or loading of the system presented in FIGS. 1 through 5 for the purpose accommodating user programming to be described.

Figure 9:
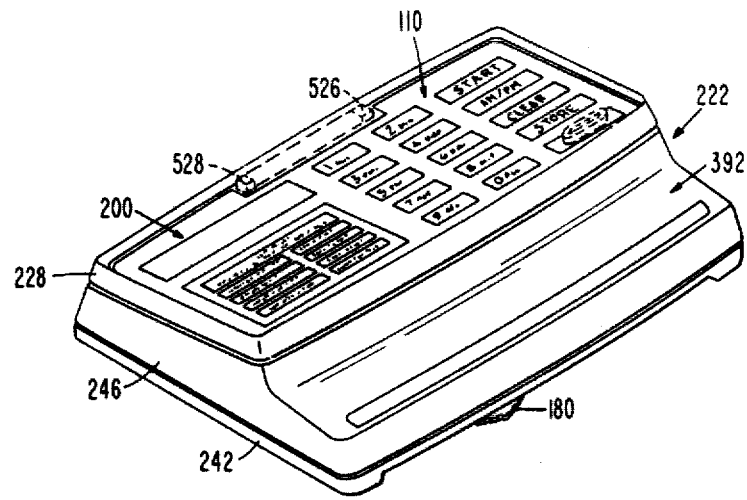
FIG. 9 is an isometric view of a programmable thermostat of the invention and contained within a housing, certain underlying components being visible through a transparent cover.

In the foregoing description of the figures the temrs "top" and "bottom" have reference to the thermostat in the orientation of FIG. 9 as, for example, sitting on a table. In use most of the time, the "bottom" of the thermostat usually will be face-to-face with a vertical wall.

FIG. 1 depicts an overall system. It includes power supply and switching circuitry 100, a battery monitor 102, a timer 104, a microcomputer and clock 106, a temperature sensor 108, a keyboard 110 and a display 112. As indicated, unit 100 has power, control or other connection to the remaining components of the system. In general, all of the illustrated "blocks" interact with each other. A detailed implementation of the system of FIG. 1 is depicted in FIGS. 2-5.

As specifically embodied in FIGS. 2-5, it is assumed that there is to be adaptation to a conventional heating and/or cooling apparatus which involves a twenty-four volt control system for operational purposes. That is, primary operating power for the particular embodiment disclosed herein is intended to be derived from an existing heating or cooling unit as normally would be available at the site desired for a thermostat. In addition, there would be present at that site wiring intended to energize a solenoid or the like which controlled operation of a furnace and there also may be wiring which would similarly energize an air cooler and, often separately, its fan or blower. In the conventional twenty-four volt control system for many heating and cooling units, the controlled solenoid is connected directly in series with the secondary winding of a step-down transformer. Consequently, only two wires between the controlled unit and the thermostat are necessary to permit both energization of the solenoid, by switching contained in the thermostat, and the supply of power from the transformer to the thermostat. While the specific embodiment is particulary configured to permit direct connection to that type of conventional system, its interfacing circuitry may readily be modified to accommodate other control arrangements that require three-wire or four-wire interconnection between the thermostat and the controlled unit.

In addition, other ultimate applications are available, and they may require modification. For example, the overall system might be adapted to govern a heat-control system that did not, in itself, provide necessary input power for the herein disclosed apparatus. In that case, of course, a separate transformer would be included between a power source and this apparatus. Also, the associated heating or cooling apparatus might not be subject to the normal twenty-four volt control system. An example would be now-conventional resistance-heated space-warming systems that operate from conventional building supplies at one-hundred-twenty or two-hundred-forty volts. In such a case, an adaptor unit would be interposed between that which is illustrated and the supply to the heating elements, typically involving relays or solenoids for switching higher levels of voltage and/or current. Alternatively, the comparatively low-power solid-state output switches hereinafter described would be replaced with higher-power devices. While not forgetting those clear alternatives, the description hereinafter will proceed on the basis of interface with an at least somewhat more ordinary heating or cooling system each of which employs two-wire twenty-four volt control and supply for primary operation and, perhaps, an added wire for separate blower operation.

Generally with regard to FIGS. 2-5, different individual components have been denominated by the use of nomenclature which has become conventional in the art. Thus, a capacitor is denoted by the letter "C" and a resistor by the letter "R". Additionally, numerous ones of the different components are incorporated within standard integrated circuits formed on so-called chips each of which includes a number of such components. Labeling has been employed to indicate which of those components are in common on the same chip. For example, the label IC3 is applied to several different components, as will hereinafter be individually identified, to indicate that they all are embodied herein as a portion of the same chip.

Throughout the drawings, various numerals appear adjacent to different terminals but without lead lines. These always refer to conventional manufacturer's designations with regard to the components concerned.

For example, within each rectangular block that represents a commercially-available component, there is a series of numbers; those are the pin numbers assigned as a standard practice with respect to such components. A lightening-flash symbol is used to indicate optical coupling to another component, and those two components will have the same "IC" designation.

Where a terminal is not otherwise denominated, connection as between different ones of FIGS. 2-5 may be traced by the use of a letter or number in one figure which corresponds with the same letter or number utilized in a related figure. In addition, various test points are indicated by terminals labeled with the symbol "TP" plus a number. These are for use in testing and servicing and will not be further mentioned.

Figure 2:
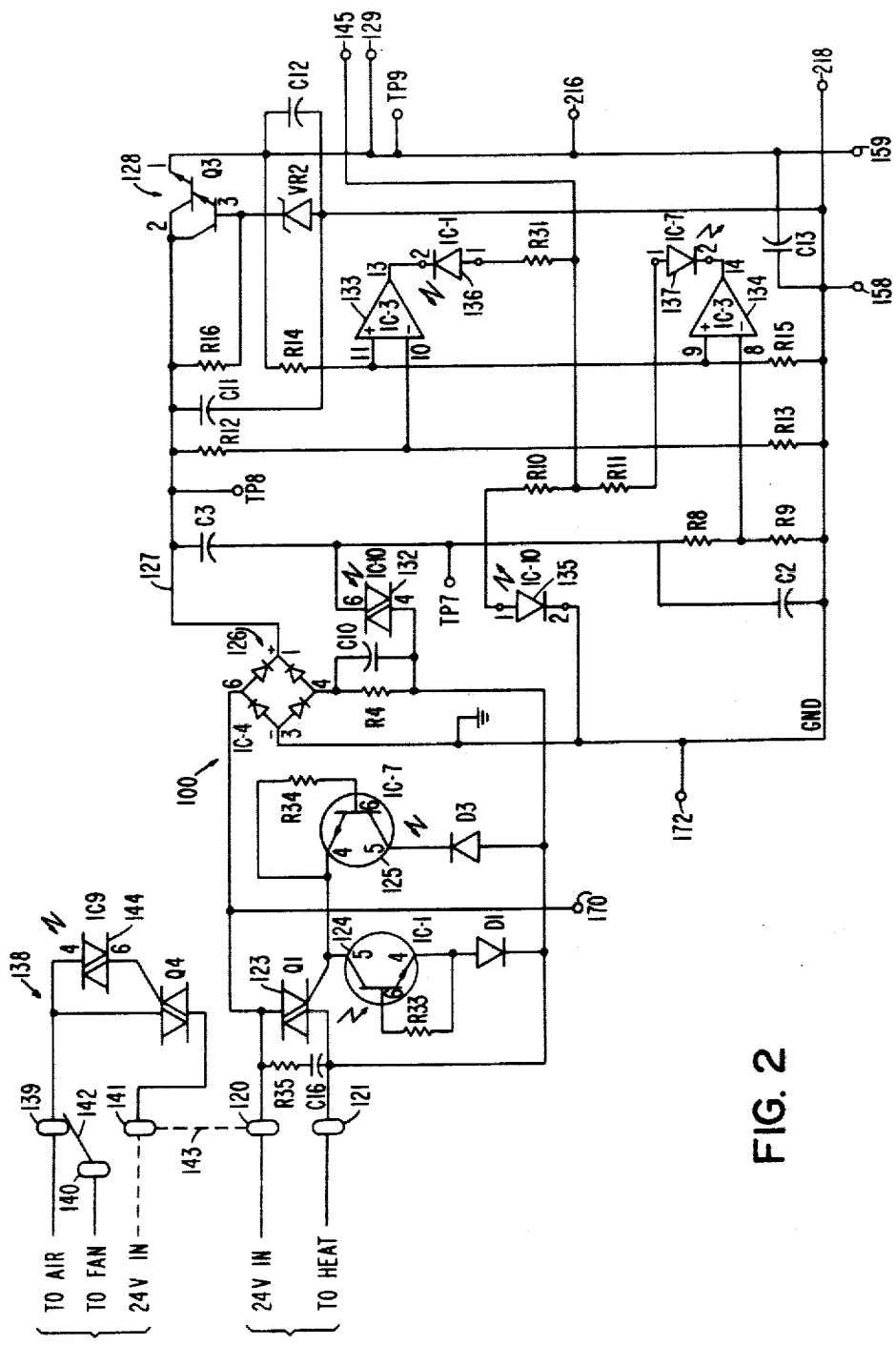

The power supply and switching arrangement 100 is detailed in FIG. 2. A terminal 120 connects to the available twenty-four volt source provided by the heating system, such as a furnace, to be controlled. A terminal 121 supplies a control voltage or signal back to the heating unit for enabling its energization. Typically, the signal from terminal 121 energizes a solenoid at the furnace which opens its main fuel supply or otherwise causes the heating unit to activate and develop its desired heat output.

Bridging terminals 120 and 121 is a TRIAC 123 the gate of which is connected to the collector of an opto-transistor 124 and the emitter of an opto-transistor 125. Also bridging terminals 120 and 121 is the series combination of a resistor R35 and a capacitor C16. In a known manner, these serve as a snubber network to prevent misfiring of TRIAC 123 by reason of the voltage-current phase relationships. The emitter of transistor 124 is returned to terminal 121 through a diode D1, and its base is connected to its emitter by a resistor R33. The collector of transistor 125 is returned through a diode D3 to terminal 121, while its base is connected back to its emitter by a resistor R34. Diodes D1 and D3 provide protection for transistors 124 and 125 against reverse bias. Also bridging terminals 120 and 121 are the input terminals of a bridge rectifier 126 in series with a resistor R4 that is shunted by a capacitor C10. The negative output terminal of rectifier 126 is connected to ground, while its positive output terminal is connected to a supply bus 127 that extends to the input terminal of a Darlington transistor 128. The output terminal of transistor 128 is connected to a terminal 129 and provides a sub-component supply voltage Vcc.

The input of transistor 128 (also Q3) is shunted by a resistor R16 and the input base is returned to ground (GND) or Vdd through a zener diode VR2. The output emitter of transistor 128 is coupled to ground over a capacitor C12. A capacitor C11 is coupled between the input side of transistor 128 and ground.

A capacitor C3 is coupled from bus 127 to ground through resistors R8 and R9 with the series combination of those resistors being shunted by a capacitor C2. Coupled to the junction between capacitor C3 and resistor R8 is one side of an opto-TRIAC 132 the other side of which is returned to output terminal 121. A pair of resistors R14 and R15 extend in series between the output of transistor 128 (Vcc) and ground. The junction between resistors R14 and R15 is connected to the plus inputs of each of comparators 133 and 134. The minus input of comparator 133 is connected to the junction between resistors R12 and R13 which form a voltage divider extending between bus 127 and ground. The minus input of comparator 134 is connected to the junction between resistors R8 and R9.

Three different opto-diodes 135, 136 and 137 are optically coupled to the input or gate of respective opto-TRIAC 132 and opto-transistors 124 and 125. Diode 136 is connected from the output terminal of comparator 133 through resistors R31 and R10 and diode 135 to ground. Diode 137 is connected from the output terminal of comparator 134 through a resistor R11 to the junction between resistors R10 and R31. The different Vcc leads, such as through terminal 129, are coupled to ground by a capacitor C13 connected physically close to the Vcc terminal of microcomputer 106.

Figure 4:
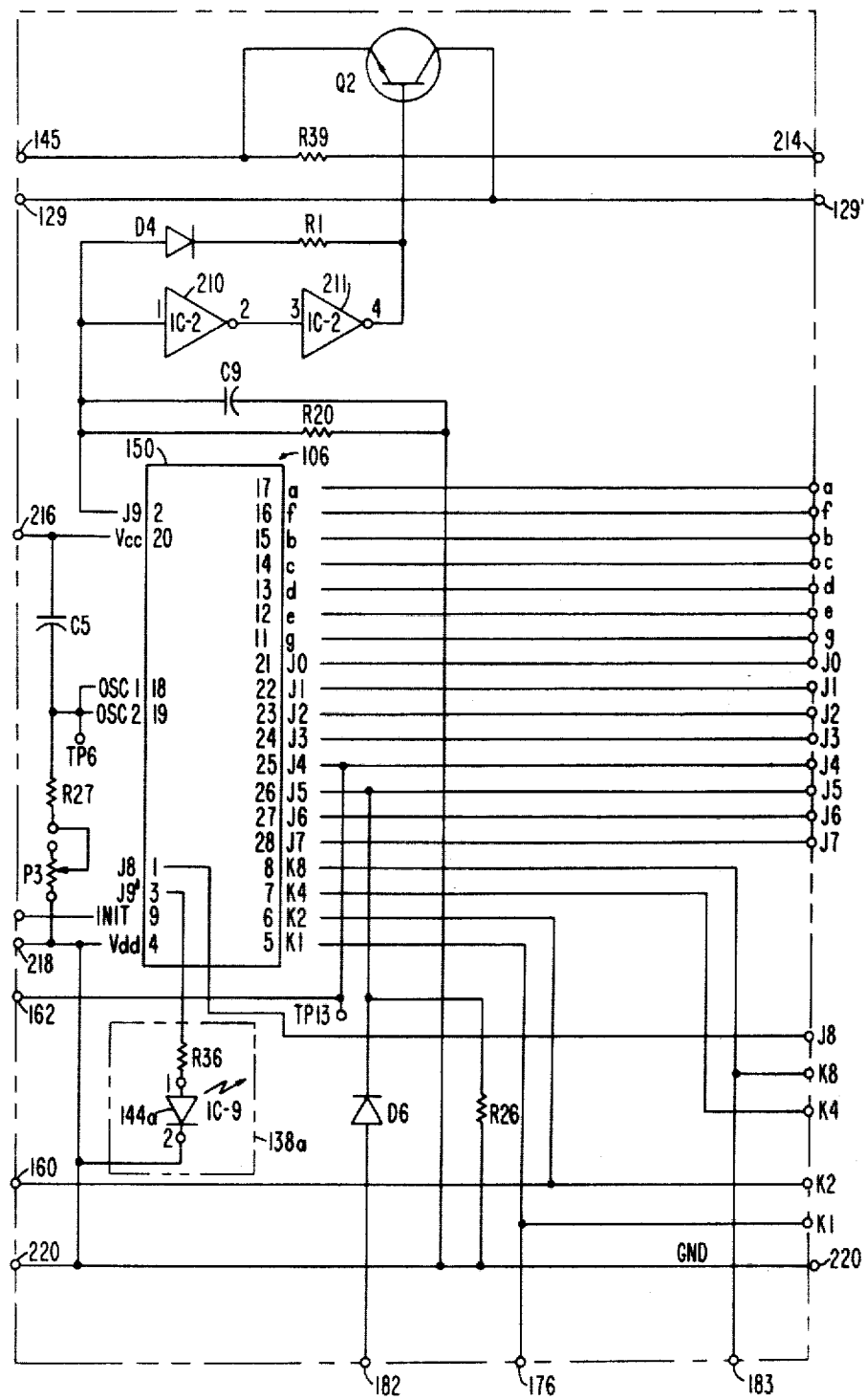
FIG. 4A is a schematic representation of a subcomponent included within a component shown in FIG. 4.
FIG. 4B is a schematic diagram of an alternative for a portion of the circuitry shown in FIG. 4.

When control of an air conditioner is desired in addition to control of a furnace or other heating unit, unit 100 includes a module 138 which presents output terminals 139, 140 and 141. Terminal 139 supplies power to run the air conditioner, and terminal 140 separately supplies power to the fan of that air conditioner. A switch 142 may be closed to bridge terminals 139 and 140 when operation of the fan is to be automatic and to bridge terminals 140 and 141 to command continuous fan operation. Terminal 141 receives the conventional twenty-four volt control potential available from such an air conditioner or, in the alternative, is connected by a jumper 143 so as to be connected to the twenty-four volt input available from the heating unit. Connected between terminals 141 and 139 is a TRIAC Q4 the gate of which is returned through an opto-TRIAC 144 to terminal 139. The optical-input gate of TRIAC 144 is coupled to an opto-diode 144a (FIG. 4).

Operation of the power supply and switching system of FIG. 2 is enabled by a signal which arrives through a terminal 145 that is connected to the junction between resistors R10 and R31. The system is designed so that approximately eighty-five percent of the available power input is transferred through TRIAC 123 for purposes of energizing the solenoid or other actuator in the furnace. At the same time, the amount of monitoring power required by the system is sufficiently low to avoid false actuation of the furnace solenoid.

When the system of FIG. 2 is in the "off" mode, rectifier 126 still changes the twenty-four volt alternating-current input into direct current. In this mode of operation, all of the optically-coupled devices are disabled. The output direct current from rectifier 126 is stored across the combination of capacitors C2 and C3. Regulation of the output voltage is achieved by means of the series combination of resistor R16 and diode VR2. In conjunction with Darlington transistor 128, of course, the output circuit exhibits a high gain, so that a substantial degree of voltage stability is obtained. Accordingly, the internal operating potential Vcc is available during the "off" mode of operation for energizing all of the other components and sub-systems.

The "on" mode of operation serves to fire TRIAC 123 and thus deliver the twenty-four volt alternating-current supply voltage directly on to the heater solenoid or other activator that controls operation of the furnace or other source of heat. When TRIAC 123 is fired to supply the output operating potential to the heating unit, it is still necessary that power be maintained in the controller as developed by rectifier 126. To this end, TRIAC 123 is triggered part way into each half cycle of supplied input power and after charging capacitors C2 and C3.

Comparators 133 and 134 are used to monitor the voltages across capacitors C2 and C3. For effective operation with a regulated output voltage Vcc of nine volts, typical operation requires that the voltage on C3 available at the input terminal of transistor 128 should rise to approximately twenty volts at the beginning of each half wave. This allows the current drain of the unit to discharge capacitors C2 and C3 during the remainder of each half wave without affecting the regulated output voltage Vcc.

The voltage divider established by resistors R14 and R15 serves to supply comparators 133 and 134 with a reference voltage, in the instant system of approximately 4.5 volts. The enabled input through terminal 145 is in a "high" state when heating is demanded.

Figure 6:
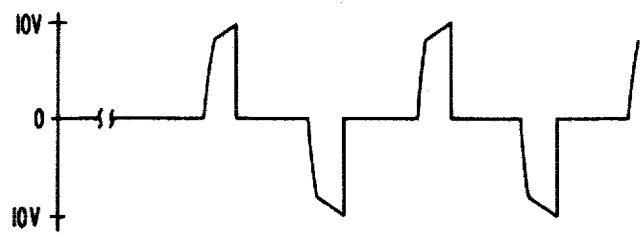
FIGS. 6, 7 and 8 depict waveforms of various signals appearing within the circuitry.

The waveform as exhibited across TRIAC 123 is shown in FIG. 6. As the potential increases on each negative half-wave, current is enabled to flow through TRIAC 132 in order to charge capacitor C2, the return being established to the other side of the incoming alternating-current line through rectifier 126. The divider established by resistors R8 and R9 is selected so that, when capacitor C2 is charged to ten volts in this example, the voltage on the negative input of comparator 134 becomes equal to the reference voltage of 4.5 volts. When capacitor C2 becomes fully charged, during the negative half wave of the input cycle, to just above ten volts, the output of comparator 134 switches to "low". That allows current in the enabling signal through terminal 145 to flow through resistor R11 and light-emitting-diode (LED) 137.

As indicated above, diode 137 is an opto-coupler, such as a 4N30, of which transistor 125 is an optically-coupled part. During the negative half wave of the incoming power, the "low" side of the effective alternating-current line is positive with respect to the gate of TRIAC 123. Accordingly, when capacitor C2 is charged to just above the ten-volt level mentioned, comparator 134 switches its output state. Current then is allowed to flow through diode 137 and the optical output from diode 137 activates transistor 125, so that current flows through the latter and diode D3 into the gate of TRIAC 123. That triggers or fires the latter and achieves the ultimate result of connecting terminals 120 and 121. At this point, capacitor C2 discharges to a value below ten volts. That deactivates diode 137 and allows TRIAC 123 to reset to its open state on the next zero crossing of the waveform.

On the positive half wave of each cycle of the input alternating-current supplied, current flows through rectifier 126 and begins to charge capacitor C3. That current flows through opto-TRIAC 132 back to the "low" side of the alternating-current input system. The divider of resistors R12 and R13 establishes a reference such that, when the voltage level on bus 127 reaches twenty volts, the output of comparator 133 switches to a "low" state. With capacitor C2 charged as described previously, C3 is then charged to a value of ten volts to cause comparator 133 to switch to "low" and draw current through terminal 145 by way of resistor R31 and light-emitting diode 136. The optical emission from the latter is coupled into its associated transistor 124, so as to cause the triggering of TRIAC 123 by allowing current to flow from the gate of the latter through transistor 124 and diode D1. Shortly after TRIAC 123 is triggered, the output of comparator 133 switches to "high" and, thereby, allows TRIAC 123 to once more reset on the next zero crossing.

During operation on either half cycle, light-emitting diode 135 is triggered by the signal received over terminal 145, so as to activate its associated TRIAC 132 by means of the optical coupling between those two elements. It will be observed that the system of FIG. 2, including capacitors C2 and C3, is actually a voltage-doubling network that utilizes what amounts to approximately ten volts of the input alternating-current waveform on each half cycle to achieve a total of about twenty volts applied to the regulation system which includes diode VR2 and transistor 128. Resistors R33 and R34 preferably are included merely as noise suppressors so as to prohibit false triggering of transistors 124 and 125.

Referring again to FIG. 6, it may be seen that a favorable short-term instability occurs. The first two or three cycles of the alternating-current waveform that occur after the signal received through terminal 145 goes "high" are entirely shunted across the system. That occurs because the total voltage across the combination of capacitors C2 and C3 prior to that "high" signal is equal to the peak voltage of the alternating-current input which, in the example given, is approximately thirty-five volts. Therefore, the outputs of comparators 133 and 134 remain "low" until capacitors C2 and C3 discharge to the desired level.

At the heart of the overall temperature control system herein under description is a microcomputer 150 as shown in FIG. 4. While its function will be described in more detail hereinafter, it may be noted that it supplies, from a terminal 2, the signal which, after processing also yet to be described, provides the enable control signal fed through terminal 145 to the unit of FIG. 2 that has just been discussed.

For the purpose of operating module 138 to achieve control of an associated air conditioning unit, microcomputer 150 also yields an enable output at its pin 3 that is fed in series through a resistor R36 and LED 144a which is returned to ground. LED 144a is optically coupled to control the operation as a gate input of TRIAC 144 in module 138. Upon the occurrence of a "high" from microcomputer 150, therefore, TRIAC 144 supplies a signal to the gate of TRIAC Q4, so as to apply the basic twenty-four volt control potential from terminal 141 to terminal 139.

LED 144a and resistor R36 are included in a module 138a. With operation using a REVIEW pushbutton and a permanent program loaded into microcomputer 150 as described below, actuation of that pushbutton temporarily disables LED 144a and, thus, operation of the air conditioner. When that function is not desired, the permanent program may be changed accordingly, so that LED 144a stays on during the review procedure. Alternatively, the circuit of a module 138a', as shown in FIG. 4B, is substituted for module 138a.

In FIG. 4B, LED 144a is again connected between ground at a terminal 220 and one end of resistor R36. The other end of resistor R36 is connected through a diode D15 to receive the output from the output terminal J9' at pin 3 of microcomputer 150. Extending also from that pin 3 is the series combination of a resistor R40 and a capacitor C17 that returns to ground. Connected to the junction between resistor R40 and capacitor C17 is one input of a comparator 146 the other input of which is connected by a terminal 148 to a ground return through a resistor R32 from a pin 11 of a display driver 164 described more fully below. The output of comparator 146 is connected to the combined inputs of paralleled comparators 147a and 147b, their combined outputs being connected through a diode D17 to the junction between resistor R36 and diode D15. Those combined outputs also are connected through the series combination of a diode D16 and a resistor R38 back to the junction between resistor R40 and capacitor C17. Another comparator 149 on the same chip with the others is disabled by connecting both of its inputs to ground. Energization of the comparators is by way of a connection to terminal 216, as indicated, and a ground return.

Also added along with module 138a' is a resistor R26 connected between ground and an output terminal J5 at pin 26 of microcomputer 150, along with a resistor R30 connected between output pins 17 and 22 (Vcc) of driver 164. In operation, LED 144a continues to be energized as before when a "high" occurs on output pin 3 of microcomputer 150, and that signal also is stored on capacitor C17. When that output goes "low" as driver 164 is activated, the changed level on terminal 148 enables energization of LED 144a through diode D17. The latter condition is latched on by diode D16 which holds the signal on capacitor C17.

It is believed to be desirable that the components of module 138, separately or together with resistor R36 and diode 144a as module 138a (or with module 138a') be physically incorporated into the overall arrangement as at least somewhat separate sub-assemblies. This permits the overall system to be manufactured without modules 138 and 138a (or 138a') for use in the application of controlling only a heating unit. When the additional control of air conditioning or cooling also is desired, however, it will be immediately apparent how easily and inexpensively it is to add these other modules so as to employ the same overall system to accomplish that additional function of control.

As is now generally known with respect to the implementation of microcomputers such as unit 150, they establish an operating procedure which first of all is ordained by their specific design and also is established by "loading" or permanent programming at the factory level, so as to exhibit a defined response to ultimate changeable programming by the user. In terms of information-handling capability, a single solid-state microcomputer can perform tasks previously assigned literally to a roomful of computer apparatus. Perhaps the only drawback of the present day microcomputer is that its user-supplied variable storage of input information is subject, by reason of its manner of approach, to complete erasure upon loss of supply power to this fantastic device. Thus, a user program of temperature control entering into microcomputer 150 could be lost during a power shortage when the normal supply potential at terminal 120 was terminated. Also, dependence upon the supply at terminal 120 would prohibit any kind of remote use of the unit herein under discussion.

To overcome the just-mentioned lack of permanent user-programmable storage in microcomputer 150, the present system includes a battery and monitoring circuit therefor as shown in FIG. 3. At the outset, the arrangement of FIG. 3 includes a battery 152 in series with a reverse-bias-protecting diode D2 and with that series combination being connected between ground and the wiring which carries the internal supply voltage Vcc. Without more, battery 152 serves to insure that the internal component-supply voltage is maintained regardless of the development in unit 100 of that same internal supply voltage by way of rectifier 126. The power available from battery 152 serves to maintain microcomputer 150 in its condition of preserving a user-program whenever the incoming external supply voltage is interrupted and whether intentionally or not.

Of course, any battery is subject to deterioration over a period of time even if never used. In accommodation, the system in FIG. 3 serves to monitor the battery voltage and provide a necessary signal to microcomputer 150 to indicate the impending failure of the battery. To this end, a series of components are distributed so as to extend basically between a Vcc bus 154 and ground. Thus, a voltage divider composed of resistors R5 and R6 extends between bus 154 and ground, resistor R6 being bypassed to ground by a capacitor C6 and resistor R5 being bypassed by a diode D14. The junction between resistors R5 and R6 is connected to the negative input terminal of a comparator 155. That junction is also connected through a resistor R22 to the collector of a transistor Q6 the emitter of which is returned to ground and the base of which is connected through resistors R21 and R28 to bus 154.

Another voltage divider, composed of series-connected resistors R2 and R3, is connected from the junction between battery 152 and diode D2 back to ground. In turn, the junction between divider resistors R2 and R3 is connected to the negative input terminal of a further comparator 156. A transient suppressor TS1 is shunted across the overall combination of resistors R2 and R3 for protection from static electricity discharged into the battery terminals. Also bridged between bus 154 and ground is the series combination of a resistor R7 and a zener diode VR1, with the junction between resistor R7 and zener diode VR1 being connected to the positive inputs of comparators 155 and 156.

The output terminal of comparator 155 is connected between the junction between resistors R21 and R28 and from there through a diode D9 and a terminal 157 to the initiating (INIT) terminal 9 of microcomputer 150. A capacitor C14 is shunted between terminal 157 and ground through a terminal 158. Bus 154 is connected through a terminal 159 into the Vcc lead. The output terminal of comparator 156 is connected through a diode D8 and through a terminal 160 to an input terminal K2 of microcomputer 150. The output from comparator 156 also is connected through a resistor R29 and a terminal 162 to an output terminal 25 (J4) of microcomputer 150 for the purpose of providing a momentary sensing of battery condition when output terminal 25 is in the "high" state.

In the monitor as shown in FIG. 3, it is comparator 156 which is used to detect the low-battery condition. With the output from terminal 25 of microcomputer 150 set to a "high", a reference level is established on the output of comparator 156 and against which that comparator must work. Battery voltage is divided by resistors R2 and R3 and appears on the negative input of comparator 156. The relative values of resistors R2 and R3 are selected such that, if the battery voltage is above a predetermined amount, about seven volts, the voltage at that negative input of comparator 156 is above the lower voltage established by diode VR1, so that the comparator output is maintained in a "low" state. When, however, the battery voltage drops below the predetermined value, the negative input to comparator 156 falls below the threshold established by diode VR1 on the positive input of that comparator. Consequently, the output of the comparator then is pulled "high" through R29 connected to terminal 25 of microcomputer 150, and that "high" appears as an input at terminal K2.

Diode D8 serves as a reverse-bias protection against an input from keyboard assembly 110 to be described. Before discussing keyboard 110 and display 112 in detail, it may be noted that, if a logic one is detected on the input K2 from keyboard assembly 110 to terminal 6 of microcomputer 150, while the signal from terminal 25 of microcomputer 150 is high, the program is set up to display a warning to the user that the battery should be changed. That warning is visibly indicated on display unit 112 upon depression of either one of START or REVIEW pushbuttons yet to be discussed.

Figure 5A:
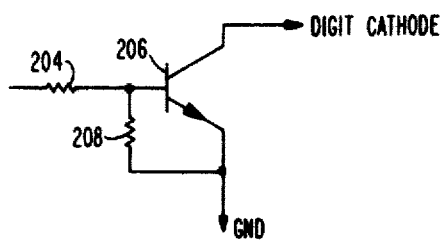
FIG. 5A is a schematic diagram of a circuit included within a component shown in FIG. 5.
Figure 5:
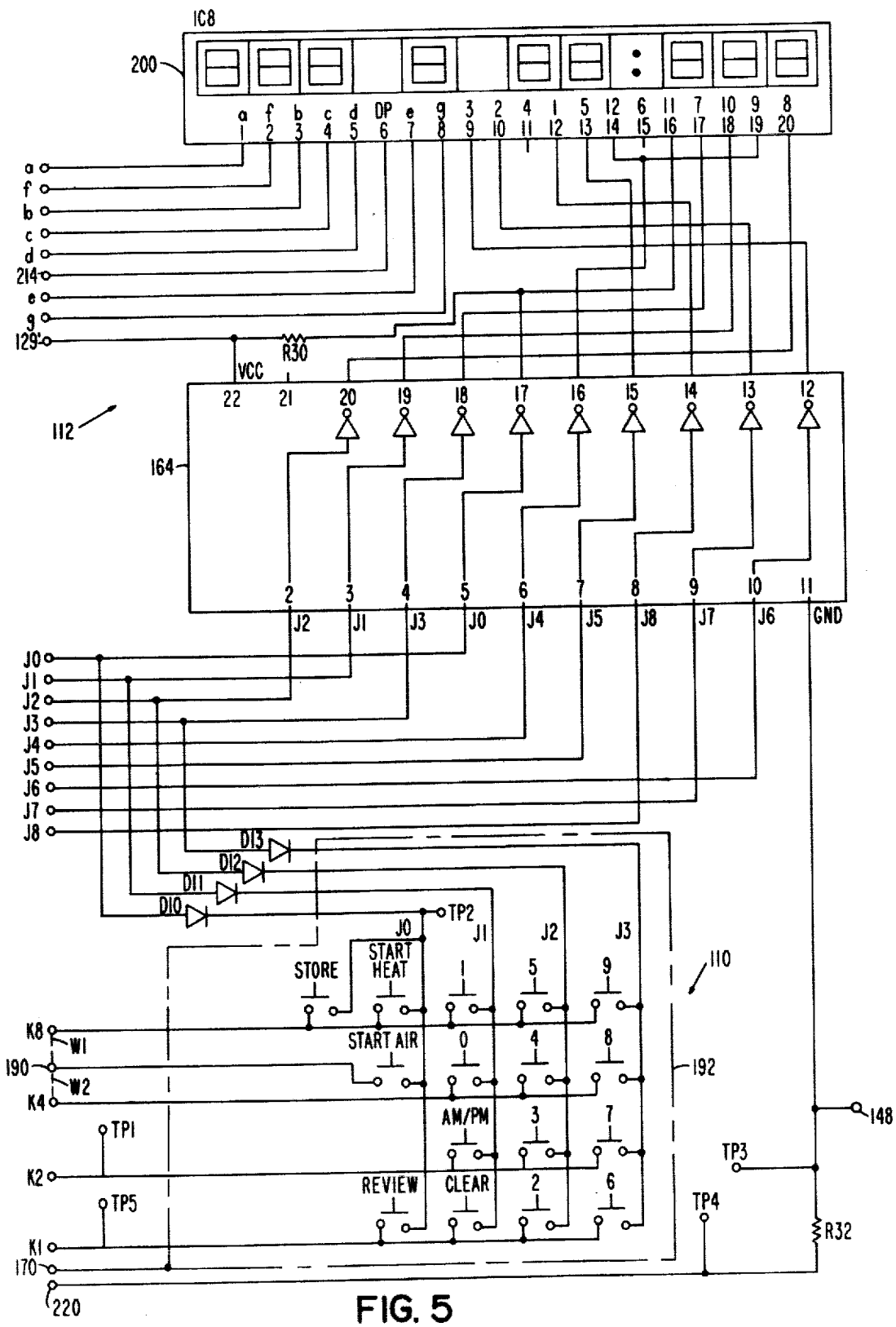

In operation, the "high" signal from terminal 25 of microcomputer 150 occurs only about once every four seconds during normal use and for a period of time sufficient only to enable the operation of the battery monitoring function. As indicated in FIGS. 4 and 5, that output from terminal 25 also is utilized as a drive signal connected at J4 of display driver 164. Diode D2 serves to prevent the supply voltage from affecting the reading by the monitoring of battery voltage and also prevents charging of the battery.

Comparator 155 continually monitors the supply voltage available to microcomputer 150. With a specified minimum supply voltage for the particular microcomputer employed, the microcomputer may continue to run at a lower voltage but will not necessarily follow the program contained in its read-only memory (ROM). It is, therefore, important that microcomputer 150 be held in a reset mode in case of the existence of a below-minimum supply voltage. To this end, resistors R5 and R6 divide the voltage between ground and bus 154 in order to supply the negative potential to comparator 155. The values of resistors R5 and R6 are selected such that, when the supply voltage equals the specified minimum, the potential present on the negative input of comparator 155 is slightly less than that established by the voltage regulating action of zener diode VR1. When, however, the supply voltage is below the established minimum limit, the output of comparator 155 is held "high" through resistor R28. That circumstance forces microcomputer 150 to a reset mode by way of the connection through diode D9 to terminal 9 of microcomputer 150. At the same time, there is an additional connection to ground resistor R5 by way of transistor Q6 which is turned on when the output of comparator 155 goes "high". The overall effect is to set microcomputer 150 into a reset mode until such time as the supply voltage returns to a value sufficiently above the established minimum level by about 0.3 volt.

It will be noted that the resetting of microcomputer 150 can only occur at such time as the incoming twenty-four volt alternating-current supply is lost and operation is being maintained from battery 152. Incidentally, capacitor C6 also is included so as to initiate the reset condition upon the initial supply of power in energization of the overall unit. Finally, comparator 155 is depicted as having a direct connection to bus 154, and comparator 156 is shown to have a direct connection to ground. These are the common power supply connections for all of the comparators on a chip IC3.

Turning now to timer 104 as also shown in FIG. 3, it develops a sixty Hertz square wave used by microcomputer 150 in order to keep track of time. A sample of the input alternating-current waveform as received at terminal 120 (FIG. 2) is conveyed by way of terminal 170 through a zener diode VR3 and a capacitor C7 to the input base of a transistor Q5. The junction between diode VR3 and capacitor C7 is shunted to ground by way of the parallel combination of a resistor R41 and a capacitor C8 through a terminal 172.

The collector of transistor Q5 is connected to bus 154 which extends to a power terminal shown on an inverter 174. Analogously, a terminal on an inverter 175 is connected to ground. These are the common power supply terminals for all of the inverters on a chip IC2. A capacitor C15 shunts bus 154 to ground.

The emitter output of transistor Q5 is connected to the input terminal of inverter 174 and the output terminal of that inverter is, in turn, fed to the input terminal of inverter 175. The latter has its output terminal connected through a diode D5 to a terminal 176 which, as will be seen in FIG. 4, is connected to a microcomputer input pin 5 or K1 to which a terminal of keyboard 110 also is connected. The output of inverter 175 is fed back over a capacitor C1 to the input of inverter 174, and inverter 174 is bridged by the series combination of a resistor R37 and a potentiometer P1.

Inverters 174 and 175 serve together as associated components of a free-running oscillator that is set to perform at sixty Hertz by means of adjustment of potentiometer P1. Because temperature variations may induce a drift in that pre-set frequency, the free-running mode of operation of timer 104 is used only during periods of power loss at terminal 120 (FIG. 2). When supplied alternating-current power is available at terminal 120, the operation of timer 104 is synchronized to the incoming waveform sampled through capacitor C7.

Figure 7:
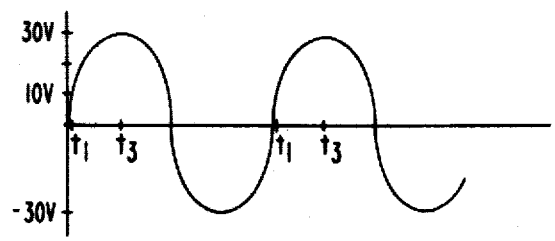
Figure 8:
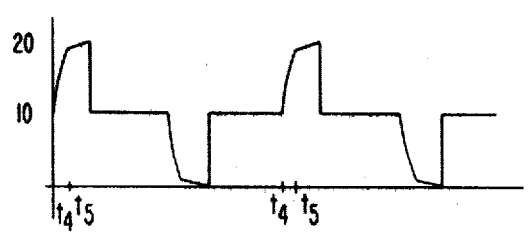

The waveforms present at the cathode of diode VR3 are shown in FIGS. 7 and 8. FIG. 7 depicts the waveform whenever the overall heating system is in the "off" mode. At the time represented by t1, the input voltage has risen slightly to the value at which diode VR3 begins to conduct. From the time t1 to the time t3, at the peak of the sine wave, the voltage developed across resistor R41 and capacitor C8 builds up in accordance with the waveform. The differential of that waveform is conveyed over capacitor C7 to the base of transistor Q5, so as to enable conduction of that transistor and cause charging of capacitor C1 to the supply voltage. The latter occurrence forces the output of the resulting oscillator circuitry to be synchronized to the incoming line frequency.

When the overall heating system is in its "on" mode, the voltage waveform presented at the cathode of diode VR3 is generally that shown in FIG. 8. In this manner of operation, conducting of transistor Q5 occurs from a time t4 through a time t5. As a result, the oscillator again is synchronized to the sixty Hertz incoming line frequency. Output diode D5 preferably is included in order to prevent destruction of another signal that is present on microcomputer input terminal K1 when the oscillator output is low.

Being temperature responsive, the overall system, of course, requires temperature sensor 108. To this end, a temperature-dependent oscillator arrangement includes series connected inverters 180 and 181. The input to inverter 180 is enabled through a terminal 182 and a diode D6 connected to an output terminal at pin 26 or J5 of microcomputer 150 as shown in FIG. 4. The output of inverter 181 is connected through a diode D7 and through a terminal 183 back to pin 8 or K8 of microcomputer 150, which pin also is connected to a terminal of keyboard 110 as indicated in FIG. 5.

The input of inverter 180 is connected to the series combination of a resistor R17 and a capacitor C4 to the output of inverter 181. The junction between inverters 180 and 181 is connected to the junction between resistor R17 and capacitor C4 by the series combination of a resistor R18, a potentiometer P2 and a resistor R19. Most importantly, resistor R19 is shunted by a thermistor RT1.

Inverters 180 and 181, together with the associated components, constitute another oscillator. Its frequency is determined by the combined values of potentiometer P2, resistors R18 and R19 and thermistor RT1 along with capacitor C4. Resistors R18 and R19 serve to linearize the operation of thermistor RT1 over the desired temperature range.

When the output from microcomputer 150 as presented at terminal 26 is "high", sensor 108 is enabled. The number of pulses which end up appearing as an input to terminal 8 of microcomputer 150 (protected by diode D7) are counted over a full number of sixteen cycles of pulses as received by the microcomputer from timer 104. By mathematical manipulation in the permanent program, as will be apparent later, that count is used to determine the ambient room temperature and to enable decisions to be made as to enablement or disablement of either the heating or air conditioning systems that are ultimately controlled. For the present system, that which has been illustrated may be specified to an accuracy of less than plus or minus one degree Fahrenheit over a range extending between fifty degrees Fahrenheit and eighty-nine degrees Fahrenheit.

As shown on the lower portion of FIG. 5, keyboard 110 is composed of a four-by-four matrix of normally-open switches that are pushbutton operated. Six of the switch pushbuttons are labeled in that figure with the terms STORE, START HEAT, START AIR, REVIEW, CLEAR, AND AM/PM. The remaining buttons respectively are marked with the numbers zero through nine and also, as can be viewed in FIG. 10, have lettering which, as will be further discussed below, corresponds to different ones of the days of the week and different combinations of such days.

The matrix includes columns J0, J1, J2 and J3, together with rows K1, K2, K4 and K8. The buttons are distributed so as individually to bridge the respective different intersections within the array with two exceptions as shown. That is, both the STORE and the START HEAT buttons bridge the intersections between the column J0 and row K8, and the START AIR button bridges between column J0 and a terminal 190. When the thermostat system is to be incorporated into a model used only for the control of heating, a jumper W1 is connected between terminal 190 and row K8. When, on the other hand, the system is to be used to control both heating and air conditioning, jumper W1 is removed and a jumper W2 is instead connected between terminal 190 and row K4. In the first alternative when the system is utilized only for the control of heating, only one of the two START buttons needs to be included. Preferably, however, they are paralleled by being placed side-by-side to form a physically larger START button.

As will be apparent, columns J0 through J3 are individually connected through respective diodes D10 through D13 to the correspondingly labeled output terminals of microcomputer 150 as shown in FIG. 4. Similarly, rows K1, K2, K4 and K8 are connected to the correspondingly labeled input terminals on microcomputer 150 also as shown in FIG. 4.

The arrangement permits multiplexing of the involved outputs from microcomputer 150, while scanning of the inputs K1, K2, K4 and K8 is used to determine which button has been depressed. The arrangement within the microcomputer is such that only one of the designated outputs is enabled at any given instant, and only when one of those outputs is enabled are the K inputs scanned. Diodes D10-D13 serve to prevent any signals on the K input lines from being fed back into display driver 164.

Keyboard 110 also preferably includes an overlying conductive shield 192 that is connected through a terminal 170 back through the terminal of the same number of FIG. 2 so as to be coupled directly to the twenty-four volt alternating-current supply at terminal 120. However, shield 192 is not exposed to the user. It allows any discharge of static electricity to be dissipated harmlessly into the input supply transformer. Without shield 192, static could discharge through the keyboard into microcomputer 150, possibly causing permanent damage.

Display 112 includes display driver 164 and a display device 200. Display driver 164 as herein specifically implemented is a DS8872 integrated circuit chip as conventionally designated. Its input terminals as externally designated by the symbols J0 through J8 are connected to the correspondingly labeled output terminals of microcomputer 150 as shown in FIG. 4. As mentioned above, its pin 11 is returned to ground through resistor R32 and terminal 220 to the ground path depicted at the bottom of FIG. 4. Display driver 164 is basically a series of buffers that also function as inverters in the manner specifically illustrated. FIG. 5A depicts the typical circuitry of each of those buffer-inverters. Thus, each J input terminal of the driver is connected through a resistor 204 to the base of a transistor 206 the collector of which leads to a digit cathode in display device 200. The emitter of transistor 206 is returned to ground, and the base and emitter are shunted by an input resistor 208. Pin 22 of driver 164 is connected to Vcc through a terminal 129.

As particularly implemented herein, display device 200 is a so-called display stick of a twelve-digit type, such as that under the commercial designation 5082-7445C. Counting from the left in FIG. 5, its fourth and sixth digits are not utilized, and its ninth digit actually is a colon while all of the others are conventional seven-segment arrays of light-emitting diodes, so as to be able to define either numbers or letters in the normal manner. It is intended that the first three digits from the left indicate whether in a heating or air cooling mode and temperature, such as H72 or A72. The fifth digit indicates the day of the week as arbitrarily assigned but later assumed herein to be a representation of Sunday as a "1" through the following Saturday as a "7". The remaining digits used present the time, such as "10:30A" for ten-thirty in the morning.

The lower line of numbers on device 200 as drawn in FIG. 5 once again are the conventional pin numbers assigned by the manufacturer of the component. Immediately above the row of pin numbers is another row which sets forth either the segment anode letter or the digit cathode number. As usual, the segment anode letters indicate the terminals which need to be energized to select display segments within each unit of the display, and the digit cathode numbers refer to which display units within the overall device are to be energized. Hence, there are no connections to units four and six which, as indicated, are intended to remain unused.

Accordingly, the seven different terminals assigned to segment determination are labeled "a" through "g" and are connected to receive that output information from the correspondingly-labeled output terminals on microcomputer 150 in FIG. 4. For selectively enabling the various cathodes, the various pins numbered 12 through 20 in driver 164 are individually connected appropriately to display device pin numbers 9, 10, 12, 13, 14, 16, 17, 18 and 20, with driver pin 16 also being connected to device pin 19. There is no separate connection to the ninth display unit, the colon of that display being illuminated automatically whenever the last digit is displaying either an "A" or a "P". The decoding for the input lines "a" through "g" is determined within microcomputer 150.

It will be recalled that, in the discussion of the switching system of FIG. 2, an ultimate command-to-operate or enable signal is derived from the sub-system of FIG. 4 and delivered to the sub-system of FIG. 2 through a terminal 145. That command signal appears at an output J9 (terminal pin 2) of microcomputer 150 as shown in FIG. 4. To achieve almost instant triggering of TRIAC 123, while delaying its return to a non-conductive state for a minimum period following termination of the command signal at output terminal J9, the output is connected from the latter and fed through a network which includes the series combination of inverters 210 and 211. The latter drives the base of a transistor Q2 operated in the emitter-follower mode, so as to provide an ultimate command signal from its emitter through terminal 145 to the junction between resistors R10 and R11 in FIG. 2. That same command signal also is fed through a current limiting resistor R39 and a terminal 214 to the decimal point segment terminal DP at pin 6 of display device 200. In operation, therefore, illumination of the decimal point informs the user that the thermostat is calling for heat.

The collector of transistor Q2 is returned to internal supply voltage Vcc by terminal 129 to which terminal 129' also is connected. The aforementioned time delay is provided by a capacitor C9 shunted by a resistor R20 and returned from the input of comparator 210 to ground. Increased discharge of capacitor C9 is provided by the series combination of a diode D4 and a resistor R1 shunted between the input of inverter 210 and the output of inverter 211.

Figure 4A:
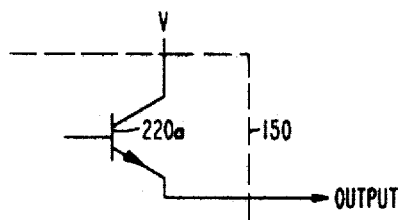

Microcomputer 150 is a conventional TMS1100 as commercially designated and which includes not only the integrated microcomputer circuitry but also has its own clock. That clock sets the rate at which the microcomputer executes the permanent program instructions in its read only memory (ROM). Accommodating the separation of the overall schematic representation, as separated between FIGS. 2 through 5 in accordance with available space on each sheet of the drawings, the internal positive operating potential Vcc is made available through a terminal 216 from FIG. 2. Analogously, the ground return from pin 4 of microcomputer 150, also labeled Vdd, is shown as connected by a terminal 218 to the sub-system of FIG. 2 and also by terminal 220 to the sub-system of FIG. 3. It may be noted that each output of microcomputer 150 typically is an emitter-coupled transistor 220a as shown in FIG. 4a.

Setting the frequency of operation of the clock integrated within microcomputer 150 is a network consisting of a capacitor C5 coupled on one side to Vcc as at terminal 216 and from its other side through a resistor R27 and a potentiometer P3 to ground. The junction between capacitor C5 and resistor R27 is connected to clock-oscillator pin terminals 18 and 19 on microcomputer 150.

Of course, the read only memory in microcomputer 150 must be permanently programmed or set up to appropriately receive information from and provide information to the different sub-systems involved and in accordance with the ultimate nature of the overall functions that are to be performed. While any two different programmers of the read only memory might end up with substantially different schemes for achieving the same ultimate result, a preferred loading program is set forth in FIGS. 27 through 56.

Actually, the flow charts set forth in FIGS. 27 through 56 need little, if any, further explanation, because they are presented in the form of a series of successive instructions or statements that use language well known and sufficient for the person skilled in the art to understand and implement the loading of mirocomputer 150. Standardized nomenclature is included throughout. Thus, RAM refers to the random access memory within microcomputer 150, ACC refers to accumulator, K and J relate back to FIG. 4 and the respective inputs and outputs from mirocomputer 150 and "F's" refers to flag sets or numbers. DEC refers to decrement, AIR refers to air conditioning control and HEAT refers to heating control.

FIGS. 27 through 30 depict the overall "Start" routine, but, as indicated, involve correlation with a number of other routines and subroutines. For example, FIG. 29 has a step which calls for going to a "Flash-Help" routine. That, in turn, is presented in FIG. 31 and is a necessary start for the "Find Temperature" routine that begins also in FIG. 31. It will be noted that the "Find Temperature" routine is employed twice as a sub-routine just in FIG. 29. FIG. 32 indicates a "Go to Test" step which requires going back to FIG. 27. These are only examples of the many interrelationships which exist between the various routines and subroutines set forth in the many figures. Of course, many of the routines continue from one figure to the next by reason of space limitations on any given drawing sheet. In any case, the cross-references or transfers between the different main routines, as well as different subroutines, are clearly indicated in FIGS. 27-56.

Figure 31:
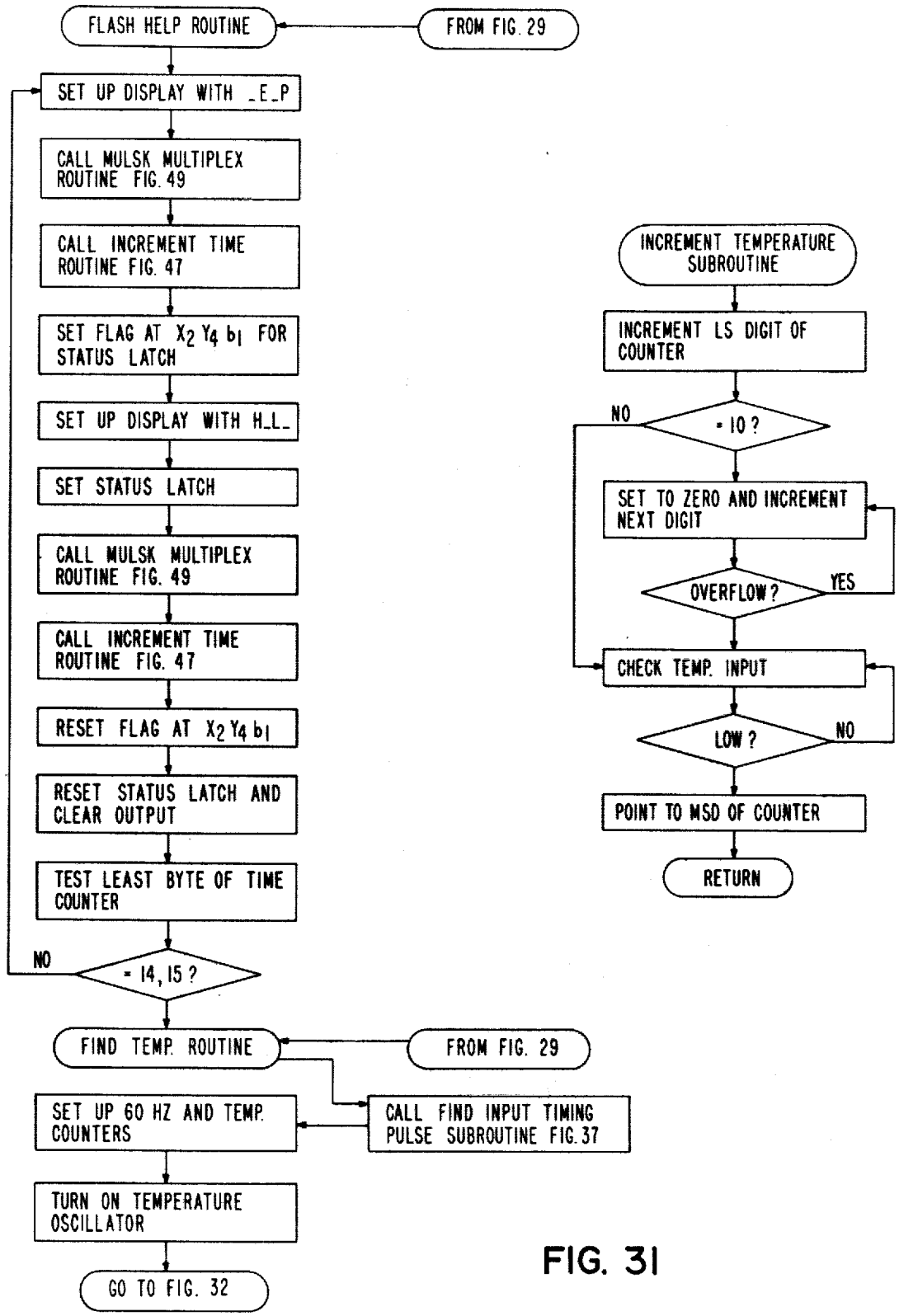
Figure 32:
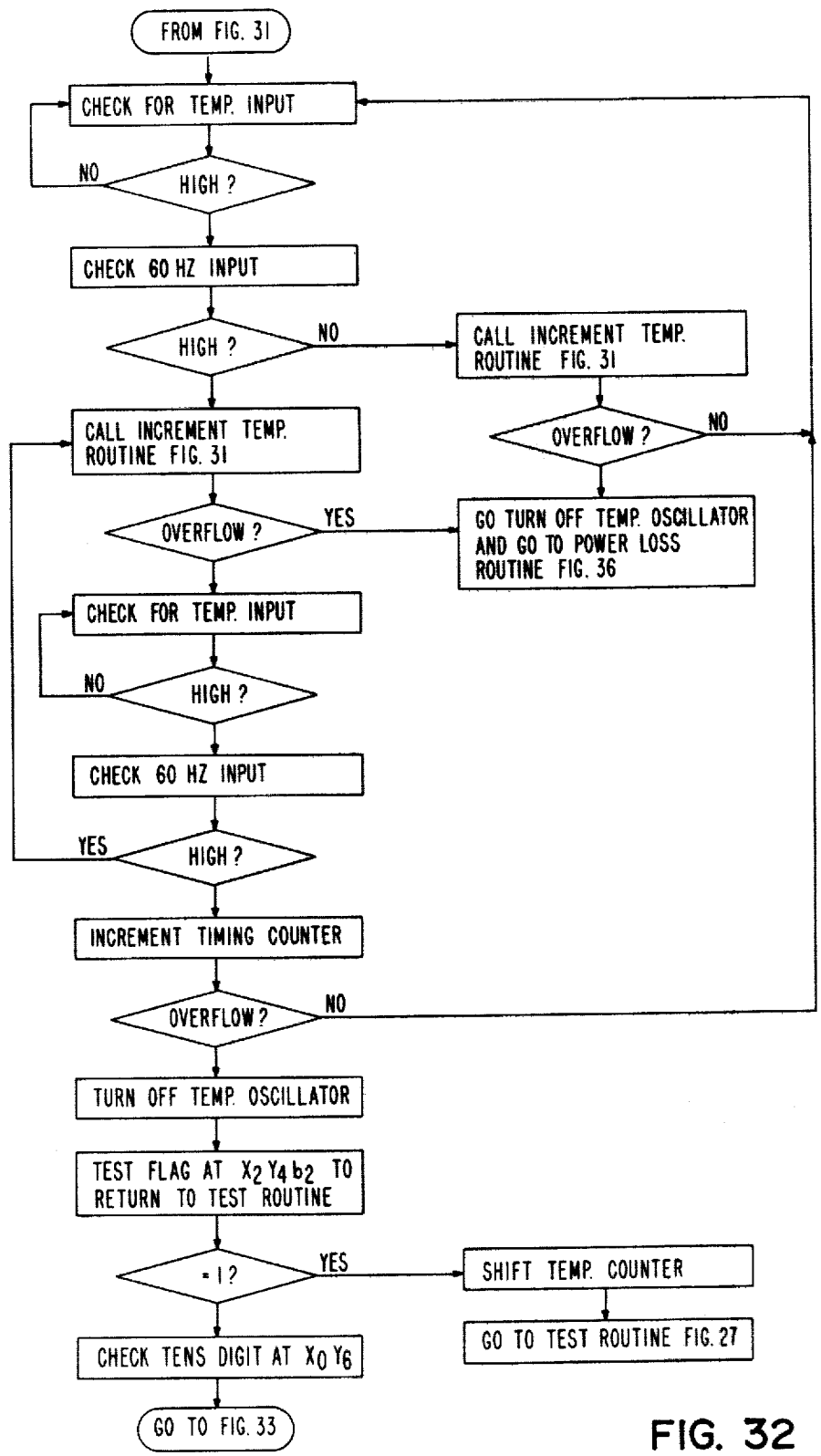
Figure 33:
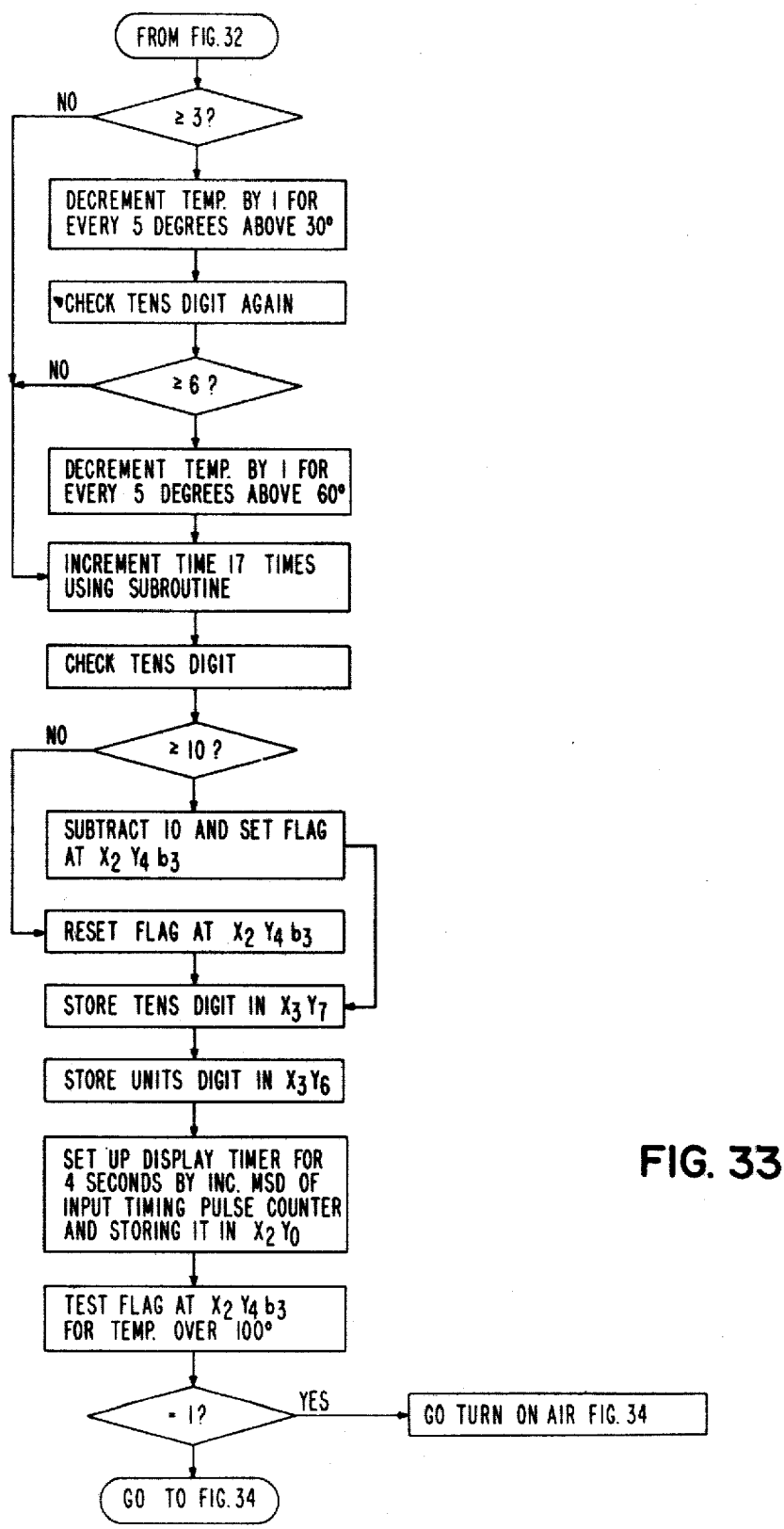
Figure 34:
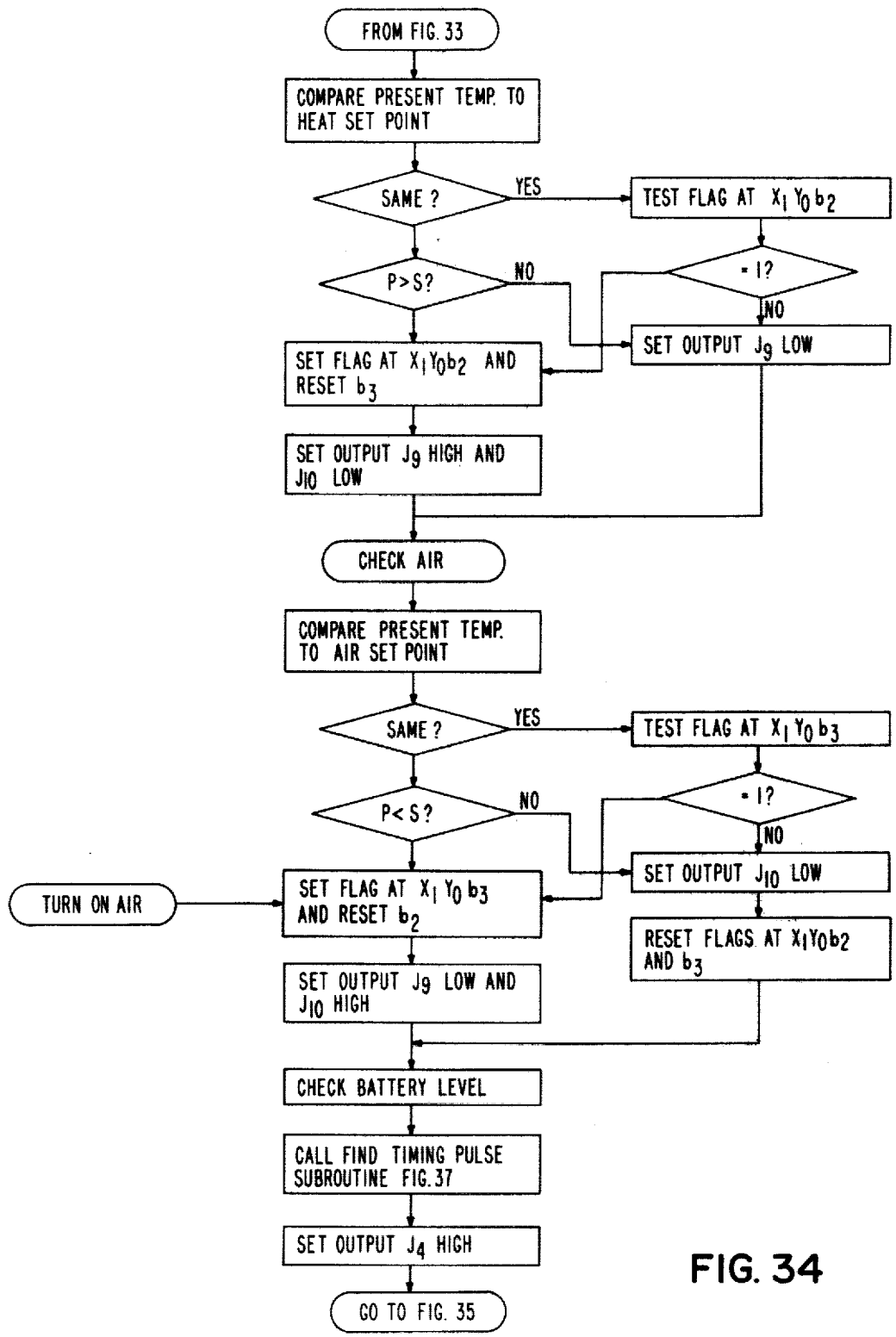
Figure 38:
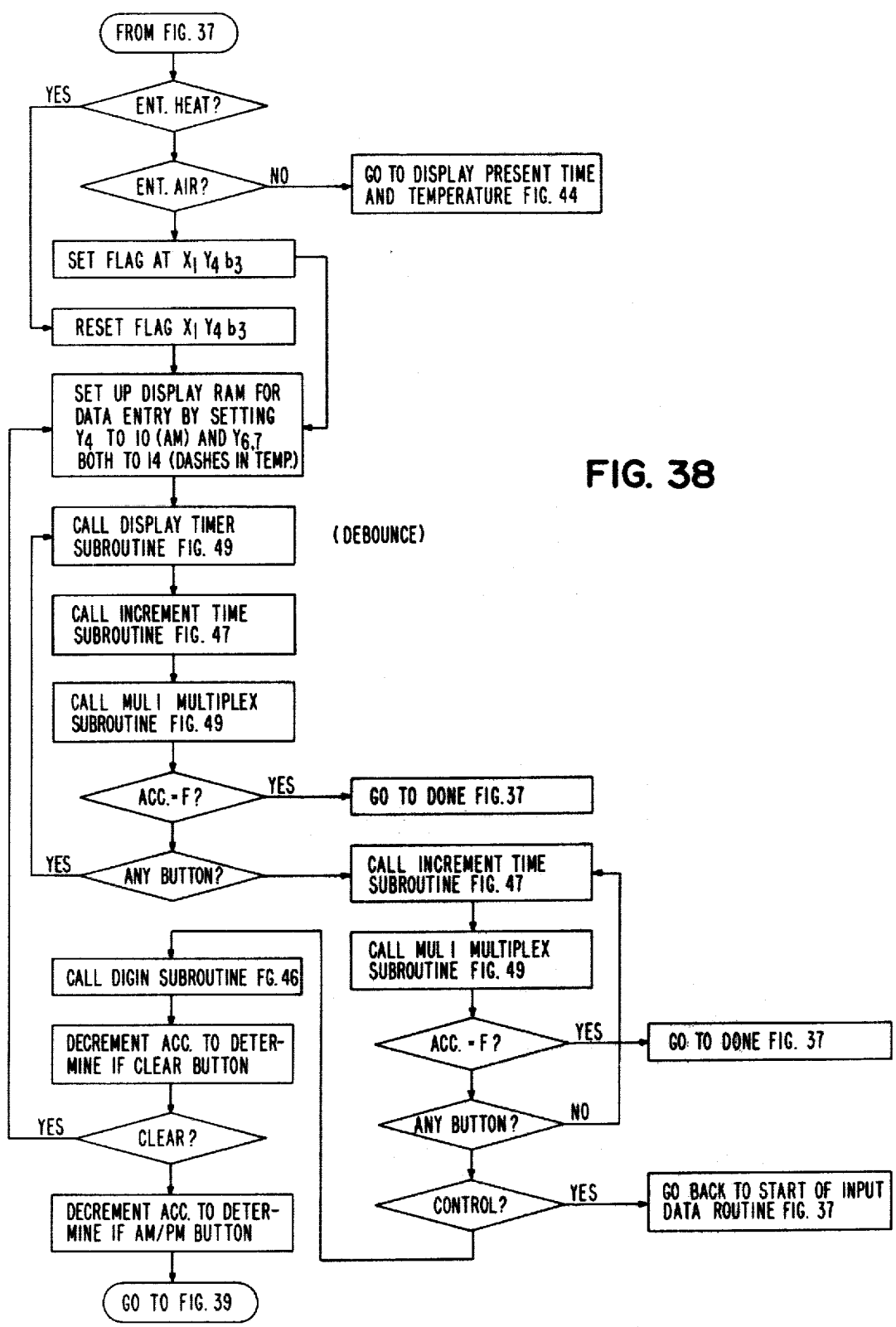
Figure 39:
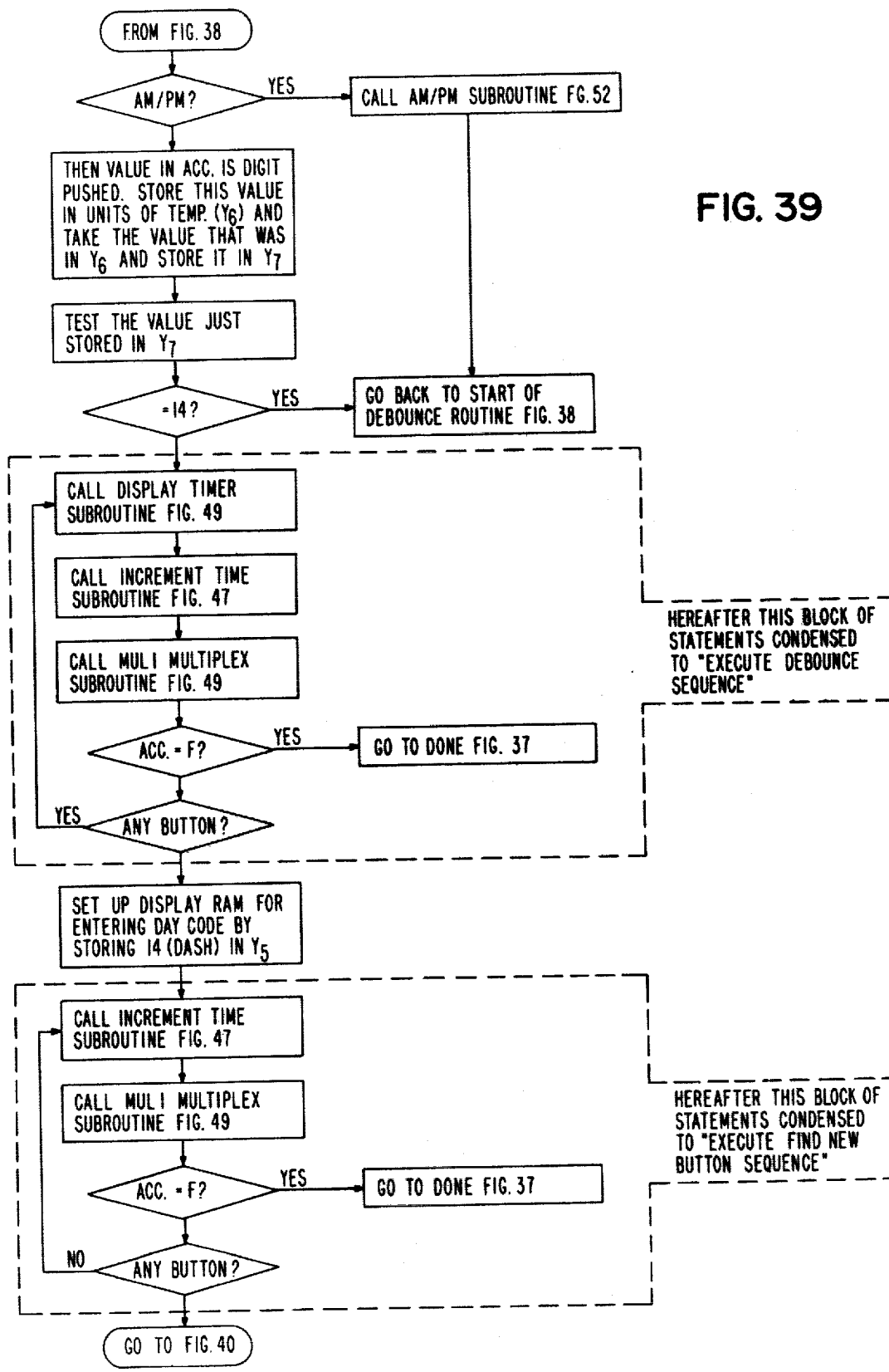
Figure 40:
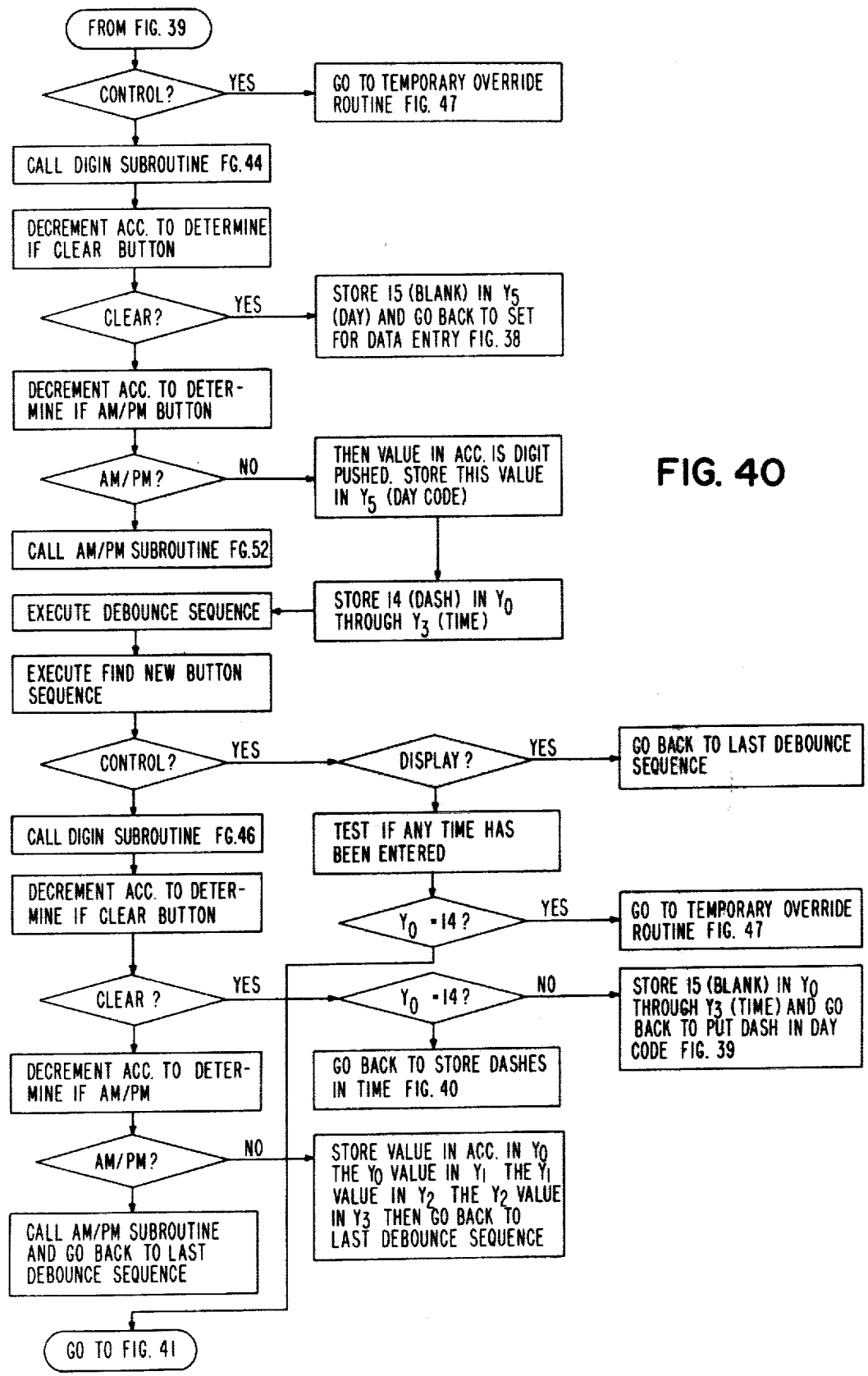
Figure 41:
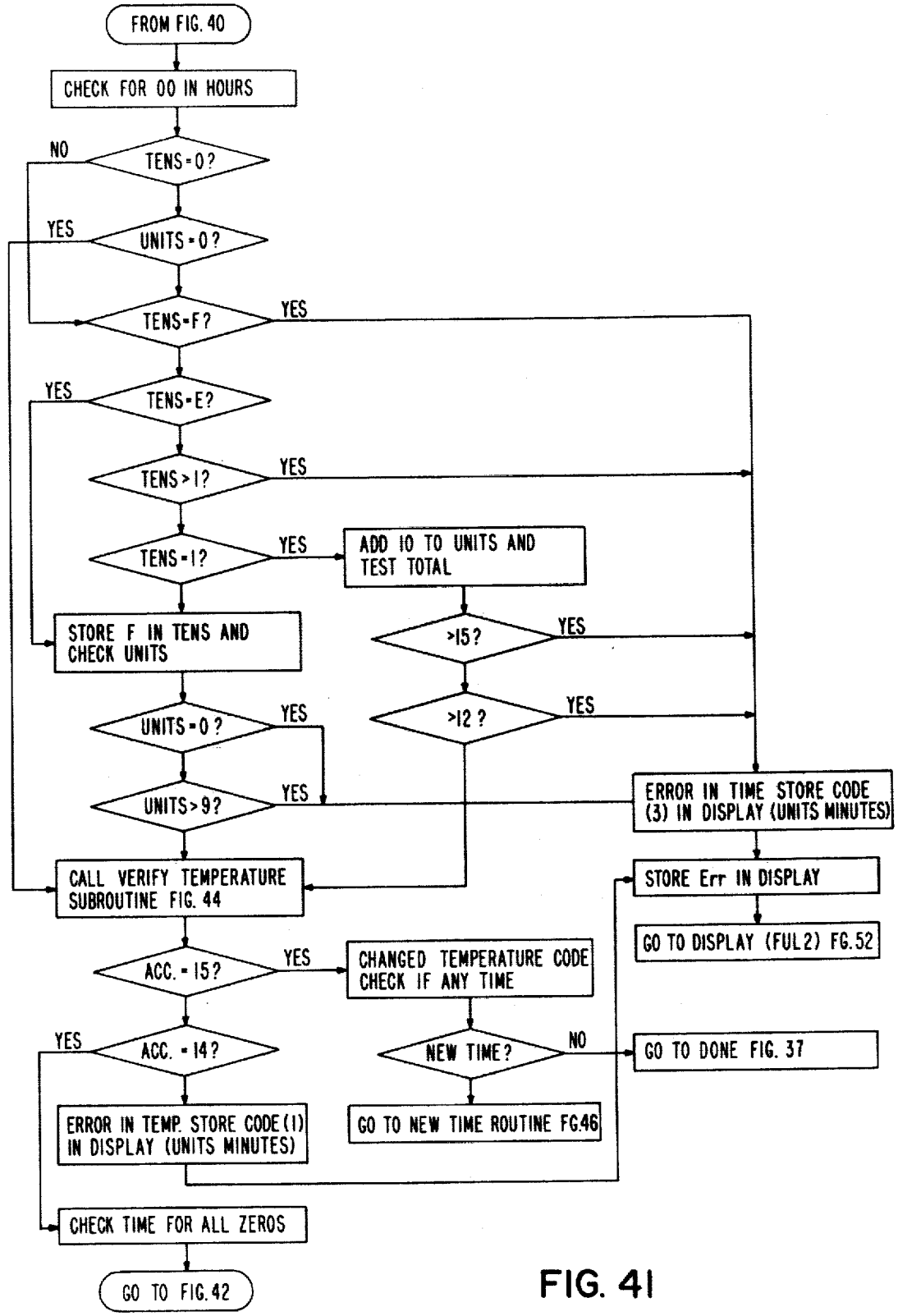
Figure 42:
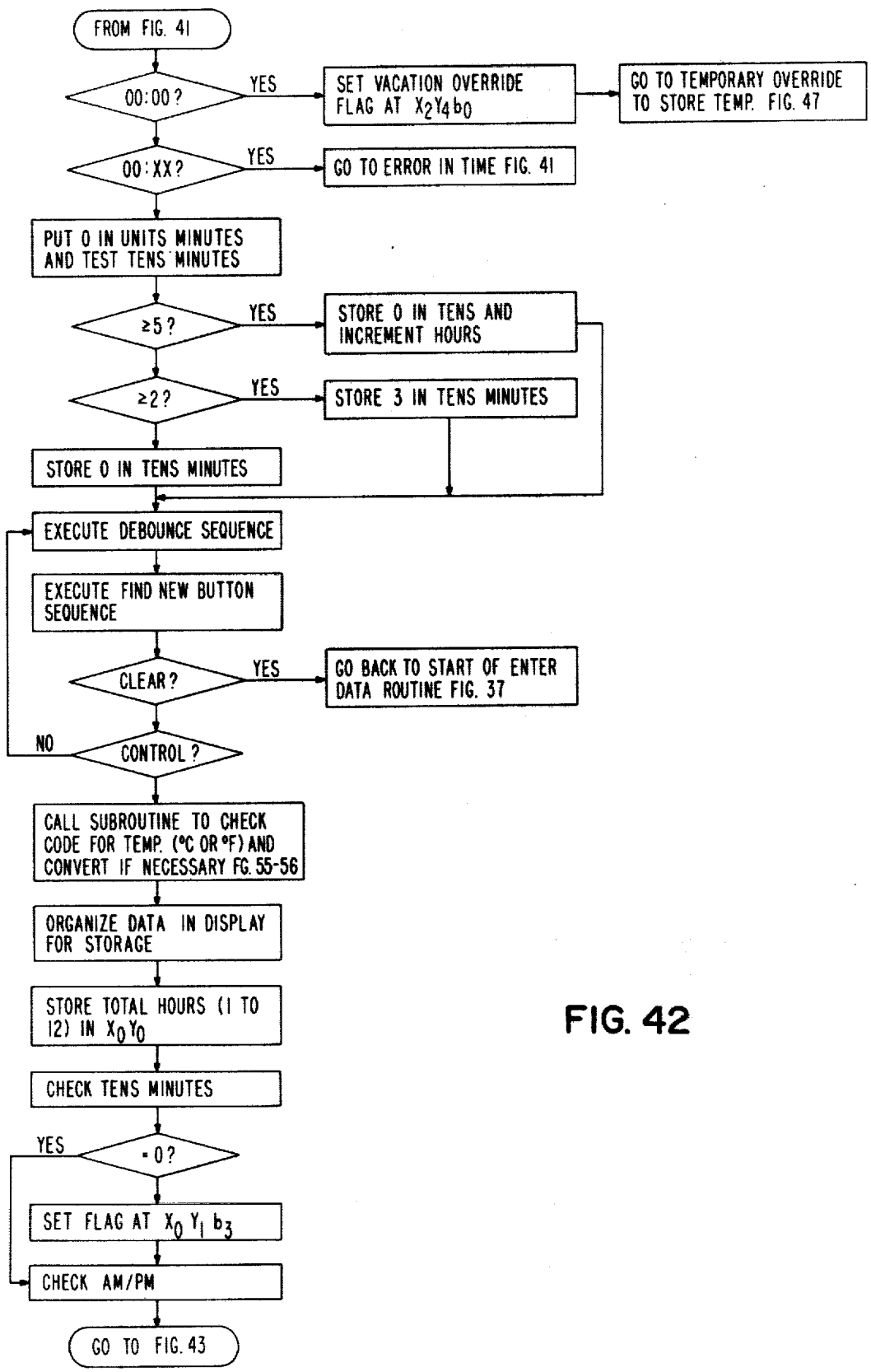
Figure 43:
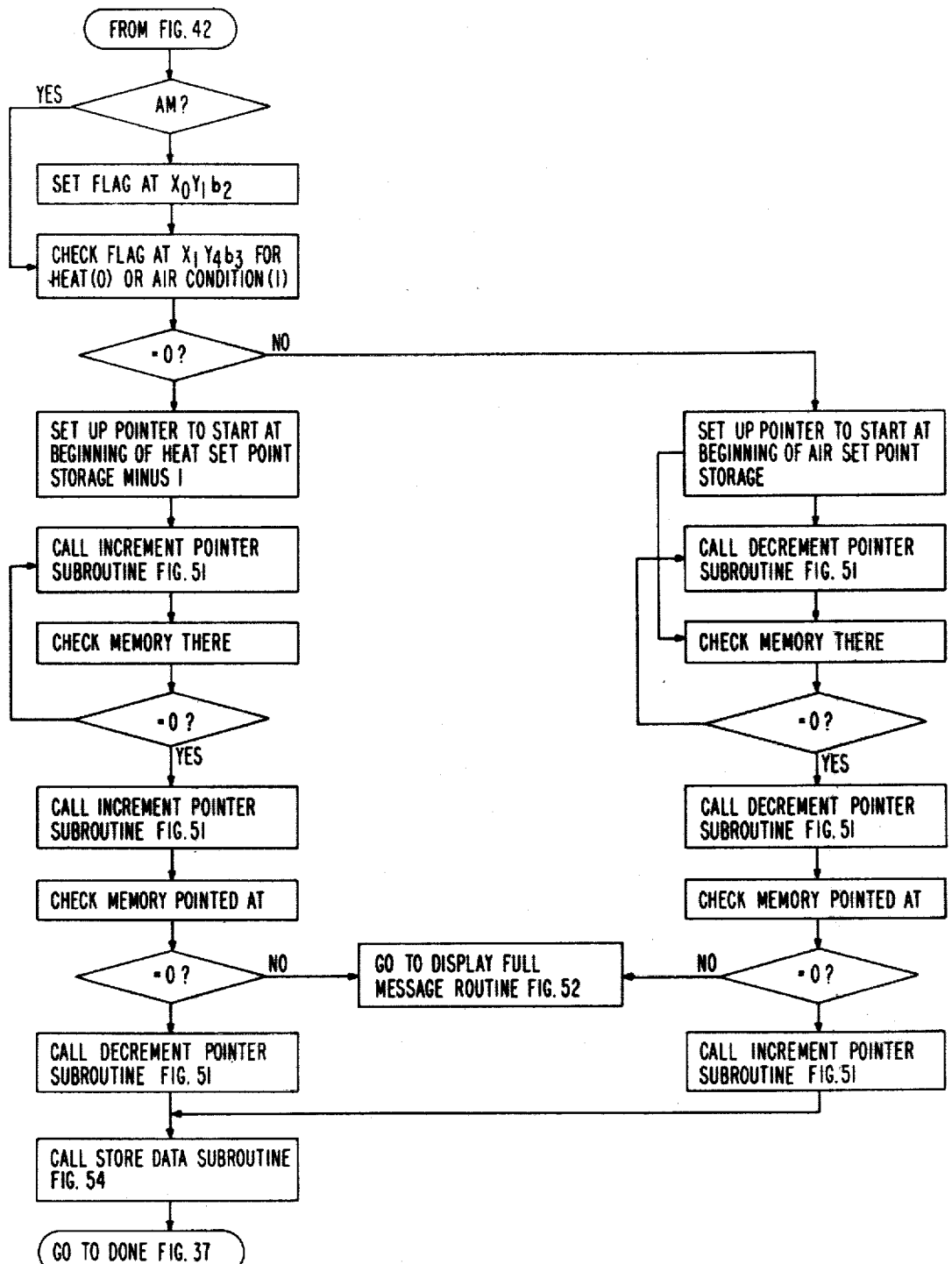
Figure 45:
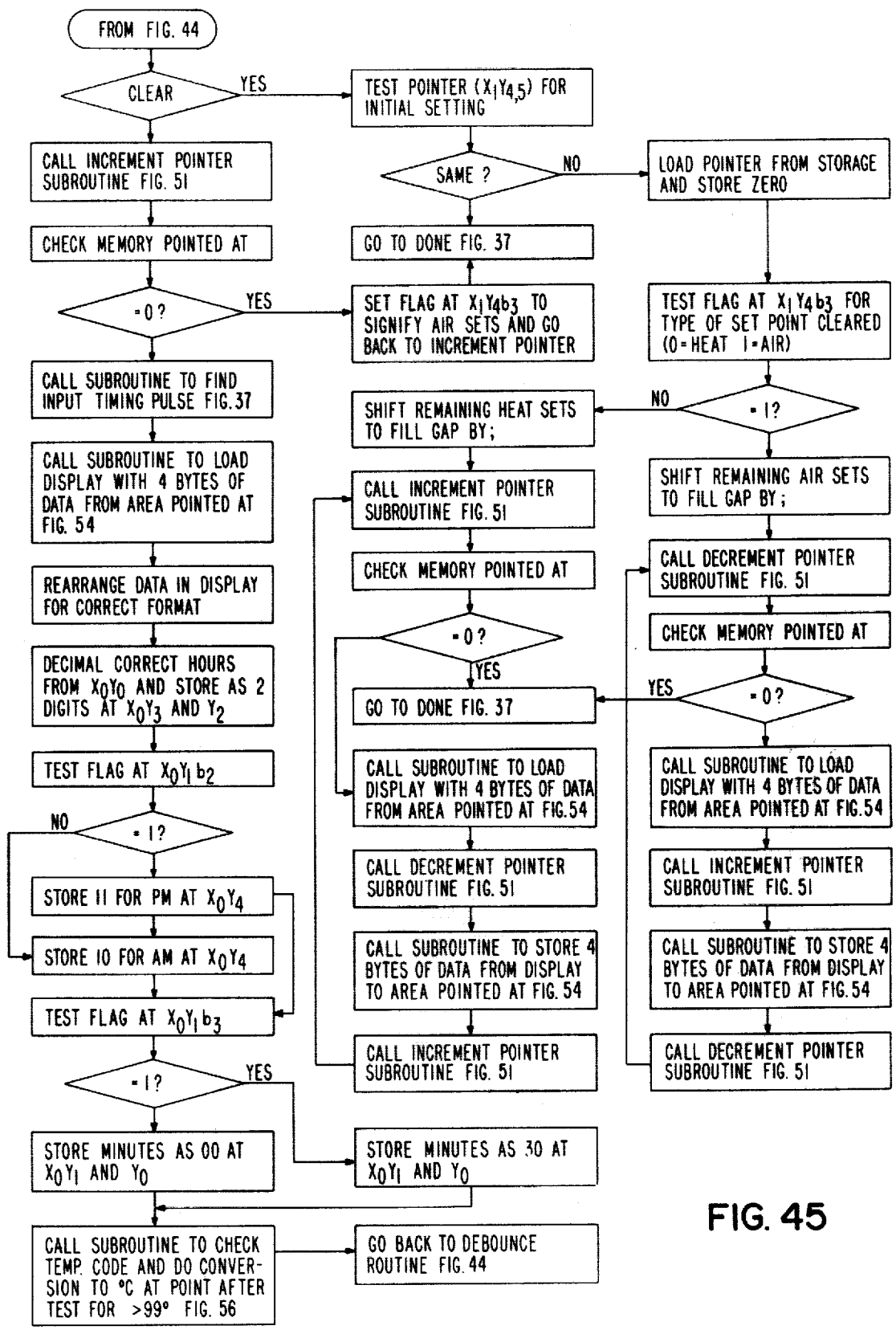
Figure 47:
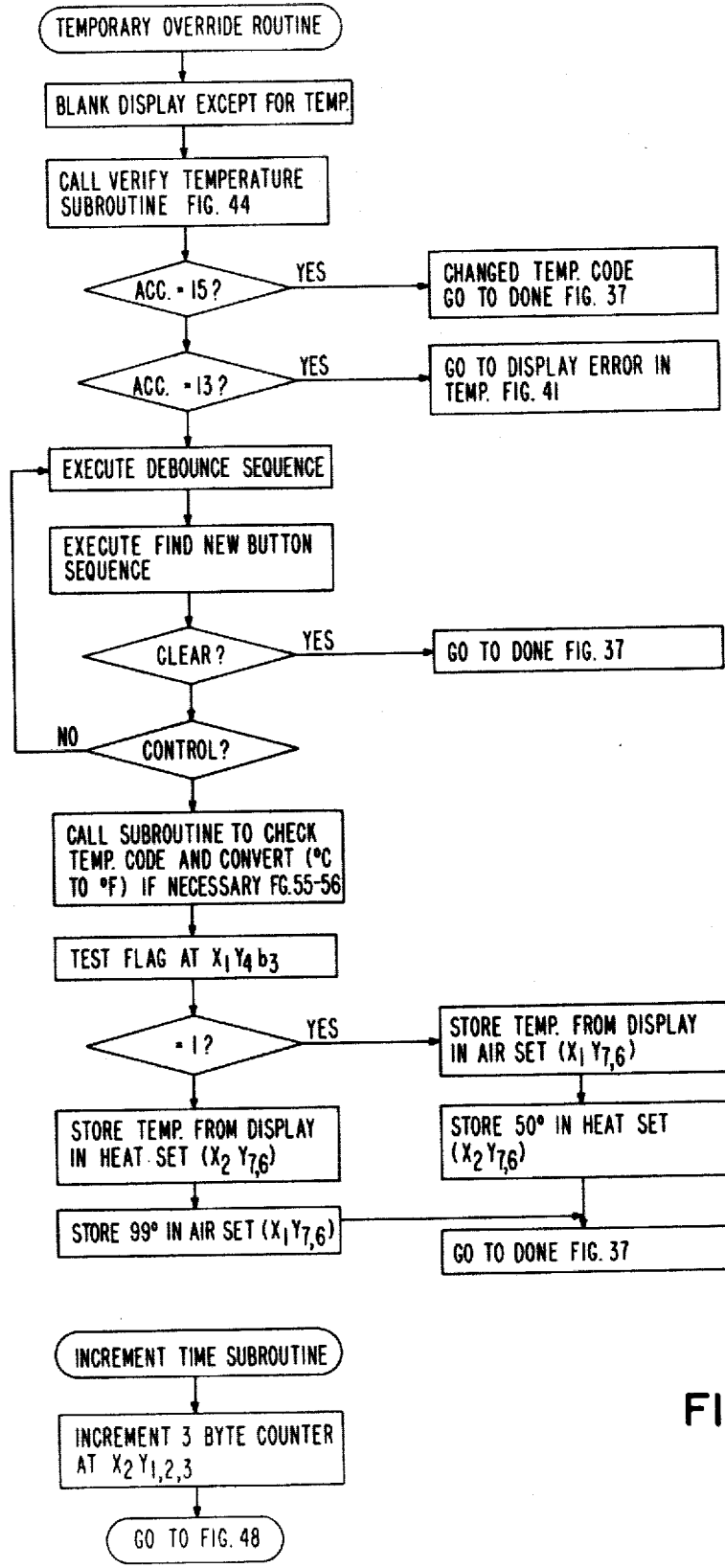
Figure 48:
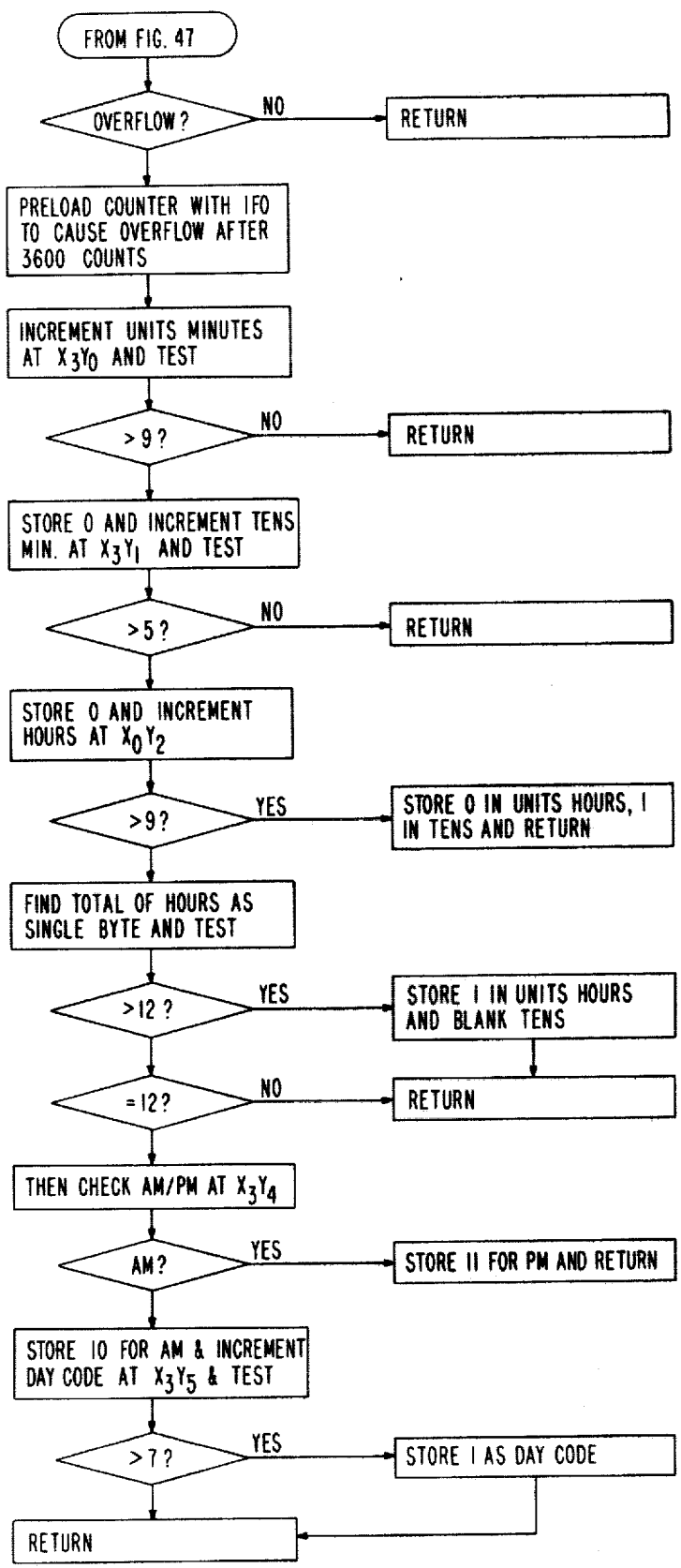
Figure 50:
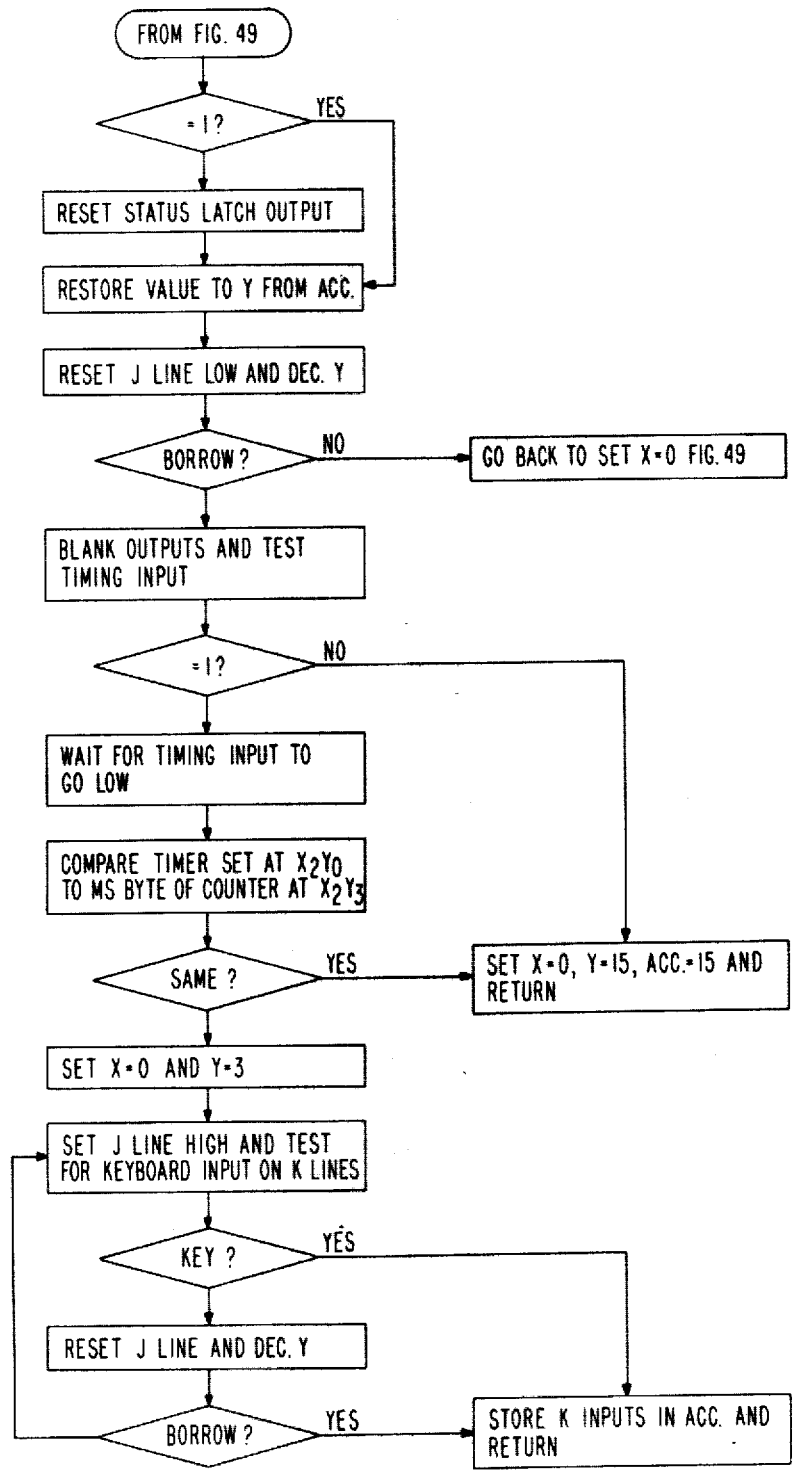
Figure 52:
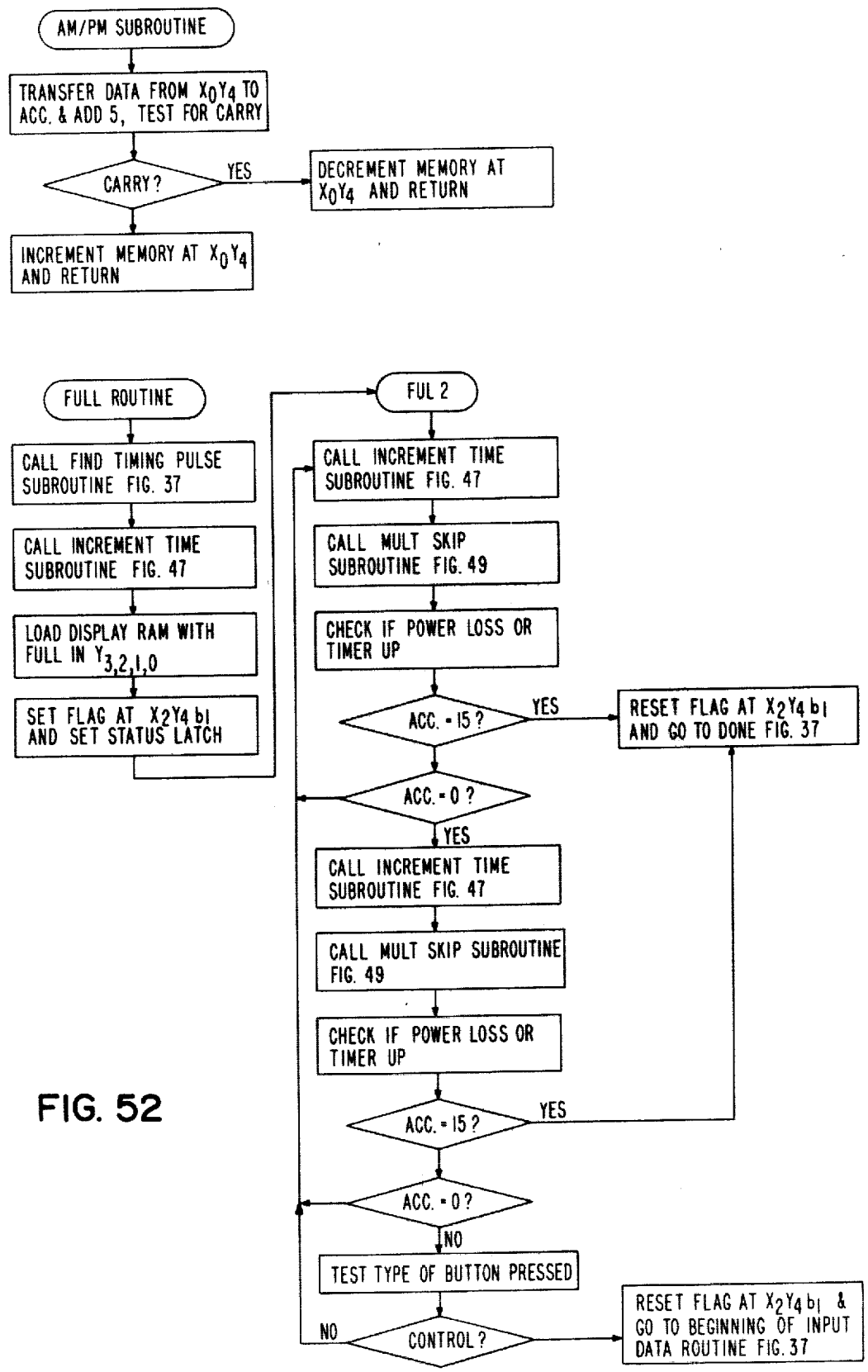
Figure 53:
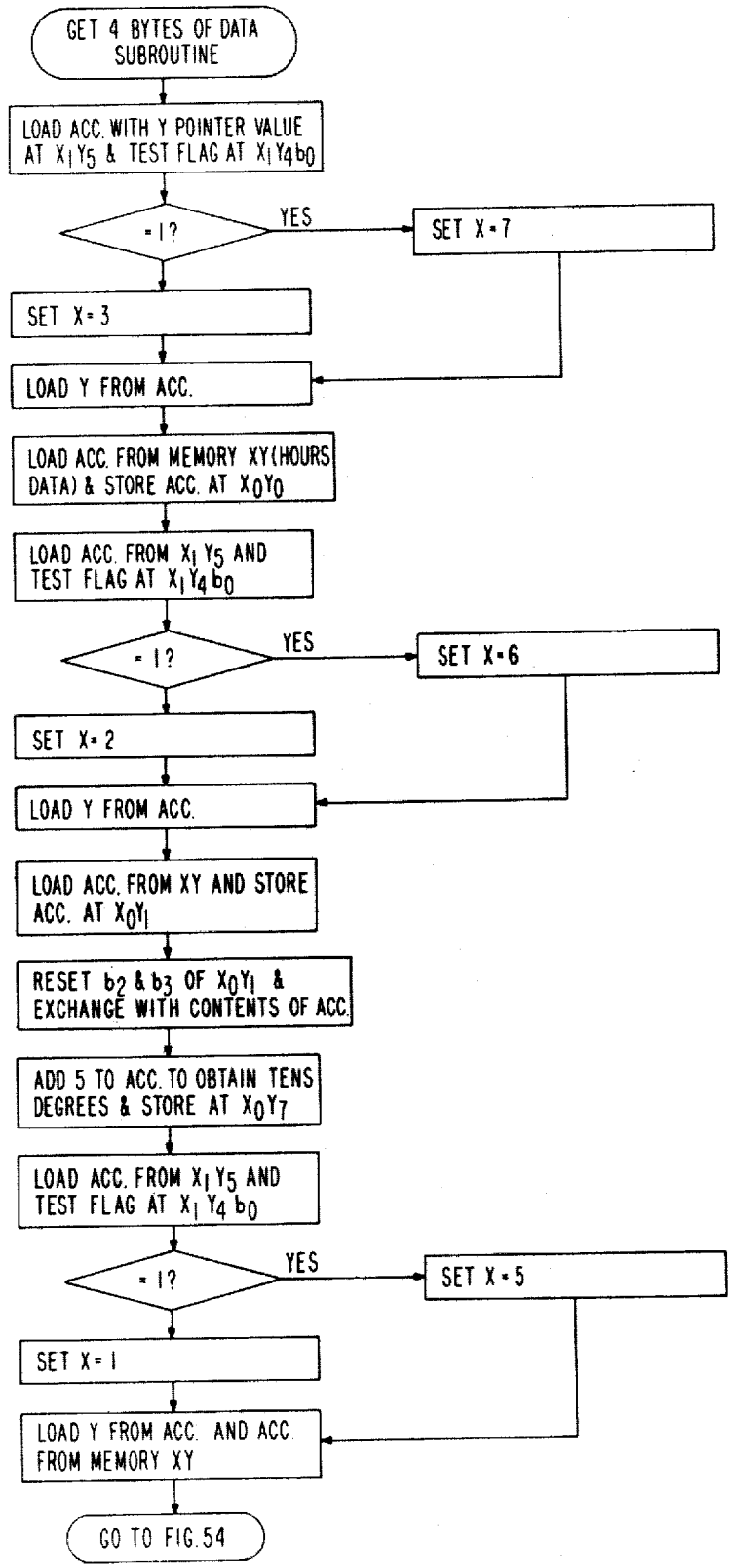
Figure 54:
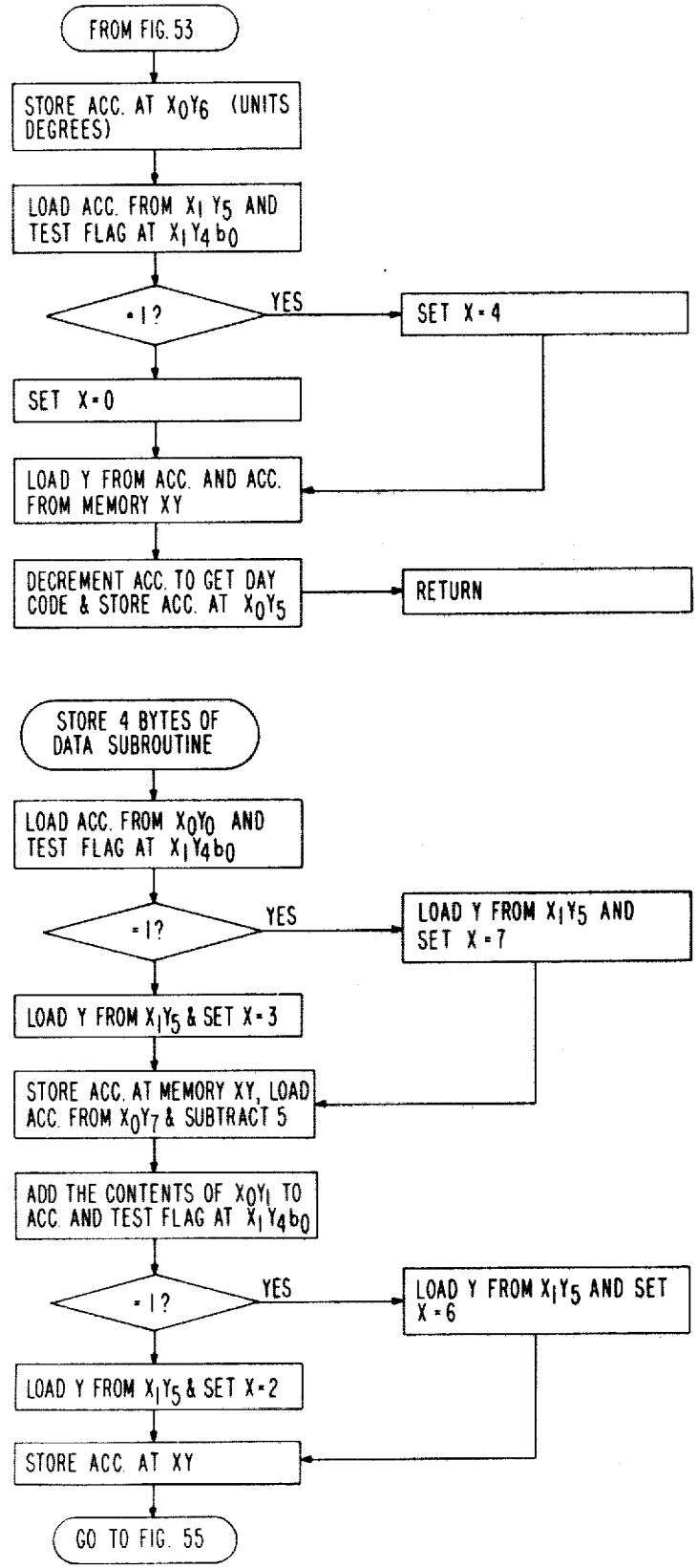
Figure 56:
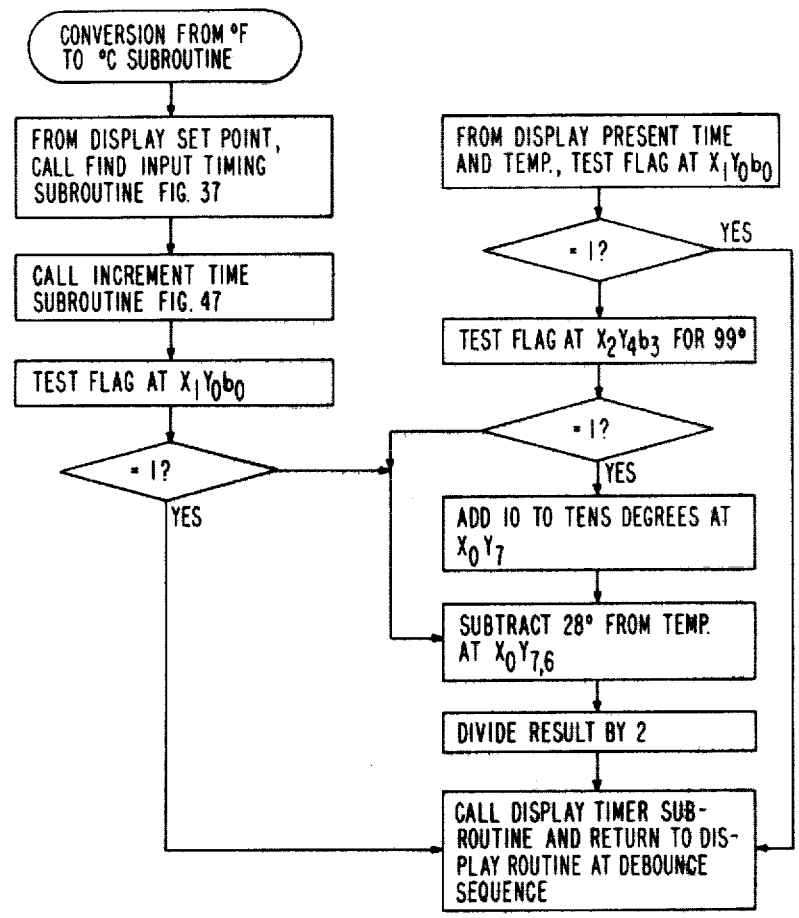

Included are a number of subroutines, such as the "Increment Temperature" subroutine in FIG. 31, the "Find Input Timing Pulse" subroutine in FIG. 37, the "Compare Air to Heat" subroutine of FIG. 38, the "Verify Temperature" routine of FIG. 44, the "New Time" routine of FIG. 46, the "Temporary Override" routine of FIG. 46, the "Increment Time" subroutine of FIG. 47 and the "Display Timer" subroutine of FIG. 49. Others include the "DIGIN" subroutine of FIG. 46, the "AM/PM" subroutine of FIG. 52, the "Increment Pointer" subroutine of FIG. 51, the "Decrement Pointer" subroutine of FIG. 51, the "Full" routine of FIG. 52, the "Get Four Bytes of Data" subroutine of FIG. 53, the "Store Four Bytes of Data" subroutine of FIG. 54, the "Conversion F.° to C.°" subroutine of FIG. 56 and the "Conversion From C.° to F.°" subroutine of FIG. 55.

One central objective in programming the read only memory (ROM), of course, is the ultimate acceptance of data input from the user. That is primarily established by the "Input Data" routine which begins on FIG. 37 and continues through FIGS. 38-42 to FIG. 43. Data entry by the user involves the addressing, by means of keyboard 110, of the random access memory (RAM) within microcomputer 150. As indicated in the flow charts, the RAM also is used temporarily to store instruction and test data employed in the permanent programming of the ROM. It is the RAM, however, which must be addressed by the user in order to benefit from the ordinarily non-erasable data stored in the ROM. Another major objective in programming the ROM is to establish the different functions which monitor and govern operation of the various stages and, of course, which respond to the sensed temperature.

After assembly into housing structure yet to be described in more detail and loaded with read only memory programming in accordance with the procedure outlined by FIGS. 27 through 56, the overall thermostat thus is ready for selective programming by the user. Of course, the ordinary user would never be able to program the read only memory in microcomputer 150 in the manner necessary to achieve the desired results. Accordingly, the microcomputer itself and its permanent loading are selected to allow comparatively simple addressing of the thermostat by the user. Through keyboard 110, the user enters day, time and temperature information as the basic input data. As will be seen, certain other functions also are available. Those selections are displayed by device 200 and, if correct, the user then is able to store that information, so that it will govern operation of the thermostat.

To this end, a control panel shown in FIG. 10 includes pushbuttons labeled essentially as previously described with regard to FIG. 5. As shown in FIG. 10, however, there is but a single START pushbutton area and no separate pushbutton with respect to air conditioning. This is the preferred arrangement when the thermostat is intended for use only in the control of heating and in the absence of air conditioning. For economy of parts procurement, however, keyboard 110 is in this case fabricated to include a separate pushbutton element for use when air conditioning also is to be controlled. As discussed in more detail in connection with FIG. 25, all of the actual pushbutton contacts are disposed beneath a flexible insulative layer on which the labels are printed. There are, therefore, both START HEAT and START AIR button contacts located side-by-side beneath the single label START on a heat-only model, so that both may be depressed simultaneously.

For such a version intended only to control heating, jumper W1 is connected and jumper W2 is not connected. At the same time, resistors R26 and R30 and modules 138 and 138a or 138a' may be omitted. For a model intended to control both heating and air conditioning, on the other hand, those components are included and jumper W2 is connected instead of jumper W1. At the same time, separate START HEAT and START AIR labels preferably are used as specifically shown in FIG. 25. Those two labels individually overlie the respective button contacts mentioned above.

As previously indicated, the differently-numbered pushbuttons of keyboard 110 also carry abbreviations relative to the days of the week. As specifically shown in FIG. 10, pushbuttons "1" through "7" are denominated to indicate individually the respective days Sunday through Saturday. Pushbutton "8" is assigned a designation "M-F" to indicate Monday through Friday, pushbutton "9" is designated with "S/S" to indicate Saturday and Sunday and pushbutton "0" contains the designator "All". These different designations with respect to days of the week are intended to permit the user to enter a control program with respect to any specific day of the week, to apply a common program to any succession of five straight days such as Monday through Friday, to order a different manner of operation for days off such as Saturday and Sunday or to select a manner of operation applicable to all days of the week.

Of course, the separation of Saturday and Sunday from Monday through Friday as here shown by way of example is in accordance with what has been the standard work week for a majority of the population. At the same time, however, this assignment is entirely arbitrary and the user may employ the sequence of numerals to reflect any choice as to the beginning of a weekly cycle; that is, the pushbutton which bears numeral one could be used to designate a Wednesday, in which case the pushbutton bearing numeral eight would apply to the days Thursday through Monday and the pushbutton enumerated "9" would end up automatically applying to Tuesday and Wednesday.

As presented in FIGS. 9 and 14, the pushbuttons of keyboard 110 are exposed through openings in a bezel 220 mounted on a housing 222. Bezel 220 surrounds the upper margin of a well 224 in which battery 152 is to be located and which normally is covered by a plate 226 on the outer surface of which is printed a series of basic user instructions as shown better in FIG. 26. The content of those instructions will be appreciated more fully after consideration of the following description of user operation. By observation of the small rectangles which correspond to different ones of the pushbuttons shown in FIG. 10, it will be seen that these instructions present a visual cross-reference. Of course, the labeling as to each different instruction is self-evident. Nevertheless, the instructions set forth on panel 226 pertain only to the usual set of input entries required from the user. Instruction as to other possible selected programming is to be included in an associated instruction manual.

Bezel 220 also accommodates the light output from display device 200 situated relative to appropriate indication of "TEMP", "DAY" and "TIME". This visual display will indicate those informational values as they are being programmed into the unit as well as indicate the same information at any time that the REVIEW pushbutton is depressed. The differently-numbered keys are used to relate to the days of the week as arbitrarily selected and assumed herein to begin with Sunday as well as to allow the input of desired temperature and time information. Overlying all of bezel 220, display device 200, keyboard 110 and plate 226 is a transparent cover 228 hinged to swing to an open position, so as to allow access to the keyboard.

Depression of the START button always prepares the unit to receive new programming information and also functions to activate display device 200 for a period of time, in the present case of about thirty seconds from the last depression of a key that causes microcomputer 150 to set up, and to enter or store data effectively received from or supplied to the display, excepting error messages. The AM/PM button is used to select as between those respective portions of the time of day; as herein embodied, each activation of the unit by use of the START button results in operation of the unit in the AM mode which will be indicated by the letter A at the right-most digit of the display. However, each depression thereafter of the AM/PM button will result in a switching as between AM and PM, and this button can be depressed to effect that change at any time. The CLEAR button is employed to erase information temporarily fed into the unit through the other pushbuttons but determined, by means of display device 200, to be incorrect; it also is used to erase any set of instructions when used in association with the REVIEW button as hereinafter described.

The STORE button instructs the unit to retain information "punched in" through use of the other buttons. That is, those other buttons are used to enter information which is observed on display device 200 and, when that observation reveals correct entry, the STORE button then must be depressed in order actually to load microcomputer 150 with that information.

The REVIEW button activates display device 200 and allows the user to determine both current environmental values and also to check the status of instructions that previously have been placed into the unit. On the first depression of the REVIEW key, it indicates current temperature, day and time. When thereafter depressed repeatedly, it enables the successive display on device 200 of the various sets of programmed instructions. As will be discussed further below, cover 228 is so formed and mounted that, when lightly depressed inwardly, it activates the REVIEW pushbutton.

User programming will depend, of course, upon the user's personal time schedule. The following discussion will assume that the controller is installed in a residence, that activity within the residence is during the daylight hours with sleep at night, that household activity begins later on the weekends and that there are one or more unique times when the normal repetitive routine is to be excepted.

It should be noted that the user-programmable information desirably stored within the thermostat automatically is erased from its random access memory at any time that supply power, by way of battery 152 and by way of input terminal 120, is removed. Whenever that has occurred and power thereafter is restored, microcomputer 150, by reason of its permanently stored program, will cause device 200 to flash the signal "HELP". That informs the user that the accessible memory is blank but ready for again being programmed.

As an overview of user programming, START is depressed at the beginning; this activates the unit, including display device 200. Next, the time clock is set. This is achieved by entering the temperature of zero-zero for Celsius or zero-one for Fahrenheit followed by the day of the week and the time of the day. Temperature control instructions are then programmed into the unit, subject to always following a sequence of temperature/day/time of day. A lighted bar appears at the appropriate location on display device 200 to make each sequence easier to follow by reminding the user what information is next to be entered. When the display provided by device 200 indicates that the desired information has been supplied, the STORE button is depressed to cause that total instruction to be placed within the memory of the microcomputer. The same procedure is repeated for each different set of instructions with respect to different days and times until all such information has been stored.

As a more detailed example, assume the selection of a program which will call for weekday heating to a level of seventy degrees (70°) F. beginning at six-thirty (6:30) AM, setting that level back to sixty degrees (60°) at eight (8:00) AM and then rewarming to seventy degrees (70°) beginning at five (5:00) PM with a final set back to sixty degrees (60°) at eleven (11:00) PM. On the other hand, it is desired to begin heating to seventy degrees (70°) on Saturday and Sunday at nine (9:00) AM, later reducing the temperature to sixty-five degrees (65°) at one (1:00) PM in recognition of increased personal activity, returning to seventy degrees (70°) beginning at five (5:00) PM and finally setting to a night temperature of sixty degrees (60°) at eleven-thirty (11:30) PM.

In achievement of the foregoing, operation once again is begun by setting the clock and instructing the unit to keep track of current temperature, day and time. To do this, depress START and then "zero-one", since the temperature is to be in Fahrenheit. Next is to depress the appropriate number for the current day of the week, as assigned on a one-through-seven basis, and not the date of the month. Immediately thereafter, the suitable buttons are depressed in order to enter the digits that represent current time along with the designation AM/PM if it is afternoon or evening. Finally, the STORE pushbutton is depressed, after which REVIEW may be depressed at any time in order to obtain a readout of current temperature, day and time.

Turning next to the temperature-control instructions for the assumed example, the sequence of key depression is START—Seven-Zero—Eight—Six-Three-Zero—STORE in order to cause heating of the house to seventy degrees (70°) on Monday through Friday at six-thirty (6:30) AM. In itself, the colon is already there, so it does not have to be entered. Also, the AM is already present as mentioned previously with regard to the condition of the unit on initial start up.

In order next to instruct the unit to set back to sixty degrees (60°) on Monday through Friday at eight (8:00) AM, the sequence is START—Six-Zero—Eight—Eight-Zero-Zero—STORE. For returning to seventy degrees (70°) on Monday through Friday beginning at five (5:00) PM, the user must follow the routine of START—Seven-Zero—Eight—Five-Zero-Zero—AM/PM—Store. Note that the AM/PM button must be depressed in order to change that function that had been automatically preset to AM upon initiation and, if changed, is automatically reset to AM upon each depression of START. Again for the late evening, the order of actuation is START—Six-Zero—Eight—One-One-Zero-Zero—PM—STORE.

As to all of the sequences thus described, it is to be noted that the entering of each sequence is displayed by device 200 as it is keyed. That means that the entry of each individual instruction can be checked for accuracy before going to the next instruction. Should a mistake be observed at that point, it is only necessary to depress the CLEAR button and begin anew with respect to the particular instruction at hand. After pressing STORE at the end of a full temperature-day-time sequence, the entire stored sequence is displayed to allow one further visual check. If an error is noted, depression of CLEAR erases the entire sequence after which it can be re-entered correctly.

Continuing with the example, the next sequence is for heating the house to seventy degrees (70°) on Saturday and Sunday beginning at nine (9:00) AM. For this, the operation is START—Seven-Zero—Nine—Nine-Zero-Zero—STORE. Of course, the first "nine" in that sequence refers to the Saturday/Sunday mode or other arbitrary "weekend" period as previously discussed.

In order to set back the heat to sixty degrees (60°) during the weekend at one (1:00) PM, the next instruction is START—Six-Zero—Nine—One-Zero-Zero—AM/PM—STORE. For returning to seventy (70°) degrees again on the weekend at five (5:00) PM, the sequence is START—Seven-Zero—Nine—Five-Zero-Zero—AM/PM—STORE. Finally, the late night condition is reached by the routine of START—Six-Zero—Nine—One-One-Three-Zero—AM/PM—STORE.

In accordance with the foregoing, a set of instructions has been entered so as to cover all days of the week. Nevertheless, the system will also handle additional instructions for more specific time periods. Assume a regularly scheduled absence from the residence on each Tuesday night between seven (7:00) and nine (9:00) PM. To conserve energy during that absence, additional instructions to be entered could be START—Six-Zero—Three—Seven-Zero-Zero—AM/PM—STORE, and START—Seven-Zero—Three—Nine-Zero-Zero—AM/PM—STORE.

The microcomputer is programmed permanently to pay attention always to the most specific set of instructions within any given time span. Since "Tuesday" (represented by the "three" in the example just given) is more specific than the previously-entered "Monday through Friday" instruction, the latter information is superceded upon the entry of the special Tuesday night program. Similarly, the most specific set of instructions are followed even when they are redundant or "conflicting" by calling for the same time. Assume in the last example no return to the residence on Tuesday from morning until nine (9:00) PM. To overcome the normal Monday through Friday heating to seventy (70°) degrees at five (5:00) PM, the first additional instruction would be START—Six-Zero—Three—Five-Zero-Zero—AM/PM—STORE. That would then be followed by the second additional Tuesday instruction as before. Thus, the more specific Tuesday-only instruction governs, even though a point of time is the same as in the more general Monday-Friday instruction set.

It may be noted that, as particularly embodied herein, the thermostat accepts the instructions only with respect to the hours and the half hours. Should a time other than that be entered, microcomputer 150 automatically will correct to the appropriate half-hour format.

As indicated on panel 226, also contemplated are the provisions for either temporary override or what is termed vacation override. Use of either of those alternative operations enables the user to supercede the regular program while yet retaining that in the memory for subsequent use as already programmed.

Temporary override is initiated simply by the sequence of START, input of desired temperature numbers and STORE. This automatically effects control to the newly selected temperature in a manner which is maintained until the next regularly scheduled set of instructions is called for. For example, assume there is a desire on Wednesday afternoon to increase the temperature temporarily, that being a time when, in accordance with the earlier example, the temperature was to be controlled to sixty (60°) degrees until five (5:00) PM. In order, then, to temporarily increase the temperature to seventy-two (72°) degrees, all that is necessary is to successively depress the sequence START—Seven-Two—STORE. The temperature will be controlled to seventy-two (72°) degrees thereafter until five (5:00) PM when it will be reset automatically to seventy (70°) degrees in accordance with the regularly programmed instructions.

The vacation override feature involves what might be considered a "temporary" override but for a period of time longer than the end of the regular programming interval being overridden, including periods that may extend for a number of days. For this purpose, a special code is inserted into the program. This is achieved by the sequence START—desired temperature—Zero-Zero-Zero-Zero-Zero—STORE. The temperature thereby entered will be retained until whenever the user returns and once again pushes the REVIEW button. As an example, assume a long weekend during which it is wished to maintain the heat at fifty-five (55°) degrees. The instruction would be START—Five-Five—Zero-Zero-Zero-Zero-Zero—STORE. Upon return, a mere push of the REVIEW button restores the unit to the regular program.

It is to be noted that the latter will not necessarily turn on heat (or air conditioning). It simply causes the unit to be directed to go back to the regular routine as initially programmed. Should that pose a problem, such as not causing heat to be produced immediately upon return, the temporary override program previously described may be utilized to substitute for the regular program.

At any time, the temperature display and all programmed instructions may be expressed either in Fahrenheit or Celsius. If Celsius is desired, it is only necessary to follow the sequence START—Zero-Zero—STORE. Should Fahrenheit be desired, the middle step of that sequence is, instead, "Zero-One".

It is to be remembered that the CLEAR pushbutton is utilized for the purpose of correction or change. The correction of data just entered or just stored has already been described. Changes to already stored regular programs are made by first repeatedly pushing REVIEW the number of times necessary to reach the desired step as then visualized upon display device 200. At that point, the depression of CLEAR will entirely erase the original instruction from the memory. The user may then re-enter a new instruction, if desired. It should be noted that the order of entry of sets of instructions is not important.

Also included is an error system which serves both to indicate a weak battery condition and also to visually demonstrate when it has been attempted to supply incorrect information. As specifically embodied herein, four different error codes are included for visual display on device 200 of a heat-only model. When air conditioning also is controlled, there are two additional error codes. A mistake of entry results in the flashing of an error code on device 200; under that condition, the unit will not accept the mistaken information. It is simply ignored, and proper information then is entered in place of that which was ignored.

When an entry is made that is outside the acceptable design temperature range, (50°-89° F.) or (10°-29° C.) in the instant embodiment, the display "Err1" will be visually produced. Also, the embodied unit is programmed so that, when first energized, it is automatically set to provide indication in Celsius. Any attempt at that point to enter a Fahrenheit temperature will result in the display of "Err1". To avoid that error, the unit must first be programmed for Fahrenheit by using the zero-one code as above described. Again, should an improper entry be attempted, the unit will not accept it and the correct entry can then immediately be offered.

Should an "Err2" appear, that will mean that an improper day code was employed to originally set the time clock. This indicates that one of pushbuttons "eight", "nine" or "zero" had been depressed instead of a pushbutton assigned to a specific day. The display of "Err3" reveals that an improper time was used in setting the clock. That will occur, for example, if the user attempts to enter a universal time such as the number "eighteen hundred". As embodied, the system contemplates use of time information represented only in AM and PM modes. If desired, however, the ROM program could be changed to accommodate time on the basis of a twenty-four hour format. In that case, of course, the AM/PM pushbutton no longer would be needed. When an instruction is entered that results in a temperature conflict as between heating and air conditioning, an "Err4" or "Err5" will appear. Besides giving that message, the thermostat automatically resolves that conflict so that both heating and air conditioning cannot occur simultaneously.

Finally, and in connection with battery monitor 102, a display of the signal "Err7" indicates that the battery is becoming weak. This warning will be indicated upon depression of either a START or a REVIEW pushbutton for the first time. Upon quickly again depressing that key, the error code "Err7" will disappear, and the unit can again be normally operated until there is such additional degree of weakening of the battery as to prevent operation in the battery-supplied mode, normal functioning always being available so long as the input alternating-current is supplied to terminal 120.

It is significant to note that one purpose of including battery 152 is to preserve user-programmed information in the event of an external power failure during normal operation. Of course, the battery should be replaced any time that the "Err7" signal appears. Battery 152 also serves to enable the unit to be disengaged from its mounting and, for example, to be carried from room to room to check upon different temperature variations or to be placed on a table for convenience during user programming.

As specifically embodied in accordance with the foregoing description, it may be noted that there are twenty-three possible set points to any integer temperature from fifty degrees (50°) F. to eighty-nine degrees (89°) F. Each set point controls the temperature for a particular day only, a group of days or every day. Display device 200 automatically is disabled after a preselected observation period, provided that the keyboard has not been used during that interval in a manner to effect a data operation. In general, this exemplified system is designed to maintain a temperature accuracy to within one degree Fahrenheit over the operating range.

In a system which utilizes a pilot, such as a furnace fueled with gas or oil, it is possible to manipulate a conventional electro-mechanical thermostat in a manner to literally blow out the pilot. This can occur if the gas valve is opened only for about one to two seconds and is then closed. That causes the flow of gas to be turned off at about the same time that ignition occurs, and the resulting explosion or implosion may extinguish the pilot. To avoid that possibility, and thus for the purpose of safety, the values of capacitor C9 and resistor R20 are selected so that, together with inverters 210 and 211, there is a time delay of about four and one-half (4.5) seconds after opening of the gas valve before it can be closed.

As already indicated, the thermostat is contained primarily within a housing 222. With reference to FIGS. 9-14, the overall assembly includes a mounting plate 240, a lower housing portion or base 242, a printed circuit board 244, an upper housing portion or case 246, battery compartment cover or plate 226 and transparent cover 228.

Mounting plate 240 is intended to be affixed to the wall of a room at the location on the wall from which the wires that lead to the heating and/or air conditioning systems emerge. Of course, any existing thermostat assembly is first removed. After feeding the wires through an opening in plate 240, the plate is secured to an electrical junction box, as provided in the wall and of typically appropriate size, or directly to the wall by means of suitable fasteners. In a manner to be described further, the wires are connected to respective different resilient contact members on plate 240. Also included on plate 240 are fastening parts that mate with other fastening parts on the bottom of base 242 in a manner to permit housing 222 thereafter to be mounted upon plate 240 by being simply slipped into place. At the same time, the aforementioned contact members are arranged in association with other contacts in housing 222 so as automatically to complete electrical connection to the thermostat. As desired at any time thereafter, housing 222 may be slipped from its mounting upon plate 240 and carried elsewhere. During that time of removal, the thermostat continues to operate from its self-contained battery 152. The thermostat subsequently may be remounted upon plate 240 as easily as before.

Figure 11:
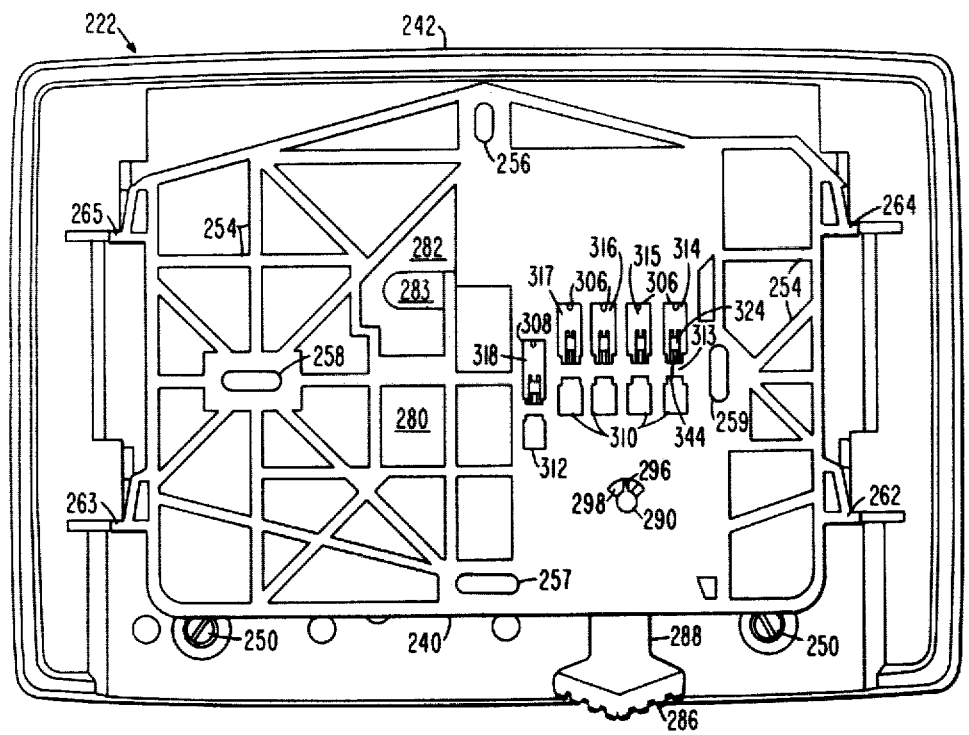
FIG. 11 is a bottom plan view thereof.
Figure 17A:
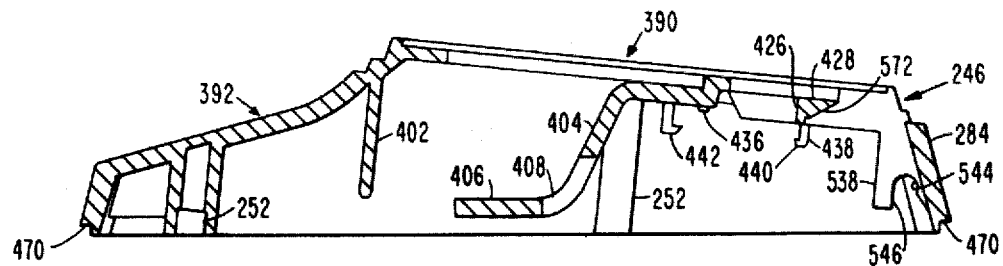
FIG. 17A is a view taken along the line 17A—17A in FIG. 17.
Figure 18:
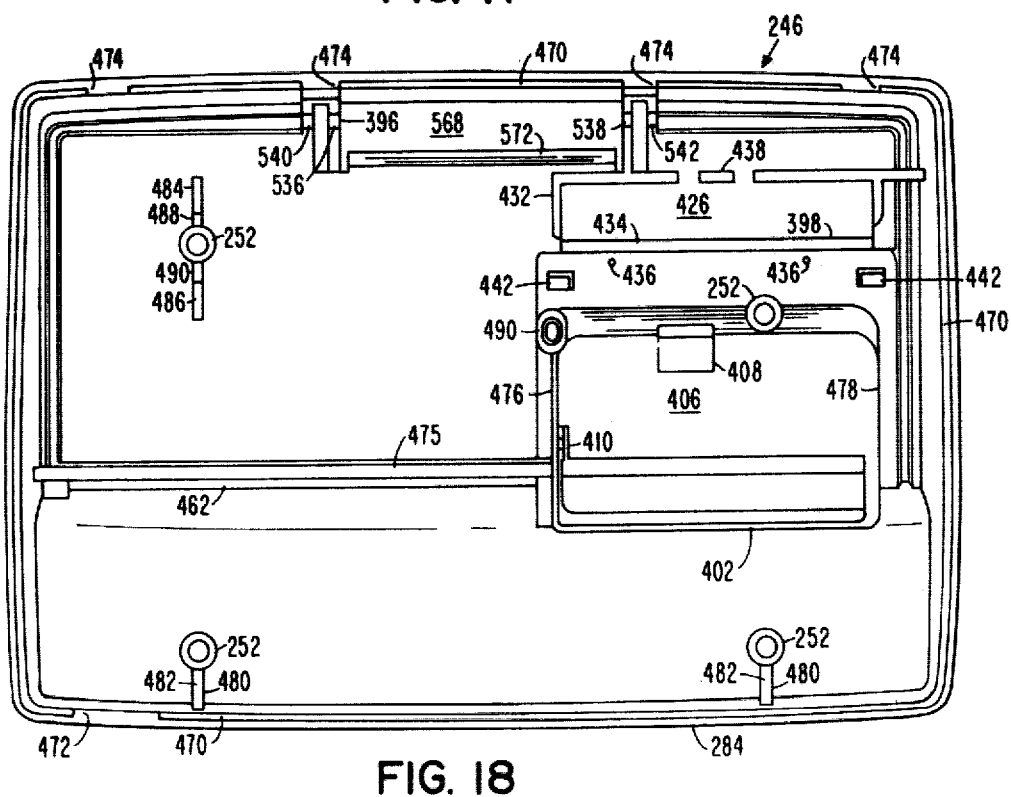
FIG. 18 is a bottom plan view of the case, again with certain components removed.
Figure 21:
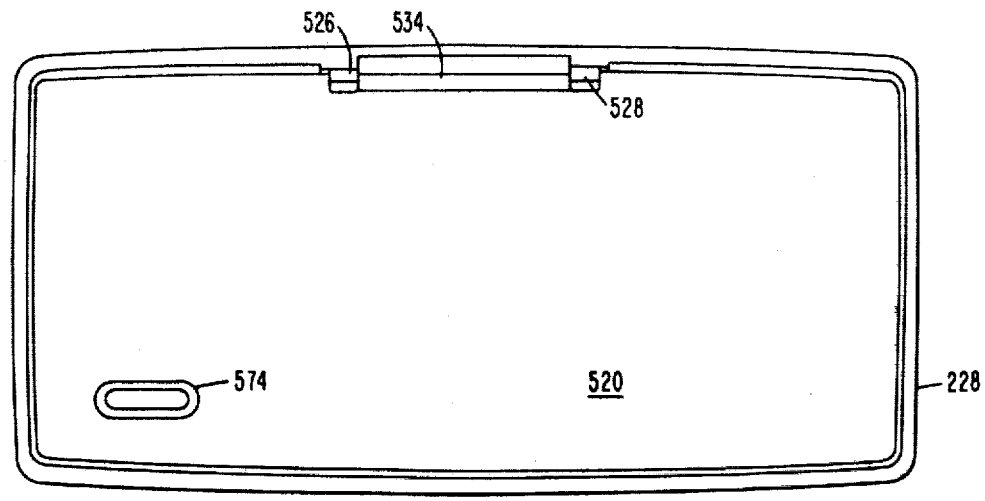
FIG. 21 is a bottom plan view of a cover shown in FIG. 14.
Figure 21A:
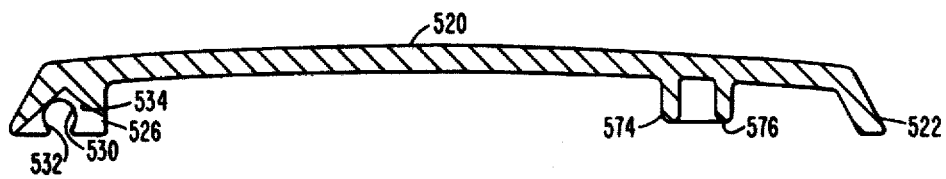
FIG. 21A is an enlarged cross-sectional view taken along the line 21A—21A in FIG. 14.

FIG. 11 is a view of the side of mounting plate 240 that, when installed, faces the wall. Also visible in FIG. 11 is the bottom of base 242 as mounted in place upon plate 240. To be seen also are the heads of two of a total of four mounting screws 250 which project through base 242 into engagement over a correspondingly aligned plurality of hollow posts 252 which depend downwardly from the top of case 246 for completing the assembly of housing 222 (FIGS. 17A and 18).

Mounting plate 240 is molded from an electrically-insulative plastic material and shaped to include a matrix of reinforcing ribs 254 that lend rigidity. A first pair of elongated holes 256 and 257 are located centrally near respective opposing margins, and another space-opposed pair of elongated openings 258 and 259 are respectively located near the other pair of opposed side margins. The nominal distance between each space-opposed pair of openings 256-259 is the same as that between the threaded mounting holes provided in a standard 2×4 inch electrical junction box as often installed in the wall of a building for the mounting of a thermostat. Thus, the two pairs of these holes permit mounting to such a box whether it is oriented horizontally or vertically. Moreover, the two of the holes in each space-opposed pair are elongated in respective directions at right angles to one another to accommodate slight variations as among different junction boxes and also to allow the mounting of plate 240 in a level position even though the junction box is a little tilted as installed in the wall. As indicated above, selected ones of holes 256-259 may, in the alternative, be used for the receipt of fasteners of some other kind used for the purpose of securing plate 240 to the wall in a different manner. On the other side of plate 240, as may be seen in FIG. 15, the reinforcing ribbing on that surface is formed as at 260, for example, to generally encircle each of holes 256-259, and the surface is depressed within each such encirclement so that a well is defined to accommodate the receipt of the head of a screw or other wall fastener that will thereby not interfere with the mounting of housing 222 and result in a thinner profile of the mounted thermostat.

Projecting outwardly from the lateral margins of plate 240, near its bottom margin as mounted, are respective lugs 262 and 263. Also projecting from those lateral margins, but near the top of plate 240 as installed, are respective ones of another pair of lugs 264 and 265. As may be seen in FIG. 15A, each of lugs 262 and 263 is shaped to define a finger 266 on which is formed a notch 268 from which the finger narrows in the direction toward the open end of the lug. Lugs 264 and 265 have the same shape except for the omission of notch 268.

Figure 16:
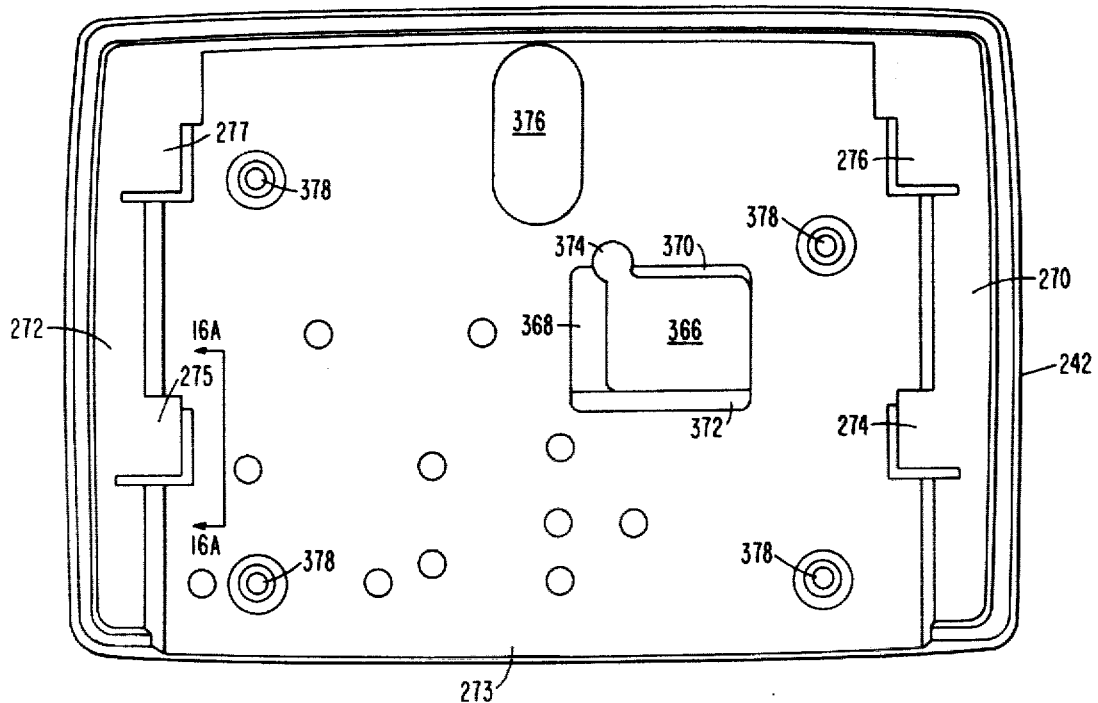
FIG. 16 is a bottom plan view of a base portion of the housing.
Figure 16A:
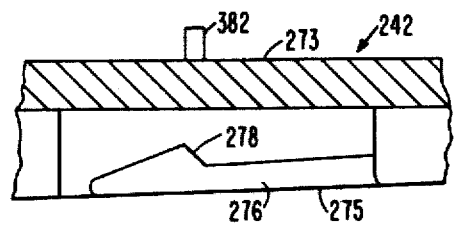
FIG. 16A is a cross-sectional view taken along the line 16A—16A in FIG. 16 and rolled over by 180°.

Turning for a moment to FIG. 16 for a look at the bottom surface base 242, it will be observed to have a space-opposed pair of lateral margin areas 270 and 272 between which is recessed a panel 273 that constitutes most of the bottom surface. Projecting toward one another from areas 270 and 272 are a pair of respective ears 274 and 275 located in a position below the middle of panel 273 as viewed in FIG. 16. Disposed upwardly therefrom and projecting toward one another from margins 270 and 272 are another pair of ears 276 and 277. With reference to FIG. 16A, it will be observed that ear 275 is in the form of a finger 276 shaped to include a notch 278 from which the finger narrows toward the open end of the ear. Ear 276 is formed in the equivalent manner. Ears 276 and 277 are of essentially the same shape as ear 275 except for the omission of notch 278.

The different ones of lugs 262–265 are located in a pattern which corresponds with a pattern of respective ears 274–277. Lugs 262–265 may be defined as slideways and ears 274–277 as guideways. To mount housing 222 upon mounting plate 240, therefore, it is only necessary to align the various lugs and ears and slide them together into mutual interrelationship. This is the same as if FIG. 16A were moved generally to the left into FIG. 15A until finger 276 was fully beneath the full length of finger 266. Fingers 266 and and 276, and their corresponding equivalents, are slightly resilient as a result of which the different notches 268 and 278 become sufficiently interengaged to seat housing 222 in proper position on plate 240, while yet permitting rather easy disengagement when desired. Note that FIG. 16A has been rolled over one-hundred-eighty degrees with respect to what normally would be indicated by the section line 16A—16A in FIG. 16.

Somewhat centrally disposed in mounting plate 240 is an opening 280 spaced below another opening 282 slightly beneath which, as viewed in FIG. 11, is a smaller tab 283. During installation of mounting plate 240 on the wall, the wiring preferably is led through opening 280 and then tucked under tab 283 (as viewed in FIG. 15) before being connected to switch contacts mounted upon plate 240. If the wires are too short, they may be led directly through opening 282.

Mounted on and projecting downwardly below the bottom margin of mounting plate 240 as installed is the free end 286 of a switch handle in the form of a lever 288 that has a pivot pin 290 captivated in a bearing hole 292, formed through plate 240, by a lip 294 which overlies a stub 296 projecting radially outward from pin 290 (see both FIGS. 11 and 15). Stub 296 swings within an annular segment 298 opening outwardly from the upper side of bearing hole 292. Lip 294 only partially overlies segment 298 so as to leave a small gap 300 through which stub 296 may be inserted into the segmental region beneath the lip during assembly.

Figure 15:
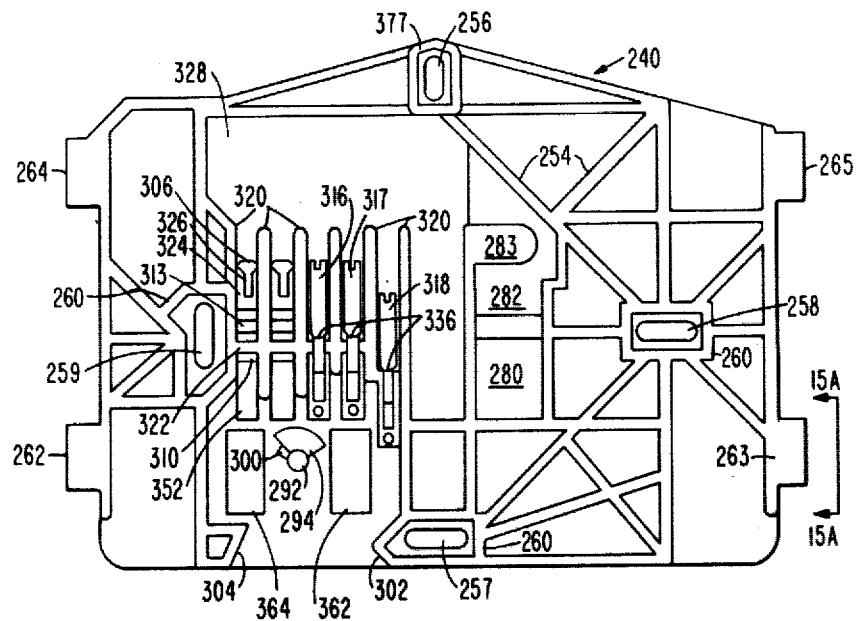
FIG. 15 is a top plan view of a mounting plate shown in FIG. 11 as affixed to the rear of the housing, two spring contacts and a switch lever having been removed.
Figure 15A:
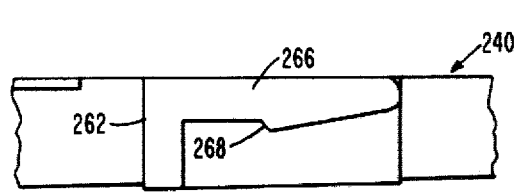
FIG. 15A is a fragmentary side-elevational view taken along the line 15A—15A in FIG. 15.

Lever 288 has been removed in FIG. 15 but may be seen as mounted in FIG. 14. Light finger pressure against its preferably knurled free end 286 is sufficient to swing lever 288 about pin 290 between space-opposed limits 302 and 304 as defined by reinforcing ribs on the surface of plate 240 visible in FIG. 15 and as seen in FIG. 14.

Also formed through mounting plate 240 are a first series of four successively and laterally spaced like openings 306 and a fifth opening 308 of the same shape spaced beyond that series and displaced slightly in a downward direction as viewed in FIG. 11. Spaced respectively just below each of all of those openings are another series of four openings 310 followed by a fifth opening 312 beneath opening 308. The space between each upper and lower opening serves as a reinforcing rib 313 for this region of plate 240 which otherwise might be excessively weakened by the provision of so many openings in a limited area; rib 313 also has another purpose to be described below.

Viewable in FIG. 11 through all of the openings just described are the legs of a plurality of resilient contacts 314, 315, 316, 317 and 318. Turning to FIG. 15, it will be observed that resilient spring contacts 314 and 315 have been removed to permit a view of what lies beneath. Upstanding from the surface of plate 240 presented in FIG. 15 are a series of vertically-oriented ribs 320 each successive pair of which is aligned with opposing sides of the different ones of openings 306, 308, 310 and 312. Extending laterally across all of ribs 320 is a reinforcing rib 322. Toward the upper end of ribs 320 and respectively spanning the spaces therebetween are a series of webs 324 each of which includes an upwardly opening slot 326 which, as shown, diverges apart at its upper end portion. As viewed in FIG. 15, the bottom surfaces of rib 322 and webs 324 are aligned at slightly above the level of the main surface 328 of mounting plate 240 which extends between ribs 320. At the same time, the top surface of rib 313, as viewed in FIG. 15, is aligned at that level.

Figure 19:
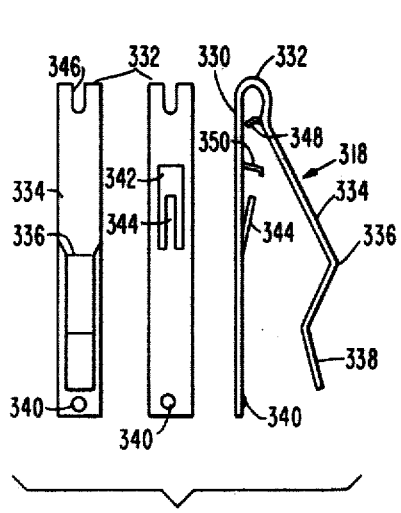
FIG. 19 is, from left to right, a top plan view, a bottom plan view and a side elevational view of a contact shown in place in FIG. 15.

Resilient spring contact 318 is shown in FIG. 19. It is formed as a spring-tempered strip of an electrically-conductive material such as a phosphor-bronze alloy and includes a leg 330 which merges into a smoothly-curved re-entrant bend 332. Beyond bend 332, the strip continues as a finger 334 bent away from leg 330 at its upper end, bent back toward leg 330 at an intermediate crease 336 and then once again bent slightly away from leg 330 at the beginning of its free end portion 338. Starting at crease 336 and continuing through its free end portion 338, finger 334 is necked down to a narrower width.

Near the lower end of leg 330, the strip is deformed over a small circular area to form a button 340 which faces finger portion 338. Intermediate the length of leg 330 is a cutout 342 shaped to leave a narrow projection 344 located centrally within cutout 342 and the free end of which faces bend 332. Another cutout 346 is formed centrally around the circumference of bend 332 and in a manner to leave a stub 348 that projects toward leg 330 with its free end spaced but a short distance therefrom when the contact is in its normal unflexed condition as shown in FIG. 19. Also as a result of the formation of cutout 342, an ear 350 is bent upwardly from leg 330 so as to project toward leg 334 a distance insufficient to interfere with the bending of finger 334 toward leg 330 an amount to move portion 338 against button 340.

For convenience, contacts 314-317 are identical to contact 318, although, as will become apparent, button 340 is superfluous on contacts 315 and 316. The width of the strip from which the resilient contacts are formed is selected so that the width of leg 330 and bend 332 is only very slightly less than the spacing between each pair of ribs 320. The latter, together with cross ribs 313 and 322 as well as web 324, defined a channel within which the leg 330 of each contact is snugly received and seated. As each leg 330 is inserted into its channel, its free end passes over cross rib 313, then under cross rib 322 and finally into a position disposed in a very shallow channel 352 defined in surface 328 of plate 340. Although thin, the finite thickness of leg 330 is sufficient that the leg has to curve slightly over rib 313 which ends up being aligned near the bottom of cutout 342. As a result, the free end of projection 344 is deflected slightly toward finger 334, so as to become seated against the downwardly-facing end surface of web 324 as viewed in FIG. 11. Once mounted, therefore, each contact is constrained to remain in place during connection of a wire to it and also during mounting and dismounting of housing 222 from plate 240.

After installation of mounting plate 240 on the wall, the end portion of each wire is stripped of insulation for a short distance and the bared portion is inserted through cutout 346 in bend 332 and under stub 348 until the end of the wire abuts ear 350. Even in the unflexed condition of finger 334, the spacing between the free end of stub 348 and leg 330 is sufficiently narrow that the bared wire end portion is gripped. As finger 344 subsequently is deflected toward leg 330 upon mounting of housing 322 to plate 340, that gripping pressure is further increased.

It will be seen in FIG. 14 that a pair of arms 354 and 356 project generally outward from respective opposing sides of the upper end of lever 288. Affixed on the underside of those arms is an outwardly-facing generally C-shaped sheet of resilient conductive material the respective end portions of which define contact areas 358 and 360.

Area 358 is so shaped that it makes wiping connection with button 340 of contact 318 throughout the range of swing of lever 288. Moreover, area 358 is also shaped and so disposed that, when lever 288 is swung toward its limit 302, area 358 comes into wiping connection over button 340 of contact 317. On the other hand, the swinging of lever 288 toward its opposite limit 304 serves to bring area 360 into wiping contact over button 340 of contact 314. As already mentioned, the mounting of housing 222 upon plate 340 results in flexural bending of fingers 334 toward the corresponding legs 330. However, the free end portion 338 of the finger 334 of each of contacts 314, 317 and 318 is shaped so that at least those free end portions on contacts 314 and 317 are always clear of the respective ones of contact areas 358 and 360, so as not to interfere with movement of the latter into and out of connection with the corresponding buttons.

Although it may be affixed in any suitable manner, the sheet which forms contact areas 358 and 360 is in this case staked onto mounting pins (not shown) on the underside of lever 288 as viewed in FIG. 14. During movement of the lever, the ends of those pins ride within shallow channels 362 and 364 (FIG. 15) defined in surface 328 of plate 240. Because legs 330 are seated into channels 352, contact areas 358 and 360 ride over the very lower end of the corresponding legs 330 as they approach rounded buttons 340.

Referring back to FIG. 2, it may now be appreciated that lever 288 serves as the switch for manually controlling the functions associated with the circulating fan or blower of an air conditioner. That is, contact 318 is terminal 140 and areas 358 and 360 constitute switch element 142. Contact 317 corresponds to terminal 141, while contact 314 corresponds to terminal 139.

Returning to FIG. 16, a generally-rectangular opening 366 is formed through panel 273 in a position to allow the central portion of the fingers 334 of each of contacts 314-317 to project therethrough when housing 222 is mounted on plate 240. At one side of opening 366, and recessed into the surface of panel 273 as viewed in FIG. 16, is a shelf 368. Shelf 368 is so positioned that, when housing 222 is mounted upon plate 240, contact 318 is aligned over the shelf. Because housing 222 is formed of a molded plastic which is an electrical insulator, this serves to isolate contact 318 from electrical components within housing 222, while at the same time ensuring that the finger 334 of contact 318 is depressed so as to increase the gripping pressure of that contact upon its connected wire end. The upper and lower edge margins 370 and 372 of opening 366 are beveled away from the opening so as to assist the creases 336 of fingers 334 in gliding into and out of position as housing 222 is mounted and dismounted from plate 240.

Formed through panel 273 at one corner of opening 366 is a circular hole 374 of a diameter sufficient to permit the insertion of a screw driver for a purpose later to be described. Centrally located in the upper portion of panel 273, as viewed in FIG. 16, is another somewhat large and vertically elongated opening 376. To facilitate mounting of housing 222 on plate 240, the thickness of plate 240 is tapered so as to become thinner in the direction from lugs 262 and 263 toward lugs 264 and 265. That taper can be seen in FIG. 14. To allow an adequate recess for the head of a screw inserted through hole 256, its surrounding rib 377 projects above the level of the ribs 260 that encircle the other mounting holes. Opening 376 accommodates rib 377. Moreover, the side walls of opening 376 tend to guide rib 377 during mounting of housing 222, so as to align ears 274-277 properly with lugs 262-265.

Also visible in FIG. 16 are a plurality of openings 378 through which screws 250 are inserted to enable engagement within the correspondingly positioned hollow posts 252 formed in case 246. Each of openings 378 is surrounded by a boss which defines a seat so that the flat head of each screw 250 is out of the path of the bottom of housing 222 during mounting and dismounting.

As may be observed in FIG. 14, the other side of each of openings 378 is surrounded by a boss 380 of an internal diameter sufficient to receive and seat the very lower end of each of the corresponding ones of hollow posts 252 and thereby matingly align case 246 with base 242. Also projecting upwardly from base 242 immediately on the inside, and distributed around an upwardly facing rim 381 of the base, are a plurality of upwardly projecting guides 382 over which are fitted corresponding portions of the lower margin of the skirt 284 of case 246.

Figure 17:
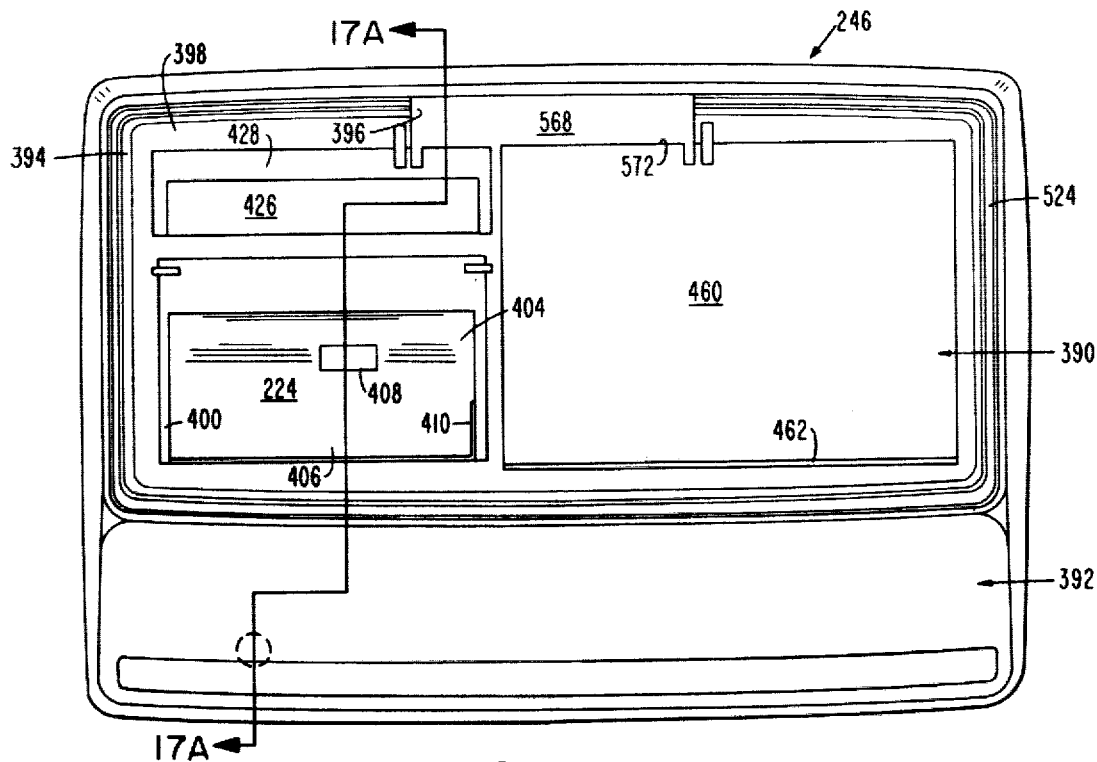
FIG. 17 is a top plan view of a case portion of the housing, certain associated components, shown in FIGS. 9, 10 and 14, having been removed.

FIGS. 17, 17A and 18 are views of case 246 as stripped of associated parts shown in other views and some of which have already been mentioned. For this discussion of case 246, it will be assumed that the case is in an upright position as if the free margin of its skirt 284 were placed against the wall. A control panel area 390 occupies approximately the upper two-thirds of case 246 and is tilted so that its upper margin is spaced slightly to the rear of its lower margin. Continuing downwardly below control portion 390, as it slopes generally to the rear before merging into skirt 284, is a lower panel 392.

Surrounding control portion 390 is an upstanding rim 394 which is continuous except for a gap 396 formed centrally in its upper leg. Immediately inside rim 394 throughout the extent of the latter, so as also to include gap 396, is a shelf 398 upon which bezel 220 is supported as shown in FIGS. 10 and 14. Depressed further to the rear from shelf 398, and around both sides and across the top of battery compartment 224, is a further shelf 400 upon which cover plate 226 is to be mounted as shown in FIG. 10.

Battery compartment 224 is defined by a lower wall 402 (FIG. 17A), which depends rearwardly from near the upper margin of sloping panel 392, and an upper wall 404 that slopes rearwardly and downwardly from the upper margin of shelf 400 and merges into a ledge 406 which projects toward wall 402. An opening 408 is located intermediate the width of wall 404 and continues a short distance into ledge 406. Near the lower right-hand corner of ledge 406, as viewed in FIG. 17, is a small slit 410 through which the leads to battery 152 are fed when the battery is installed within compartment 224.

Battery cover 226, with the decal 412 of FIG. 26 removed, is shown in FIG. 24. In FIG. 10, decal 412 is mounted in place upon the outer surface 414 of cover plate 226 that has a rim 416 which surrounds that surface except for a gap 418 in the middle of the top margin. Decal 412 is coated with a self-sticking adhesive on its undersurface so as to secure itself to surface area 414 of cover 226 during assembly. Along the lower margin of cover 226 and projecting away therefrom is an inwardly-displaced lip 420. Projecting below surface 414 at the lower edge of an opening 421 therein is a tongue 422 having a catch 424. To install cover 226, lip 420 is tucked behind shelf 398 at the lower margin of battery compartment 224 and, as cover 226 is pushed into place, catch 424 slides down sloping wall 404 until it snaps into opening 408 aligned therewith and latches against the upper margin of that opening. The engaging face of catch 424 is slightly canted so that, upon slipping a fingernail into gap 418 and under surface 414, cover 226 is easily pulled open to permit access to the battery.

Spaced above battery compartment 226 is an opening 426 behind which display device 200 is to be mounted. Recessed below shelf 398 and surrounding the top and both sides of opening 426 is a further shelf 428 upon which a lens 430 (FIG. 10), shaped to fit snugly within the outline of shelf 398, is mounted. Lens 430 is transparent but preferably of the same color as the light emitted from display device 200 so as to improve contrast of the displayed numbers and letters in the presence of ambient light reflection from the lens.

The legend "TEMP DAY TIME", as shown in FIG. 10, is printed in contrasting color across the upper portion of lens 430 and is located so as to appear over the illuminated digits displayed. Display device 200 is shown in FIG. 23A and will be observed to be of generally rectangular shape and comparatively thin. It features a row of lenses 431a behind the operative ones of which are disposed light-emitting diodes of the seven-segment type as indicated in FIG. 5 (except for the colon). A narrow ledge 431b is formed on the lower margin along one side of the row of lenses, and a wider ledge 431c is provided along the opposite lower margin. A row of pin terminals 431d, corresponding to pin terminals 1-20 shown in FIG. 5, are disposed in ledge 431c.

Along the top and down both sides, as seen in FIG. 18, opening 426 continues into a partial rim 432. Along the bottom of opening of 426, defined by a portion of shelf 398, is a ledge 434 just below which are a pair of spaced posts 436. Disposed centrally along the upper margin of opening 426, and projecting away from the lower surface of control portion 390, is a tongue 438 having a catch 440 on its free end (FIG. 17A). Spaced below and to the outside of posts 436 are a corresponding pair of cleats 442 which face catch 440 at the same level. Rib 432 together with posts 436 and shelf 434 all form a seat for display device 200. Lenses 431a, of course, face lens 430. Ledge 431c rests on posts 436 and is confined under cleats 442. Ledge 431b rests on rim 432 and is engaged by catch 440.

Recessed below the level of shelf 398, and occupying a little more than half of control panel 390, is a large flat area 460 on which keyboard 110 of FIG. 25 is seated as shown in FIGS. 10 and 14. In contrast with FIGS. 10 and 14, however, the labels in FIG. 25 include both START HEAT and START AIR legends in substitution for the single START label shown in the earlier figures. Formed through panel 390 along the bottom of area 460 is a narrow slit 462 through which a flat flexible package or cable 464, within which are a plurality of conductive leads as indicated at 466, is inserted and fed as keyboard 110 is moved into position on area 460.

A wide variety of keyboard assemblies are available in the marketplace, and the configuration of case 246 could be adapted to accommodate a number of them. The particular keyboard assembly embodied herein and illustrated in FIG. 25 is a very thin sandwich of several flexible layers of insulating material. From the perspective of viewing FIG. 25, there is an underlying layer on the bottom surface of which is a self-sticking coat of adhesive covered with a peel-off plastic-coated protective paper sheet which, during assembly, is peeled off to permit the keyboard assembly to be adhesively secured to area 460. An array of conductive contact pads, distributed in a pattern corresponding to the layout of "keys" or "buttons" depicted in FIG. 25, is printed upon the upper surface of that first flexible layer along with several interconnecting leads as defined in FIG. 5 and which continue within cable 464.

Lying on top of that first flexible layer is a sheet of insulating material through which is defined an array of openings that expose each of the contact pads printed upon the upper surface of the first layer but cover the wiring also printed on that first layer. Such openings are known in the art as "cages". Overlying that layer of cages is a third flexible sheet of insulating material on the lower surface of which, facing the cage sheet, is printed another array of conductive contact pads individually disposed so as to be aligned over respective different ones of the contact pads printed on the first layer and, thus, also aligned with the cage openings. Also included on the undersurface of this third flexible layer is the necessary additional wiring, again as defined in FIG. 5, which similarly is extended down cable 464. As discussed previously in connection with FIG. 5, the contact pad printed on this third layer and underlying the START position in FIGS. 10 and 14 is separated into a pair of slightly spaced segments each having an individual printed connection and which individually underlie the respective START HEAT and START AIR positions as shown in FIG. 25.

Printed on the upper surface of the flexible third layer is a grid in the form of a succession of laterally spaced narrow conductive lines that are all electrically connected together and to a conductor within cable 464. It is that conductive grid which serves as electrostatic shield 192 previously discussed in connection with FIG. 5. Finally, a decal 468, carrying the printing indicated in FIG. 25 (or as indicated in FIG. 10 for a heat-only model), is adhesively fixed on top of the third layer and over the conductive grid. The intermediate cage-forming layer is sufficiently thin that only light finger pressure applied on any key or button area is enough to move the uppermost one of the underlying pads through the cage opening and into contact with the bottom contact pad, so as to complete a connection and thus close the "pushbutton".

After keyboard assembly 110 has been affixed to surface 460, bezel 220 is cemented or otherwise secured so as to overlie the keyboard and define the pushbutton openings as well as to frame both battery compartment 224 and opening 426, bezel 220 generally lying on top of shelf 428. The opening over battery compartment 224 is sufficiently large to accept battery cover 226 while the bezel strip at the bottom of opening 426 projects slightly over that opening in order further to confine lens 430 in place. Similarly, the surrounding portions of the bezel serve to additionally secure the edge margins of keyboard assembly 110. For the specific keyboard shown in FIG. 25, it is preferred that bezel 220 include a leg disposed between the pair of "start" buttons.

Figure 12:
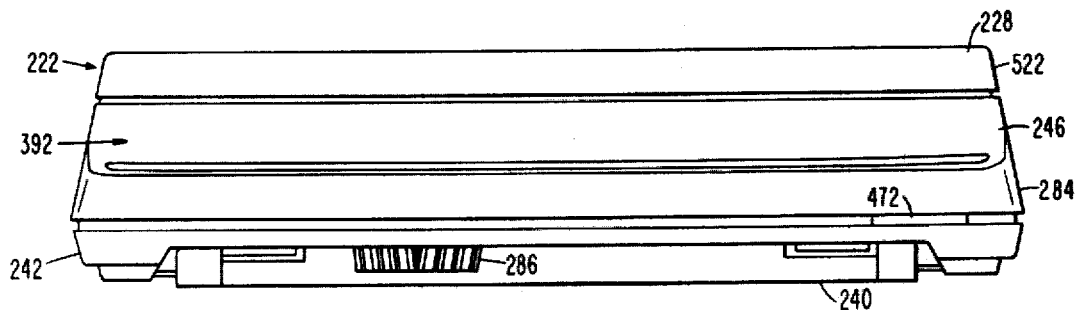
FIG. 12 is a front elevational view thereof.
Figure 13:
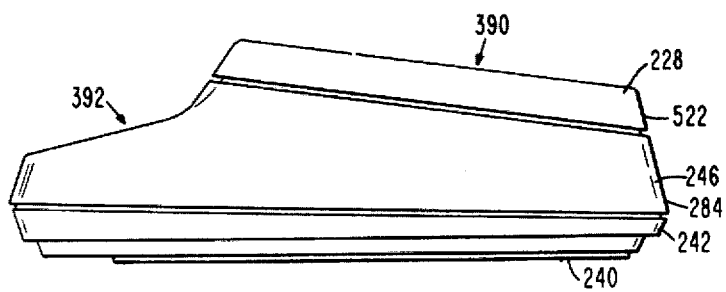
FIG. 13 is a side elevational view thereof.

Formed around the lower margin of skirt 284 of case 246 is a downwardly depending lip 470 having a downwardly-facing end surface aligned with the upperwardly-facing surface of rim 381 around the margin of base 242. When case 246 is mated to base 242 and the lower ends of posts 252 are seated within wells 380, lip 470 closes the space between case 246 and base 242 except at a gap 472 in lip 470, near the lower left hand corner of case 246 as viewed in FIG. 18, and a plurality of gaps 474 formed in lip 470 and distributed along the upper margin of case 246. When base 242 and case 246 are joined together, those gaps define openings into the interior of housing 222. As seen in FIG. 12, gap 472 is disposed at the bottom of the housing when housing 222 is mounted on plate 240 so as to be vertically oriented. The purpose of these various openings defined by gaps 472 and 474 will be set forth below.

Again viewing the bottom of case 246 as shown in FIG. 18, a web 475 will be seen to extend all of the way between skirt 284 and an end wall 476 of battery compartment 224, the battery compartment being completed by the formation of an opposing end wall 478. Web 475 is located just above slit 462 along the lower margin of area 460 and thus serves to rigidify the latter. Connected between skirt 284 and the pair of posts 252 along the lower margin of case 246 are webs 480 which are also formed integrally with the underside of sloping panel portion 292. Each of webs 480 defines a flat 482 disposed in alignment with about the middle of the opening defined by gap 472. The outer ends of posts 252 project beyond flats 482 by a distance slightly greater than the thickness of printed circuit board 244.

Post 252, toward the upper left-hand corner of FIG. 18, is supported from the underside of area 460 by upstanding generally-triangular-shaped and space-opposed webs 484 and 486 each of which is slightly truncated in order to define respective flats 488 and 490 which are at the same level as flats 482. Moreover, the undersurface of ledge 406 adjacent to the remaining post 252 is also at the level of the different flats just discussed. The uppermost ones of these other posts 252 project beyond that level to the same extent as the lower posts 252. Included at the upper left-hand corner of the battery compartment as seen from the bottom in FIG. 18, and in alignment with opening 374 in base 242, is an additional hollow post 490 the outer end of which is also disposed at the level of the different flats and the undersurface of ledge 406.

Circuit board 244 is dimensioned to be received within lip 470 and includes four openings 492 distributed in a pattern corresponding to the pattern of layout of posts 252 and each of a diameter to fit with only slight tolerance over the protruding ends of the respective posts. Thus, upon assembly, circuit board 242 rests upon all of the different flats, the top of additional post 490 and the facing surface of ledge 406. Circuit board 244 has a thickness such that the outer end portions of posts 252 project through board 244 a distance just sufficient to enter into the wells defined within bosses 380 on panel 273 of base 242. Therefore, when screws 250 are inserted from the bottom of base 242 and tightened into the bores of posts 252, circuit board 244 is clamped tightly into a fixed position within the housing. Also formed through circuit board 244 is an aperture 494 which, when the circuit board is mounted in place over posts 252, is aligned with the bore of post 490.

Board 244 is of conventional construction, being composed of a semi-rigid insulative substrate through which are formed a large plurality of small pin apertures each sized to receive the conventional wires from discrete electronic components and terminal pins which project outwardly from integrated circuits and the like. The underside carries a printed circuit defined in accordance with FIGS. 2-5. It typically may be formed by coating the undersurface with a thin layer of copper and then, using a conventional photoresist or similar masking technique, etching away selected areas of the copper so as to leave only the desired conductive paths that interconnect the various different ones of the pin apertures as needed to complete the circuitry and also to form a small conductive soldering ring surrounding each pin or wire-receiving aperture. At the same time, four much larger conductive pad areas, each about the size of a numbered pushbutton area of keyboard assembly 110 which is drawn to scale, are formed and disposed in positions to be aligned respectively with the fingers 334 of contacts 314–317 when those fingers project through opening 366 in panel 273 upon mounting of housing 222 to mounting plate 240. That is, the crease 336 of each finger 334 constitutes an electrical contact which is wiped against a respective one of the large conductive pads, printed on the undersurface of circuit board 244, as housing 222 is mounted on plate 240. Accordingly, the wires secured to each of contacts 314–317 are connected by creases 336 of fingers 334 into the circuitry defined on board 244 through the mere act of mounting housing 222 upon plate 240. A pair of electrically separate contact ring segments also are formed so as together almost to complete encirclement of opening 494. With reference to FIG. 2, those two rings constitute terminals 120 and 141. When a small screw is inserted through opening 374 in base 242 and threaded into the bore of post 490 through aperture 494, the head of the screw conductively bridges those two segments when the screw is tightened. Consequently, the screw head serves the function of jumper 143. Preferably, all of the plated and etched undersurface is coated with an insulating material except for the immediate sites of each of the different conductive pads and rings.

Subject to a few constraints, the layout of the various different components on the upper surface of board 244 is primarily determined by space considerations and the necessary distribution of the printed wiring pattern on the underside of the board. One such constraint previously mentioned was the desirability of locating capacitor C13 physically close to the Vcc terminal of microcomputer 150. Another is to provide a series of connection apertures in a position convenient for the coupling of cable 464 (see FIG. 22A). Of similar consideration would be the provision of another series of connecting apertures directly beneath display device 200. Additionally, thermistor RT1 of temperature sensor 108 (FIG. 3) is located immediately inside the opening defined by gap 472.

During operation, the various electrical components within housing 222 dissipate a small quantity of heat. The dissipation of that heat creates a chimney effect between the lower opening defined by gap 472 and the upper openings defined by gaps 474 as well as other more upward openings through which there is a degree of leakage. This chimney effect creates a continual flow of room air into the lower opening at gap 472 and out of the more upwardly disposed openings. Being located just inside the opening defined by gap 472, thermistor RT1, therefore, is able to obtain an accurate reading of the actual temperature of the room air without distortion by, but taking advantage of, the heat dissipated by the other electrical components.

Figure 22A:
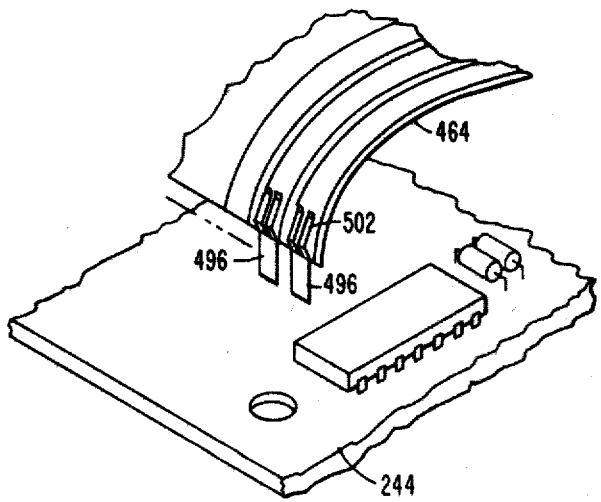
FIG. 22A is an enlarged fragmentary isometric view of a component shown in FIG. 14 as connected to a component shown in FIG. 25.
Figure 22B:
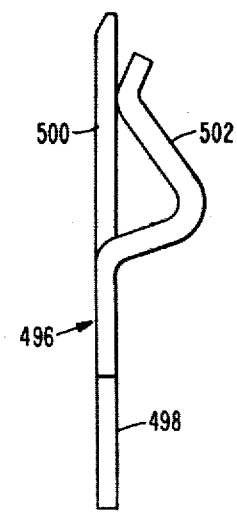
FIG. 22B is an enlarged side elevational view of a subcomponent shown in FIGS. 14 and 22A.
Figure 27:
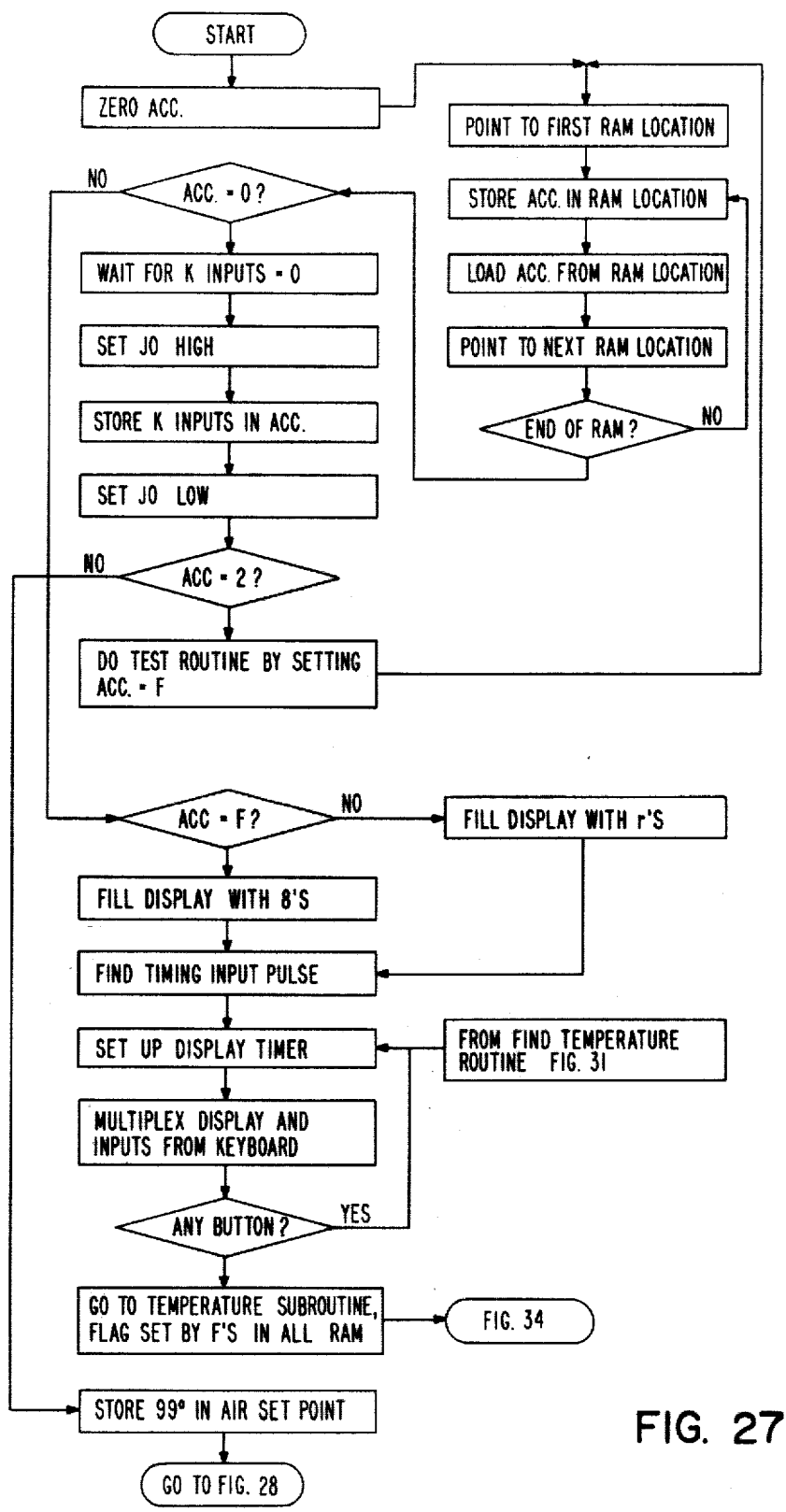
Figure 28:
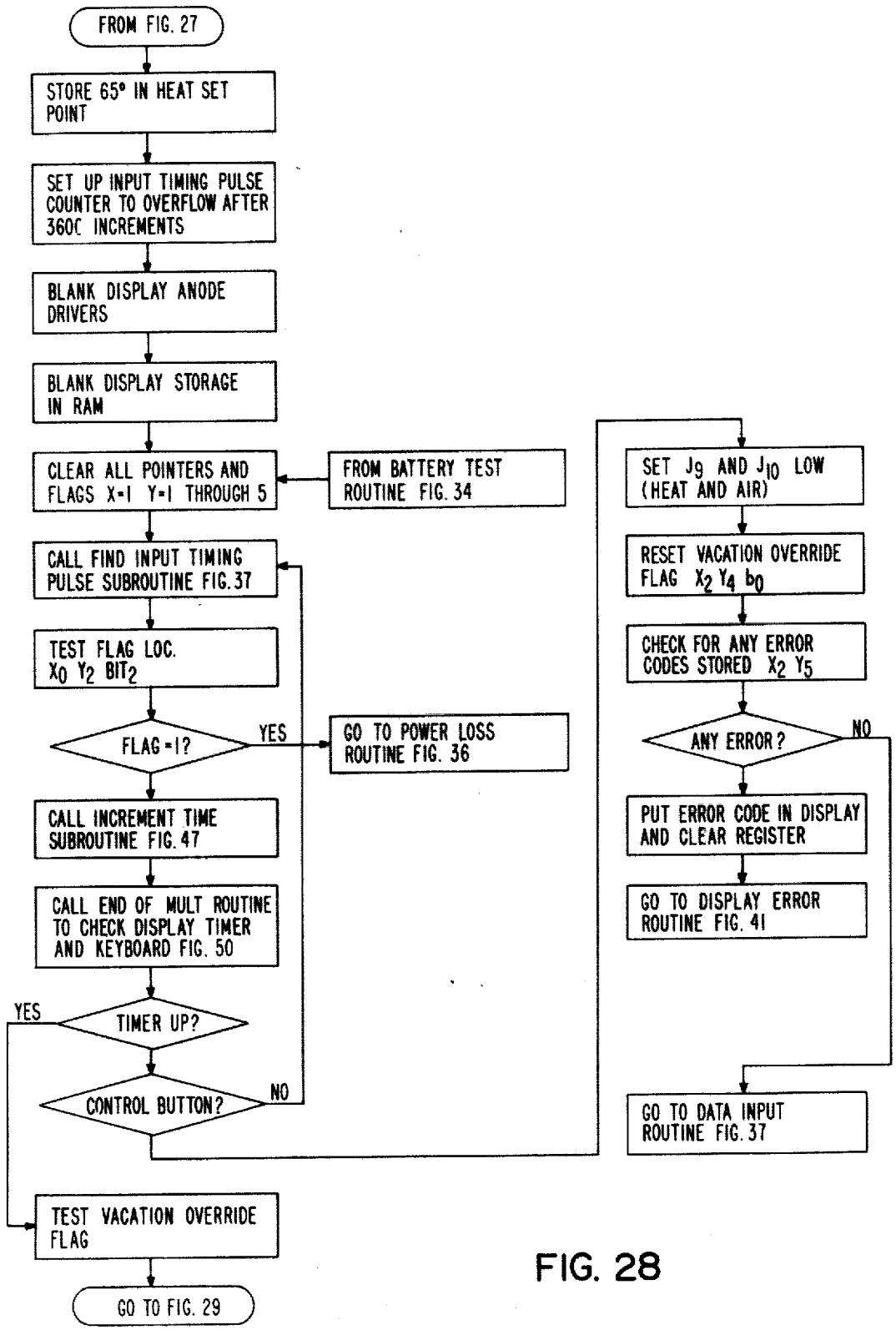
Figure 29:
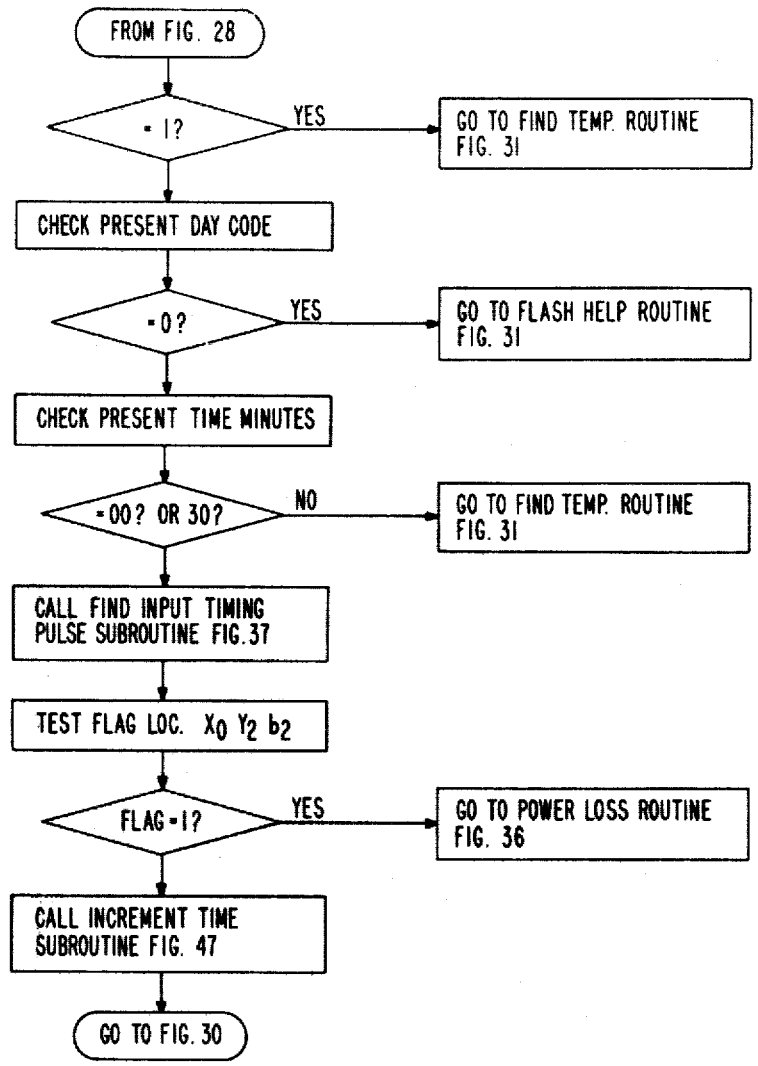
Figure 30:
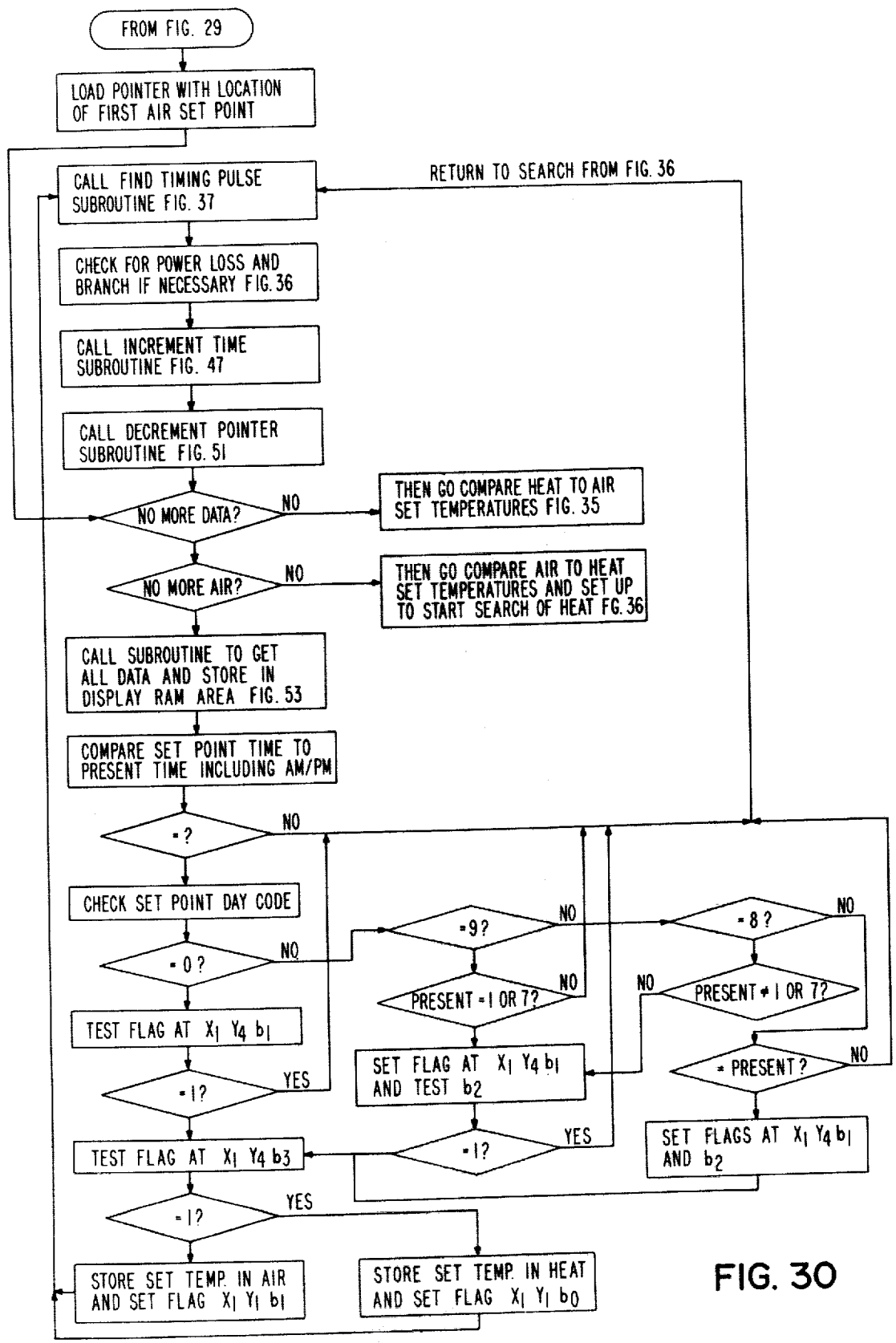

For completing a connection between the conductors within cable 464 and the circuitry printed on board 244, a plurality of connectors 496 are employed. Each connector, as shown in FIGS. 22A and 22B, is necked down at its lower end to define a pin 498 which is received within a pinconnecting aperture in board 244. Projecting upwardly from the body of connector 496 is a central tong 500 on either side of which is a bent resilient finger 502. At the lower end of cable 464, the covering over the printed conductors 466 is cut away to expose the conductor ends. In this case, the upper and lower surfaces of cable 464 are simply continuations of the first and third flexible layers mentioned above in connection with the discussion of keyboard 110. Accordingly, some of conductors 466 are affixed to the upper surface of the first layer, while the others are affixed to the lower surface of the third layer.

With a plurality of connectors 496 disposed in a row as indicated in FIG. 14, it is only necessary to insert the lower end portion of cable 464 between the rows of opposing fingers and in a manner such that each exposed contact end is slipped between the tong 500 and gripping fingers 502 of the appropriate one of connectors 496. In this case, of course, the row of connectors 496 on board 244 is so disposed as to be aligned directly ahead of cable 464 as it emerges from slit 462.

A different form of connector 506, shown in FIG. 23B, is employed to connect display device 200 into the circuitry. The central body portion of connector 506 is necked down at its lower end 508 to define a pin again receivable in a selected pin aperture formed in board 244. At its upper end, connector 506 has a projecting thumb 510 alongside a longer finger 512 slightly bent at its outer end portion toward thumb 510. During assembly, thumb 510 and finger 512 are inserted through an appropriate one of pin terminals 431*d* in ledge 431*c* of device 200 which is disposed directly above the row 514 of connectors 506 disposed on the upper surface of board 244. Thumb 510 and finger 512 press against and make contact with the conductively plated interior of the corresponding pin terminal opening.

Figure 23C:
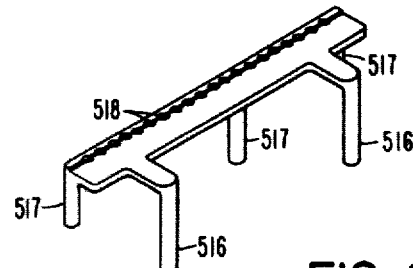
FIG. 23C is an isometric view of a mounting rack which, in a modified embodiment, may be used in conjuction with the components of FIGS. 23A and 23B.

In an alternative manner of securing device 200, a mounting rack 515 as shown in FIG. 23C is used. To this end, posts 436, tongue 438 and cleats 442 are omitted, and rim 432 has another portion running between the locations of posts 436 as they actually are shown. Disposed just behind row 514 of connectors 506 as viewed in FIG. 14 are a pair of holes which seat the lower ends of legs 516 on rack 515. An array of shorter legs 517 rest on top of board 244 in front of row 514. A row of openings 518 in rack 515 are aligned with respective connectors 506, so that thumbs 510 and fingers 512 project about half way therethrough. Device 200 may be mounted on rack 515 before case 246 is placed on base 242, allowing testing before final assembly of the housing. Upon that assembly, ledges 431*b* and 431*c* rest on rim 432 as extended.

Transparent cover 228 is formed of a material such as polycarbonate. It includes a main flat panel 520 around the entire margin of which is a downwardly depending skirt 522 which, when cover 228 is in a closed position, is spaced alongside and outwardly from rim 394 with the lower margin of skirt 522 normally being slightly spaced above a ledge 524 which entirely surrounds rim 394 except at gap 396 (FIG. 17).

On the undersurface of panel 520, equally spaced about the center of the rear margin of the panel and merged into the inner surface of that portion of skirt 522, are a pair of spaced blocks 526 and 528. Each block includes a lateral circular opening 530 which communicates with a passage 532 of a width slightly smaller than the diameter of opening 530. Depending downwardly from the inner surface and near the rear margin of panel 520, and spanning the distance between blocks 526 and 528, is a rib 534 that slants up toward the rear.

With reference to FIGS. 17 and 17A, depending downwardly beneath and at the edges of gap 396 are a pair of respective webs 536 and 538. Spaced a short distance from gap 396 beyond each of webs 536 and 538 are another like pair of corresponding webs 540 and 542. Each of these webs includes a downwardly-opening generally-circular recess 544 open on its lower side to communicate with a slightly narrower passage 546.

Figure 20:
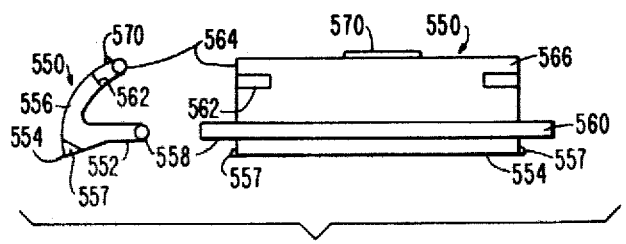
FIG. 20 is, from left to right, a side elevational view and a rear elevational view of a component shown in FIG. 14 as assembled.

Each of openings 530 in blocks 526 of transparent panel 228 constitutes a hinge. Similarly, each of recesses 544 in webs 536 and 540 constitutes another hinge, while those same recesses 544 in webs 538 and 542 constitute a still further hinge. Cooperating with all of those hinges is a hinge bar 550. As shown in FIG. 20, hinge bar 550 is of somewhat C-shaped cross section. Its lower leg 552 is generally straight but is bent slightly outward from a generally V-shaped bight portion 554. Its upper leg 556 curves smoothly away from portion 554 to present a convex outer surface. An ear 557 projects outwardly from each end of bight portion 554.

Projecting laterally outward from one end of leg 552 is a hinge pin 558. Similarly projecting outwardly from the other side of leg 552 is another hinge pin 560. The outer end portion of leg 556 is necked down at 562. Projecting laterally outward from the end of that necked down portion of leg 556 is a pin 564 on one side and a pin 566 on the other.

Hinge bar 550 swings within the opening 568 provided by gap 396. Pin 558 is captivated within recesses 544 of webs 536 and 540, while pin 560 is captivated within recesses 544 of webs 538 and 542. Bight portion 554 faces generally in a downward direction and the outer curved surface of leg 556 rides alongside the bottom margin 572 of opening 568 as hinge bar 550 swings about hinges 558 and 560. Bottom margin 572 is beveled inwardly in a direction downwardly from opening 568 as shown in FIG. 18.

Pin 564 is captivated within opening 530 of block 526, while pin 566 is captivated within the identical opening within block 528. Thus, transparent cover 228 may, to a limited extent, be swung about pins 564 and 566. Centrally disposed between approximately the rear sides of pins 564 and 566, as viewed in FIG. 20, and projecting outwardly from the outside surface of leg 556, is a lug 570.

With cover 228 in the closed position, the cover is hinged around pins 564 and 556 so as to be swung over leg 556 to a position such that lug 566 projects into the recess formed by the outside of rib 534. At the same time, hinge bar 550 has been swung downwardly within opening 568 so that lower leg 552 is approximately parallel with control panel 390. As cover 228 is first swung away from its closed position, interference between lug 570 and rib 534 retards rotation of pins 564 and 566 as a result of which hinge bar 550 first swings upwardly about pins 558 and 560 until the ears 557 on the sides of bight 554 engage the lower side edges of opening 568. Thereafter, further opening of cover 228 causes it to complete its limited movement of swing, which may already have been started, about pins 564 and 566. That limit is reached when skirt 522 touches the inside of leg 566. On still further opening of cover 228, ears 557 cam inside the side walls of opening 568 as hinge bar 550 is swung on around pins 558 and 560 until a limit is reached when the inside of leg 552 abuts the inner surface of skirt 284 of upper housing 242.

When cover 228 has been moved to the fully opened position, the dimensions and the backward slope of control panel area 390 are such that it tilts backward a slight amount, so as to remain in the open position with respect to swinging about pins 564 and 566. At the same time, the frictional engagement of ears 557 with the side surfaces of opening 568 retains hinge bar 550 in its open position. The double articulation provided by the combination of the two different sets of hinges enables cover 228 to be both fully closable and openable a full one-hundred-and-eighty degrees to a position in which it is entirely out of the way of operation of keyboard 110.

Also projecting downwardly from the inner surface of panel 520 is a boss 574. The latter has approximately the shape of and, when cover 228 is closed, is oriented with and aligned directly over the REVIEW pushbutton. Moreover, the lower end 576 of boss 574 is, with the cover nominally closed, spaced only slightly above or just at the surface of that REVIEW pushbutton. The material of cover 228 is slightly flexible and the slight normal spacing of the bottom of skirt 522 from ledge 524 allows pressure anywhere upon the exposed face of panel 520 to cause depression of the REVIEW button by boss 574 and thereby immediately provides a readout of temperature, timing and day from device 200 without opening the cover. Repeated application of pressure upon cover 228, of course, would enable a user to conduct additional review as previously described, such as determining what is to happen next. At the same time, this operation cannot cause an alteration of any program step that has been stored. In addition, cover 228 serves as a dust protector and also as a deterrent against undesired pushbutton manipulation by others. Being transparent although it may be tinted, and also having the review actuation feature, there seldom is any need to open cover 228 unless a battery warning is observed or it is desired to make a change in the programmed operation.

It will be observed that a wide variety of different features have been disclosed. Without limitation or ordering as to importance, it may be noted that a common temperature sensor is employed for control of either heating or air conditioning. Moreover, that sensor is disposed in a restricted air flow path by an arrangement which tends to prevent misleading readings that otherwise might result from transient air currents. The overall layout creates a chimney effect which insures that room air constantly is drawn through the unit in order to provide an accurate response.

The particular hinge arrangement, including hinge bar 550, permits cover 228 to be swung more than one-hundred-eighty degrees while yet allowing complete closure. This hinge arrangement achieves what may be termed a dual-detenting so as to insure that it opens and closes in proper sequence. Resilient contacts 314-317 exhibit a double action that permits contact both to the printed wiring and to the incoming supply and command leads. Those contacts also permit the unit readily to be removed from the wall simply by taking advantage of the different ears and lugs provided as between the housing and the mounting plate.

Involving both battery and external alternating-current power supply, a rather sophisticated switching arrangement is provided in order to change between those two different supplies. Yet, the unit is arranged to run normally from the external alternating-current supply. Battery 152 not only provides a backup to the main power supply system but also enables retention of the stored user programs should there be a power failure or should the user desire to displace the controller to another location for reasons already indicated. In addition, the unit warns the user when it becomes time to replace battery 152.

Electrostatic screen 192 disposed over keyboard 110 serves to protect against damage to the sensitive microcomputer. In addition, there are various filters and optical couplers to provide suppression of transients and other spurious signals which otherwise might be introduced by reason of signals appearing on the incoming alternating-current power supply or from other sources. Additional filtering is included in order to protect against radio-frequency interference. An included time delay prevents control operation in an undesired manner which otherwise might even cause a pilot light in an associated heating or cooling unit to be extinguished.

Even though involving only what basically is a simple resistance-capacitance circuit, the temperature sensor is caused to be sufficiently linear as to be accurate within one degree Fahrenheit over the rather broad functional range. The unit gives notice that the control is calling for heat, serving to assure the user that heat is being supplied by a "silent" arrangement such as a heating system which uses hot water, steam or radiant supply. Even in the case of a forced air system, the indicator serves to inform the user that external operation has been commanded prior to the expiration of the time delay that often occurs between initial energization and the operation of blowers or the like.

The software incorporated is of special advantage. For example, the order of data entry established makes it possible to "write a sentence" instead of having to make constant use of an "enter" key. The day codes assigned to the numbered entry keys allows substantial flexibility within the user's normal work week. On the other hand, the user who has a rather non-typical schedule of events easily can employ the individual day codes to arrange a program in accordance with his own unique schedule.

Adding to flexibility is the feature of temporary override that affects only one previously-programmed instruction without, nevertheless, removing that previous instruction. Similarly, the vacation override enables a different program to be followed during a longer period of time and again without disturbing the normal program.

Having both Fahrenheit and Celsius scales, the thermostat contemplates a possible switchover in common usage from one to the other. Moreover, the thermostat features a manner of conversion which effects a change of an entire sequential program as between Fahrenheit and Celsius, while at the same time changing the corresponding visual display.

The particular unit as embodied is capable of accepting up to twenty-three set points. Considering the various different day code options, this means that the user can establish in excess of one-hundred different temperature set points within any given week.

In the overall, therefore, the user is enabled to program the establishment of his own comfort level which he desires over a wide variety of different periods throughout an entire week. At the same time, the user can achieve energy conservation by focusing rather specifically upon fairly narrow time periods during which demand desirably should be lessened in order to effect such conservation. Moreover, the thermostat affords simultaneous control of both heating and air conditioning without requiring that the user act to switch between the two systems. Thus, he is further able to program the establishment of his own complete "comfort zones".

Certain aspects of the present invention are described and claimed in concurrently-filed co-pending applications Ser. No. 69,870 of James B. Waite, Myron Yoknis and Robert M. Neel under the title "Programmable Thermostat" and Ser. No. 70,220 of Robert M. Neel under the title "Thermostat Assembly", both being assigned to the same assignee as the present application.

While a particular embodiment of the invention has been shown and described, and numerous modifications and alternatives have been suggested, it will be obvious to those skilled in the art that other changes and modifications may be made without departing from the invention in its broader aspects. Therefore, the aim in the appended claims is to cover all such changes and modifications as fall within the true spirit and scope of that which is patentable.

We claim:

1. A thermostat comprising:
a memory unit;
means for selectively entering into said memory a chosen pattern of unit values of temperature desired at different times on different days of a week;
an output device for governing a temperature-determining system;
a clock;
means controlled by said clock to address said memory unit during said different times of said different days and determine said values;
means for sensing an existing temperature level;
means for comparing the determined value, at said different times on said different days, with said level to develop a control signal;
means responsive to said control signal for operating said output device in a manner to effect reduction of the difference between said determined value and said temperature level;
and time-delay means, incorporated in said responsive means, for maintaining operation of said output device a predetermined minimum period of time following initiation of operation of said output device to actuate said system.

2. A thermostat comprising:
a memory unit;
means for selectively entering into said memory a chosen pattern of unit values of temperature desired at different times on different days of a week;
an output device for governing a temperature-determining system;
a clock;
means controlled by said clock to address said memory unit during said different times of said different days and determine said values;
means for sensing an existing temperature level;
means for comparing the determined value, at said different times on said different days, with said level to develop a control signal;
means responsive to said control signal for operating said output device in a manner to effect reduction of the difference between said determined value and said temperature level;
a series-connected pair of signal transmissive elements included in said sensing means;
means for supplying an enabling signal to the input of the first of said elements;
means for deriving an output signal from the second of said elements;
a series combination of a potentiometer and a temperature-sensitive variable resistor connected at one end to the junction between said elements;
a resistive impedance coupled between the input of said first element and the other end of said combination;
a capacitive impedance coupled between the output of said other element and said other end of said combination;
and said potentiometer being adjustable in resistive value, with respect to the values of said impedances and the nominal value of said variable resistor, to substantially maintain a linear relationship between the level of said output signal and the temperature sensed by said resistor.

3. A thermostat comprising:
a memory unit;
means for selectively entering into said memory a chosen pattern of unit values of temperature desired at different times on different days of a week;
an output device for governing a temperature-determining system;

a clock;

means controlled by said clock to address said memory unit during said different times of said different days and determine said values;

means for sensing an existing temperature level;

means for comparing the determined value, at said different times on said different days, with said level to develop a control signal;

means responsive to said control signal for operating said output device in a manner to effect reduction of the difference between said determined value and said temperature level;

an oscillator included with said clock and arranged to develop free-running signals approximating a power supply frequency;

means for normally supplying to said oscillator a signal at said frequency derived from said power supply;

and means responsive to said signal for synchronizing said oscillator with said supply frequency.

4. A thermostat comprising:

a memory unit;

means for selectively entering into said memory a chosen pattern of unit values of temperature desired at different times on different days of a week;

an output device for governing a temperature-determining system;

a clock;

means controlled by said clock to address said memory unit during said different times of said different days and determine said values;

means for sensing an existing temperature level;

means for comparing the determined value, at said different times on said different days, with said level to develop a control signal;

means responsive to said control signal for operating said output device in a manner to effect reduction of the difference between said determined value and said temperature level;

an oscillator included with said clock and arranged to develop free-running signals approximating a power supply frequency;

means for normally supplying to said oscillator a signal at said frequency derived from said power supply;

means responsive to said signal for synchronizing said oscillator with said supply frequency;

said oscillator including a series combination of first and second inverters;

means for applying said signal to the input of said first inverter;

means for deriving oscillatory signals from the output of said second inverter;

means separate from said power supply for energizing said inverters;

a capacitor coupled between said input and said output;

and a potentiometer connected between said input and the junction between said inverters, the value of said potentiometer setting the free-running frequency of oscillation in the absence of said power supply.

5. A thermostat comprising:

a memory unit;

means for selectively entering into said memory a chosen pattern of unit values of temperature desired at different times on different days of a week;

an output device for governing a temperature-determining system;

a clock;

means controlled by said clock to address said memory unit during said different times of said different days and determine said values;

means for sensing an existing temperature level;

means for comparing the determined value, at said different times on said different days, with said level to develop a control signal;

means responsive to said control signal for operating said output device in a manner to effect reduction of the difference between said determined value and said temperature level;

a battery for energizing said thermostat;

means for developing a measuring voltage;

a comparator responsive to said reference and measuring voltages for developing a warning signal when said measuring voltage departs more than a predetermined amount from said reference voltage;

means for displaying said warning signal;

means for monitoring the level of voltage supplied to said controlled means;

another comparator responsive to said reference and level voltages for developing a hold signal when said level voltage departs more than a preselected amount from said reference voltage;

and means responsive to said hold signal for suspending operation of said controlled means.

6. A thermostat comprising:

a memory unit;

means for selectively entering into said memory a chosen pattern of unit values of temperature desired at different times on different days of a week;

an output device for governing a temperature-determining system;

a clock;

means controlled by said clock to address said memory unit during said different times of said different days and determine said values;

means for sensing an existing temperature level;

means for comparing the determined value, at said different times on said different days, with said level to develop a control signal;

means responsive to said control signal for operating said output device in a manner to effect reduction of the difference between said determined value and said temperature level;

said thermostat being supplied by an external source of alternating-current power;

means, including a rectifier, a storage capacitor network and a regulator, responsive to said source for developing energy suitable for operating said thermostat;

a gate-operated device for delivering power from said external source to said temperature-determining system in response to development of said control signal;

means for producing a reference signal;

means for deriving from said controlled means an enabling signal;

and a switching means including a comparator responsive to said reference and enabling signals for providing an actuating signal applied to the gate of said device for effecting conduction of the latter.

7. A thermostat as defined in claim 6 in which the gate of said device is directly supplied with a triggering potential by a transistor optically coupled to a driving light emitter activated by the output from said comparator.

8. A thermostat as defined in claim 6 in which said network includes a series combination of two capacitors, a gate-operated switch is coupled between a stable reference and the junction between said capacitors, and a light-emitter energized by said enabling signal is optically-coupled to drive said switch.

9. A thermostat as defined in claim 6 which further includes means coupled to said external source for developing a voltage, and switching means responsive to said enabling signal for coupling said voltage into said storage capacitor network.

10. A thermostat as defined in claim 9 in which said switching means and said storage capacitor network effect voltage doubling.

11. For use with a thermostat that is supplied from an external source of alternating-current power, a power control system comprising:
means, including a rectifier, a storage capacitor network and regulator, responsive to said source for developing energy suitable for operating said thermostat;
a gate-operated device for delivering power from said external source to a temperature-determining system in response to development of a control signal;
means for developing said control signal in response to a determination of temperature;
means for producing a reference signal;
means for deriving a time-controlled enabling signal;
and a switching means including a comparator responsive to said reference and enabling signals for providing an actuating signal applied to the gate of said device for effecting conduction of the latter.

12. For use with a thermostat having controlled means for addressing a memory unit, a battery system comprising:
a battery suitable for energizing said thermostat;
means for developing a reference voltage;
means in said controlled means for developing a measuring voltage;
a comparator responsive to said reference and measuring voltages for developing a warning signal when said measuring voltage departs more than a predetermined amount from said reference voltage;
means for monitoring the level of voltage supplied to said controlled means;
another comparator responsive to said reference and level voltages for developing a hold signal when said level voltage departs more than a preselected amount from said reference voltage;
and means responsive to said hold signal for suspending operation of said controlled means.

13. For use with a thermostat having a power supply of predetermined frequency, a timing system comprising:
a series combination of first and second inverters;
means for applying said signal to the input of said first inverter;
means for deriving oscillatory signals from the output of said second inverter;
means separate from said power supply for energizing said inverters;
a capacitor coupled between said input and said output;
a potentiometer connected between said input and the junction between said inverters, the value of said potentiometer setting the free-running frequency of oscillation in the absence of said power supply;
means for normally supplying to said oscillator a signal at said frequency derived from said power supply;
and means responsive to said signal for synchronizing said oscillator with said supply frequency.

14. For use with a thermostat to sense an existing temperature level, a sensing system comprising:
a series-connected pair of signal transmissive elements;
means for supplying an enabling signal to the input of the first of said elements;
means for deriving an output signal from the second of said elements;
a series of combination of a potentiometer and a temperature-sensitive variable resistor connected at one end to the junction between said elements;
a resistive impedance coupled between the input of said first element and the other end of said combination;
a capacitive impedance coupled between the output of said other element and said other end of said combination;
and said potentiometer being adjustable in resistive value, with respect to the values of said impedances and the nominal value of said variable resistor, to substantially maintain a linear relationship between the level of said output signal and the temperature sensed by said resistor.

15. A sensing system as defined in claim 14 which includes a resistor connected in shunt with said variable resistor.

16. For use in a thermostat system in which alternating-current operating power for the thermostat is supplied to a pair of terminals which are bridged by the thermostat for energizing a controlled device, the improvement comprising:
a gate-operated switch connected across said terminals;
a rectifier having its input connected across said terminals;
a capacitive network connected across the output of said rectifier for storing energy delivered therefrom;
means coupled to said capacitive network for operating said thermostat with energy stored in said network;
and means for triggering said gate to close said switch only during a portion of a half cycle of the waveform of said alternating-current power, energy stored in said network during the remainder of said half cycle being sufficient to operate said thermostat throughout said portion.

17. A system as defined in claim 16 in which said energy is stored in said network from substantially the beginning of said half cycle and said switch is closed later in said half cycle.

18. A system as defined in claim 16 which further includes:
means for developing a command signal, said triggering means being responsive to said command signal for closing said switch during said portion;
and said coupled means including means for operating said thermostat with energy delivered from said rectifier in the absence of said command signal.

19. A system as defined in claim 18 in which said network includes a pair of capacitors connected in series across said output of said rectifier and which also includes:
a second gate-operated switch connected between one of said terminals and the junction between said capacitors;
and means responsive to said command signal for triggering the gate of said second switch to connect said one terminal to said junction.

20. A system as defined in claim 18 which also includes means responsive to the absence of said command signal for disabling said switch.

21. A system as defined in claim 16 which further includes:

means for developing a command signal, said triggering means being responsive to said command signal for closing said switch during said portion;

and means responsive to termination of said command signal for enabling said switch to reset to an open condition.

* * * * *